(12) United States Patent
Tatsutani et al.

(10) Patent No.: US 12,228,491 B2
(45) Date of Patent: *Feb. 18, 2025

(54) MEASUREMENT APPARATUS AND QUALITY CONTROL METHOD

(71) Applicant: SYSMEX CORPORATION, Kobe (JP)

(72) Inventors: Hiroo Tatsutani, Kobe (JP); Motoi Kinishi, Kobe (JP); Tomohiro Tsuji, Kobe (JP); Yasuaki Tsuruoka, Kobe (JP); Satoshi Yoneda, Kobe (JP)

(73) Assignee: SYSMEX CORPORATION, Hyogo (JP)

( * ) Notice: Subject to any disclaimer, the term of this patent is extended or adjusted under 35 U.S.C. 154(b) by 1032 days.

This patent is subject to a terminal disclaimer.

(21) Appl. No.: 16/585,302

(22) Filed: Sep. 27, 2019

(65) Prior Publication Data

US 2020/0103333 A1    Apr. 2, 2020

(30) Foreign Application Priority Data

Sep. 28, 2018 (JP) ................................ 2018-185295

(51) Int. Cl.
  G01N 15/10     (2006.01)
  G01N 15/14     (2006.01)
  G01N 15/1429   (2024.01)

(52) U.S. Cl.
  CPC ..... G01N 15/1012 (2013.01); G01N 15/1425 (2013.01); G01N 15/1429 (2013.01)

(58) Field of Classification Search
  CPC ........... G01N 15/1012; G01N 15/1425; G01N 15/1429
  See application file for complete search history.

(56) References Cited

U.S. PATENT DOCUMENTS

| | | | |
|---|---|---|---|
| 6,897,954 B2 | 5/2005 | Bishop et al. | |
| 2009/0198463 A1 | 8/2009 | Kamihara et al. | |
| 2016/0091428 A1* | 3/2016 | Yokoyama | G01N 15/1425 435/6.1 |
| 2018/0284008 A1* | 10/2018 | Kinishi | G01N 15/1425 |

(Continued)

FOREIGN PATENT DOCUMENTS

| | | |
|---|---|---|
| CN | 1932515 A | 3/2007 |
| CN | 102265163 A | 11/2011 |
| CN | 102621339 A | 8/2012 |

(Continued)

OTHER PUBLICATIONS

The Japanese Office Action issued on Apr. 26, 2022 in a counterpart Japanese patent application No. 2018-185295.

(Continued)

*Primary Examiner* — Gailene Gabel
(74) *Attorney, Agent, or Firm* — Crowell & Moring LLP

(57) ABSTRACT

Disclosed is a measurement apparatus that includes: a measurement unit configured to measure a control sample for quality control; a display unit; and a processing unit configured to cause the display unit to display an input screen for setting an evaluation criterion used in the quality control, and, in the measurement apparatus, the processing unit causes the display unit to display a quality control result of a test item, based on the evaluation criterion and a measurement result of the control sample.

14 Claims, 50 Drawing Sheets

(56) References Cited

U.S. PATENT DOCUMENTS

| | | | | |
|---|---|---|---|---|
| 2020/0098452 A1* | 3/2020 | Tatsutani | ............... | G16H 10/40 |
| 2021/0018438 A1* | 1/2021 | Tsuruoka | ........... | G01N 15/1459 |

FOREIGN PATENT DOCUMENTS

| | | | | |
|---|---|---|---|---|
| CN | 105466840 A | | 4/2016 | |
| EP | 2 093 573 | * | 1/2009 | ............. G01N 33/23 |
| EP | 3002581 A1 | | 4/2016 | |
| JP | 2000-187037 A | | 7/2000 | |
| JP | 2003-004750 A | | 1/2003 | |
| JP | 2007-40883 A | | 2/2007 | |
| JP | 2007-078375 A | | 3/2007 | |
| JP | 2007-248090 A | | 9/2007 | |
| JP | 2014-209081 A | | 11/2014 | |
| JP | 2016-070833 A | | 5/2016 | |
| JP | 2016-540969 A | | 12/2016 | |

OTHER PUBLICATIONS

The Communication pursuant to Article 94(3) EPC issued on May 20, 2022 in a counterpart European patent application No. 19199504.2.

The extended European search report issued on Feb. 18, 2020 in a counterpart European application No. 19199504.2.

U.S. Appl. No. 61/199,312, filed Nov. 13, 2008, Trotter et al.

College of American Pathologists (CAP), Flow Cytometry Checklist, Master, CAP Accreditation Program, dated Jul. 28, 2015, 24 pages.

Anonymous, "Introduction to Precision Control for FCM", <https.www.bc-cytometry.comQCQC-4-1html>, including English translation, Mar. 28, 2018, and date obtained from the Internet: Sep. 11, 2019, 2 pages.

Japanese Office Action with English Translation, dated Dec. 21, 2022, pp. 1-6, issued in a Japanese patent application No. 2018-185295, Japan Patent Office, Chiyoda Tokyo, Japan.

The Summons to attend oral proceedings pursuant to Rule 115(1) EPC issued on May 3, 2024 in a counterpart European patent application No. 19199504.2, 10 pages.

The Japanese Office Action issued on May 7, 2024 in a counterpart Japanese patent application No. 2023-149804, 7 pages.

The Chinese Office Action issued on May 1, 2024 in a counterpart Chinese patent application No. 201910935619.4, 30 pages.

The Chinese Office Action issued on Oct. 26, 2023 in a counterpart Chinese patent application No. 201910935619.4.

The Chinese Office Action issued on in Aug. 14, 2024 a counterpart Chinese patent application No. 201910935619.4, 41 pages.

* cited by examiner

Radar chart

MEASUREMENT APPARATUS AND QUALITY CONTROL METHOD

RELATED APPLICATIONS

This application claims priority from prior Japanese Patent Application No. 2018-185295, filed on Sep. 28, 2018, entitled "MEASUREMENT APPARATUS AND QUALITY CONTROL METHOD", the entire content of which is incorporated herein by reference.

BACKGROUND OF THE INVENTION

1. Field of the Invention

The present disclosure relates to a measurement apparatus and a quality control method.

2. Description of the Related Art

In analysis of a cell using a particle analyzer, it is required that, in a case where the same cell is measured by using the same detection reagent, measurement results in analyses which are performed independently on different dates and times are not different from each other. In particular, in a clinical cell analysis test in which a clinical sample is handled, internal quality control is required in order to maintain accuracy for analysis (Flow Cytometry Checklist (Jul. 28, 2015) FLO.23737 QC—Reagents/Stain Phase II).

The internal quality control is performed in order to monitor reproducibility and variation in analysis. In general, the monitoring of the reproducibility is performed by measuring a control sample such as a commercially available quality control sample and quality control samples collected in each facility, before the clinical sample is measured.

Quality control for measurement accuracy is required for a measurement apparatus that performs testing of a specimen since reproducibility is required in measurement when the same specimen is measured. In particular, in a particle analyzer such as a flow cytometer, when multiple kinds of antigens or nucleic acids are detected in one test, a cell sample that includes a bead having the same fluorescence wavelength as a fluorescent dye with which a cell to be tested is labeled, a living cell of the same cell type or cell lineage as that of a cell to be tested, or a cell obtained by fixing and storing a living cell, is used as a control sample for internal quality control in general. For test items for which testing is frequently requested, in particular, for test items for which in vitro diagnostic reagents are used, quality control samples are commercially available. However, for test items for which testing is requested with low frequency, in particular, a control sample for quality control of a reagent for research is not commercially available in general.

[In the U.S., according to Flow Cytometry Checklist (Jul. 28, 2015) FLO.23737 QC—Reagents/Stain Phase II, internal quality control is required also for such test items for which control samples are not provided. Therefore, in a case where no control sample is commercially available, a sample for quality control needs to be prepared in each clinical laboratory.

Furthermore, in general, quality control is performed on each day, in each week, or in each month in which testing is performed, or quality control is performed for each reagent lot. Therefore, in a case where a control sample is provided, control information indicating to what degree a measurement condition is to be maintained when the control sample is measured, for example, to what degree detection sensitivity of the measurement apparatus is to be maintained and how fluorescence correction is to be performed, is also provided by a control sample provider or a measurement apparatus provider, in general. In such a case, information about an evaluation criterion representing an accuracy allowable range is also provided together with the control sample. However, when the control sample is not provided by the control sample provider or by the measurement apparatus provider, the evaluation criterion for the quality control needs to be also set in each clinical laboratory.

Moreover, a particle analyzer is rarely managed, by a system for managing the particle analyzer, for a result of measurement of a commercially available control sample in general. In a management system provided in the particle analyzer, chronologic monitoring cannot be performed according to a request from a user. To date, monitoring results of control samples have been managed by, for example, generating a control graph such as an Xbar-R control chart with the use of Excel (registered trademark) or the like. However, generation of such a control graph and reading of quality control information from the control graph are dependent on an experience of a user skilled in particle analysis.

SUMMARY OF THE INVENTION

The scope of the present invention is defined solely by the appended claims, and is not affected to any degree by the statements within this summary.

An embodiment of the present disclosure is directed to a measurement apparatus (1000) that includes: a measurement unit (200) configured to measure a control sample for quality control; a display unit (17); and a processing unit (10) configured to cause the display unit (17) to display an input screen for setting an evaluation criterion used in the quality control. In the measurement apparatus (1000), the processing unit (10) causes the display unit (17) to display a quality control result of a test item, based on the evaluation criterion and a measurement result of the control sample. According to the present embodiment, an evaluation criterion for a quality control of a test item can be easily set and a quality control result of the test item can be displayed on the display unit (17). As a result, effects of, for example, improving the quality of the measurement data, reducing management cost, and reducing working hours can be expected.

Preferably, the evaluation criterion is set according to the test item. In this embodiment, the quality control can be performed according to a test item.

Preferably, the evaluation criterion is set by a user. In this embodiment, quality control can be performed for a test item intended by the user.

Preferably, the evaluation criterion is stored in a storage unit of the particle analyzer (1000) in a form that allows the processing unit (10) of the particle analyzer (1000) to read out the evaluation criterion. In this embodiment, the evaluation criterion for quality control can be read out to application software of the measurement apparatus (1000).

Preferably, the measurement apparatus (1000) further includes an input unit configured to allow the evaluation criterion to be set on the input screen. In this embodiment, assistance in setting the evaluation criterion by the user can be performed.

Preferably, the particle is a cell, and the test item corresponds to a cell to be measured. More preferably, a target molecule is an antigen. In this embodiment, the control unit (100) can perform quality control for cell analysis.

Preferably, the test item includes one or more measurement items, and the evaluation criterion is set for each measurement item. More preferably, the measurement item includes detection items corresponding to two or more target molecules to be detected individually by different light receiving elements. In this embodiment, the evaluation criterion can be set for each subset panel.

Preferably, the evaluation criterion is determined based on an intensity of light detected by each light receiving element. In this embodiment, the evaluation criterion can be set based on a histogram.

Preferably, the evaluation criterion is set for a particle distribution chart defined by intensities of light measured by at least two light receiving elements. In this embodiment, the evaluation criterion can be set on a dot plot. Preferably, the evaluation criterion is set within a predetermined gate. More preferably, the gate is set by a user. In this embodiment, the evaluation criterion can be set within the predetermined gate.

Preferably, the evaluation criterion includes an upper limit value and a lower limit value of an intensity of light or a size of a particle. In this embodiment, the evaluation criterion can be set based on an intensity of light or the size of a particle.

Preferably, the evaluation criterion is set based on statistical information. More preferably, the statistical information is selected from the number of cells, a median of an intensity of light, a mean value of the intensity of the light, and a standard deviation of the intensity of the light in the gate. In this embodiment, the evaluation criterion can be set based on various kinds of statistical information.

Preferably, at least one selected from an input region for receiving input of a character from a user, an icon for receiving selection by a user, and a pull-down list for receiving selection by a user is displayed on the input screen. In this embodiment, usability can be enhanced.

Preferably, a histogram or a dot plot is displayed on the input screen. In this embodiment, the user is allowed to set the evaluation criterion while viewing the histogram or the dot plot displayed on the input screen.

Preferably, a character string corresponding to each light receiving element is displayed on the input screen. In this embodiment, the evaluation criterion can be set for each light receiving element.

Preferably, the light is fluorescence and/or scattered light. In this embodiment, the evaluation criterion can be set also for fluorescence, scattered light, and the like.

Preferably, in a case where the light is fluorescence and a plurality of light receiving elements have sensitivities to one kind of fluorescence, when the evaluation criterion is set, the processing unit (10) further sets a condition of fluorescence correction for adjusting the sensitivities of the plurality of light receiving elements. In this embodiment, when fluorescences having a plurality of wavelengths are used, fluorescence correction can be automatically performed.

Preferably, the particle analyzer (1000) is a flow cytometer. In this embodiment, in the flow cytometer, particularly in a multicolor flow cytometer, the evaluation criterion can be set.

Preferably, a result of the quality control is displayed each time the control sample for each quality control is measured. In this embodiment, the quality control result can be monitored in real time.

Preferably, the result of the quality control is a result of quality control for each channel, and is displayed as a chart that is defined by a plurality of channels serving as axes. In this embodiment, the quality control results for a plurality of channels can be displayed on one screen.

Preferably, the result of the quality control is displayed together with a result of quality control which has been performed at a previous point in time. More preferably, the result of the quality control is displayed as a time series chart. In this embodiment, daily fluctuation or day-to-day variation of the quality control result can be known at a glance.

Preferably, when the result of the quality control indicates failure, a warning is displayed together with the result of the quality control. In this embodiment, the user can quickly know abnormality in quality control.

An embodiment of the present disclosure is directed to a quality control method that includes: displaying an input screen for allowing an evaluation criterion for a test item to be set; measuring a control sample for quality control based on the evaluation criterion; and outputting a quality control result for the control sample measured in the measuring. According to the present embodiment, an evaluation criterion for a quality control of a test item can be easily set and the quality control result can be, for example, displayed on the display unit. As a result, effects of, for example, improving the quality of the measurement data, reducing management cost, and reducing working hours can be expected.

Preferably, in the quality control method, the evaluation criterion is set according to the test item. In this embodiment, the quality control can be performed according to a test item.

Preferably, in the quality control method, the evaluation criterion is set by a user. In this embodiment, quality control can be performed for a test item intended by the user.

Preferably, in the quality control method, the test item includes one or more measurement items, and the evaluation criterion is set for each measurement item. More preferably, the measurement item includes detection items corresponding to two or more target molecules to be detected individually by different light receiving elements. In this embodiment, the evaluation criterion can be set for each subset panel.

Preferably, in the quality control method, the evaluation criterion is determined based on an intensity of light measured by each light receiving element. In this embodiment, the evaluation criterion can be set based on a histogram.

Preferably, in the quality control method, the evaluation criterion is set for a particle distribution chart defined by intensities of light for two measurement items. In this embodiment, the evaluation criterion can be set on a dot plot. Preferably, the evaluation criterion is set within a predetermined gate. More preferably, the gate is set by a user. In this embodiment, the evaluation criterion can be set within the predetermined gate.

Preferably, in the quality control method, the evaluation criterion includes an upper limit value and a lower limit value of an intensity of light or a size of a particle. In this embodiment, the evaluation criterion can be set based on an intensity of light or the size of a particle.

Preferably, in the quality control method, the evaluation criterion is set based on statistical information. In this embodiment, the evaluation criterion can be set based on various kinds of statistical information.

Preferably, in the quality control method, a histogram or a dot plot is displayed on the input screen. In this embodiment, the user is allowed to set the evaluation criterion while viewing the histogram or the dot plot displayed on the input screen.

Preferably, in the quality control method, the light is fluorescence and/or scattered light. In this embodiment, the evaluation criterion can be set also for fluorescence, scattered light, and the like.

Preferably, the quality control method is performed by using a flow cytometer. In this embodiment, in the flow cytometer, particularly in a multicolor flow cytometer, the evaluation criterion can be set.

Preferably, in the quality control method, a result of the quality control is displayed in the outputting each time the control sample for each quality control is measured. In this embodiment, the quality control result can be monitored in real time.

Preferably, in the outputting, the result of the quality control is a result of quality control for each channel, and is displayed as a chart that is defined by a plurality of channels serving as axes. In this embodiment, the quality control results for a plurality of channels can be displayed on one screen.

Preferably, the result of the quality control is displayed as a time series chart in the outputting. In this embodiment, daily fluctuation or day-to-day variation of the quality control result can be known at a glance.

Another embodiment of the present disclosure is directed to a measurement apparatus (1000) that includes: a measurement unit (200) configured to measure a control sample for quality control; a display unit (17); and a processing unit (10) configured to cause the display unit to display a quality control result for a test item. In the measurement apparatus (1000), the processing unit (10) obtains information corresponding to the control sample, and displays, on the display unit, a quality control setting screen or a quality control screen for a corresponding one of the test items, based on the obtained information. According to the present embodiment, the quality control setting screen or the quality control screen can be displayed according to a control sample.

Preferably, the information corresponding to the control sample is display mode information corresponding to the control sample, and the quality control setting screen or the quality control screen, for the test item, corresponding to the obtained display mode information is displayed on the display unit so as to be switchable to a quality control setting screen or a quality control screen corresponding to other display mode information. In this embodiment, quality control setting screens or quality control screens for different control samples can be displayed on one screen.

Preferably, the processing unit reads reagent information from a barcode attached to a container or an exterior portion for a test reagent, and displays the quality control setting screen or the quality control screen, for the test item, corresponding to display mode information, on the display unit. In this embodiment, even if the user does not input reagent information, the reagent information can be obtained, thereby enhancing convenience. This is useful when an in vitro diagnostic reagent is used as a detection reagent.

The processing unit obtains reagent information by input from an input unit or via a network, and causes the display unit to display the quality control setting screen or the quality control screen, for the test item, corresponding to display mode information. In this embodiment, even if a reagent for research is used, reagent information can be inputted.

Preferably, the control sample is a control sample of an in vitro diagnostic reagent or a control sample prepared by using a reagent for research, and display mode information includes information indicating whether the control sample is the control sample of the in vitro diagnostic reagent or the control sample prepared by using the reagent for research. In this embodiment, quality control can be performed for the control sample of an in vitro diagnostic reagent and the control sample prepared by using a reagent for research.

Preferably, a screen for setting an evaluation criterion is displayed when the control sample prepared by using the reagent for research is used as the control sample, and a screen on which the evaluation criterion has been set is displayed when the control sample of the in vitro diagnostic reagent is used as the control sample. In this embodiment, the quality control screen in the case of using an in vitro diagnostic reagent, and the quality control setting screen and the quality control screen in the case of using a reagent for research, can be displayed on one screen.

Another embodiment of the present disclosure is directed to a quality control method that includes: obtaining information corresponding to a control sample; displaying a quality control setting screen or a quality control screen, for a test item, corresponding to the control sample; measuring the control sample for quality control; and outputting a quality control result for the control sample measured in the measuring. According to the present embodiment, the quality control setting screen or the quality control screen can be displayed according to a control sample.

Preferably, in the quality control method, the information corresponding to the control sample is display mode information corresponding to the control sample, and the quality control method comprises displaying, on a display unit, the quality control setting screen or the quality control screen, for the test item, corresponding to the obtained display mode information such that the quality control setting screen or the quality control screen is switchable to a quality control setting screen or a quality control screen corresponding to other display mode information. In this embodiment, quality control setting screens or quality control screens for different control samples can be displayed on one screen.

Preferably, in the quality control method, reagent information is read from a barcode attached to a container or an exterior portion for a test reagent, and the quality control setting screen or the quality control screen, for the test item, corresponding to the display mode information is displayed on a display unit. In this embodiment, even if the user does not input reagent information, the reagent information can be obtained, thereby enhancing convenience. This is useful when an in vitro diagnostic reagent is used as a detection reagent.

Preferably, in the quality control method, reagent information is obtained by input from an input unit or via a network, and the quality control setting screen or the quality control screen, for the test item, corresponding to display mode information is displayed on a display unit. In this embodiment, even if a reagent for research is used, reagent information can be inputted.

Preferably, the control sample is a control sample of an in vitro diagnostic reagent or a control sample prepared by using a reagent for research, and display mode information includes information indicating whether the control sample is the control sample of the in vitro diagnostic reagent or the control sample prepared by using the reagent for research. In this embodiment, quality control can be performed for the control sample of an in vitro diagnostic reagent and the control sample prepared by using a reagent for research.

Preferably, the quality control method further includes displaying a screen for setting the evaluation criterion when the control sample prepared by using the reagent for research is used as the control sample; and displaying a screen on which an evaluation criterion has been set when the control sample of the in vitro diagnostic reagent is used as the control sample. In this embodiment, the quality control screen in the case of using an in vitro diagnostic reagent, and the quality control setting screen and the quality control screen in the case of using a reagent for research, can be displayed on one screen.

DETAILED DESCRIPTION OF THE PREFERRED EMBODIMENTS

Figure 1:
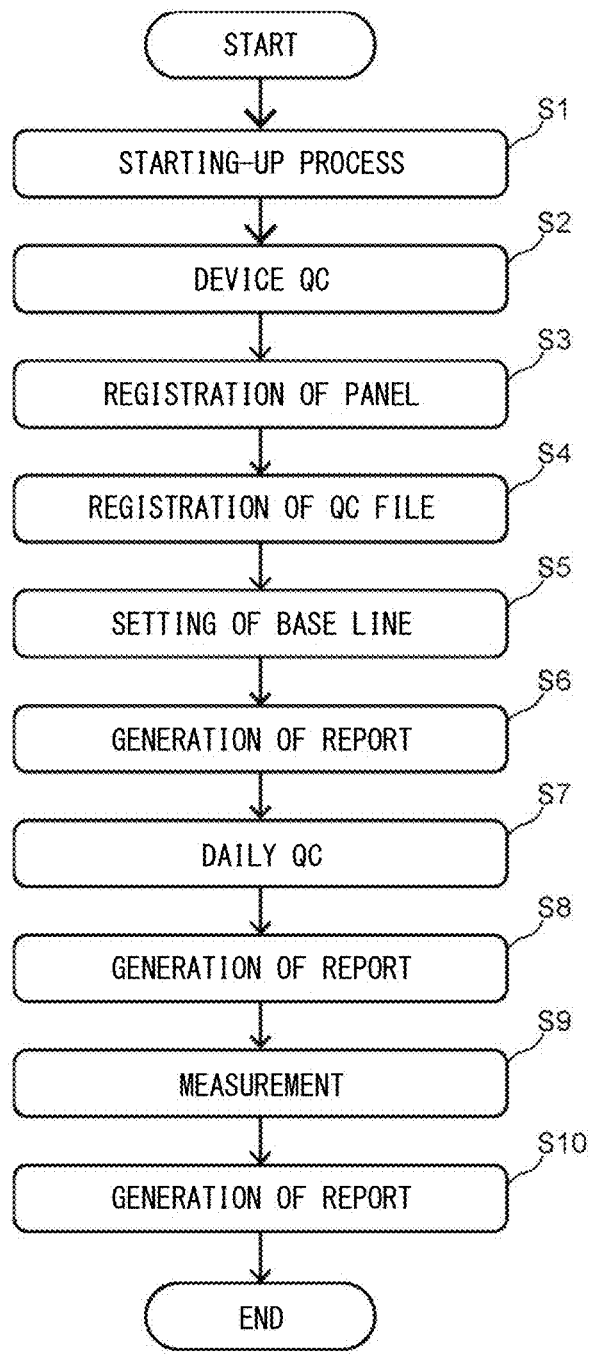
FIG. 1 schematically illustrates the present disclosure.

Hereinafter, an embodiment of the present disclosure will be described in detail with reference to the accompanying drawings. In the following description and drawings, the same reference numerals represent the same or similar components, and the description of the same or similar components is omitted.

[Outline of the Present Disclosure]

The outline of the present disclosure will be described with reference to FIG. 1. An exemplary case where a particle analyzer 1000 is used as a measurement apparatus 1000 will be described below. However, the measurement apparatus 1000 is not limited to a measurement apparatus for analyzing particles. Examples of the measurement apparatus include a nucleic acid amplifier, a nucleic acid sequence analyzer, an immunoassay apparatus, a biochemical measurement apparatus, a coagulation system measurement apparatus, and a urine testing apparatus. FIG. 2 shows an example of a configuration of the particle analyzer 1000. In an aspect of the present disclosure, assistance in quality control in the particle analyzer 1000 is performed. In another aspect, quality control in the particle analyzer 1000 is performed. More preferably, assistance in quality control is performed for a test item for which a measurement condition of a control sample for the quality control in measurement of particles in the particle analyzer 1000 is not provided by a provider. More preferably, an evaluation criterion for quality control corresponding to a test item is generated in the form of a file which can be read out in a process for the quality control in the particle analyzer 1000, and the evaluation criterion is stored in an auxiliary storage unit 13. This setting is received at a predetermined time prior to analysis of a measurement sample or in analysis of a measurement sample.

When a user accesses a control unit 100 of the particle analyzer 1000 in order to start up the particle analyzer 1000, a process of starting up the particle analyzer 1000 is started (step S1). After the starting-up process has been ended, a processing unit 10 of the control unit 100 starts quality control of a measurement unit 200 in the particle analyzer 1000.

For example, the quality control for the measurement unit 200 includes quality control (device quality control or also referred to as device QC) of hardware itself of the measurement unit 200 regardless of a test item, and quality control (test item quality control), corresponding to a test item, for monitoring deterioration of a measurement reagent, or the like. As shown in FIG. 1, when a user performs an operation for starting up the particle analyzer 1000, the processing unit 10 performs a process of staring up the particle analyzer 1000 (step S1), and the processing unit 10 performs a process step, in step S2, of performing device QC of the measurement unit 200. Subsequently, the processing unit 10 performs test item quality control. An evaluation criterion for quality control corresponding to a test item is necessary in order to perform quality control corresponding to the test item (also referred to as a panel). For the test item for which the evaluation criterion has already been set, the exiting evaluation criterion is used. For a new test item, the processing unit 10 receives setting of an evaluation criterion for performing quality control corresponding to the test item (step S3 to step S6). Alternatively, also in a case where the evaluation criterion has already been set, when, for example, the lot of a quality control sample is changed, the processing unit 10 needs to perform processing for setting an evaluation criterion. In a case where the evaluation criterion for the new test item is set, the processing unit 10 receives registration of a panel from a user (step S3). Subsequently, the processing unit 10 receives registration of a quality control file (QC file) for the registered panel (step S4), and receives setting of a base line using a control sample for the registered QC file (step S5). In a case where an evaluation criterion which has already been registered is updated, the process steps of step S4 and step S5 are performed. The processing unit 10 generates a report about the set evaluation criterion as appropriate (step S6). The processing unit 10 uses the set evaluation criterion to perform quality control for each test item before daily measurement, in step S7. This quality control is also referred to as daily QC. The result of the daily QC may be also outputted as a report (step S8). After the daily QC, that is, after step S7 or step S8, a process step, in step S9, of measuring a measurement sample prepared from a specimen may be performed. Furthermore, a result of measurement of the measurement sample may be also outputted as a report (step S10).

Screens which are necessary for step S3 to step S6 in which setting of an evaluation criterion for quality control corresponding to a test item is received, may be collectively referred to as a quality control setting screen.

In the present disclosure, a user represents an operator of the measurement apparatus. Examples of the operator include clinical laboratory technicians, researchers, engineers, experiment assistants, students, and administrators of the measurement system. A user who performs setting of an evaluation criterion described below preferably has a skill as, for example, an administrator of the measurement apparatus. Examples of the person who has a skill as the administrator include a person skilled in the measurement field such as a clinical laboratory chief, a chief, a manager, and an administrator of the measurement system. The daily QC described below may be performed by a person who does not have a skill as the administrator.

[Particle Analysis System]

Firstly, particle analysis for which quality control is to be performed according to the present disclosure will be described.

In the particle analysis, a particle is analyzed. The particle preferably emits one or more lights when predetermined light is applied thereto. Light emitted from the particle when the predetermined light is applied thereto, is generically referred to as light derived from the particle. The light derived from the particle includes scattered light, luminescence, and the like. The light derived from the particle may have any wavelength. However, the light derived from the particle preferably has a peak wavelength in a range of 350 nm to 850 nm. More specifically, the light derived from the particle is preferably fluorescence. The light derived from the particle may be light that is emitted from a substance itself contained in the particle. Alternatively, the light derived from the particle may be detected as light emitted by a luminescent substance such as a fluorescent substance with which the particle is labelled. The light derived from the particle preferably has a different peak wavelength for each measurement item.

The particle may be an artificial particle such as a magnetic bead and a plastic bead. The particle may be a living body component such as a cast or may be a particle such as a microorganism, an animal cell, and a plant cell.

The particle is detected by a detection reagent. Preferably, a target molecule in the particle is bound to a fluorescent dye contained in the detection reagent to detect the particle.

The target molecule is not limited to a specific one when the target molecule is contained in the particle. Preferably, the particle is a cell, and the target molecule may be any of a molecule on a cell membrane, a molecule inside a cell membrane, and a molecule in the cell. The target molecule may be an intracellular organelle (nucleus, nuclear membrane, nucleolus, mitochondrion, endoplasmic reticulum, Golgi body, lysosome, cell membrane, cytoplasm, or the like) itself. The target molecule may be, for example, a molecule obtained by gene transfer or the like. The target molecule is preferably at least one kind of molecule selected from the group consisting of an antigen and nucleic acid.

A reagent that is used for detecting the target molecule and that contains, for example, an antibody bound to a fluorescent dye, nucleic acid bound to a fluorescent dye, or a staining substance that emits a fluorescent signal, is referred to as a detection reagent. A plurality of detection reagents can be used in combination as appropriate according to a detection item (target molecule) included in the requested test. Preferably, when the target molecule is detected as an antigen, an antibody used for detecting the antigen is referred to as a detection antibody.

In a case where the particle is derived from an organism, the specimen is not limited to a specific one when the specimen is a cell, tissue, or cell-containing body fluid which is collected from an individual, or the like. Before the measurement, the detection reagent, and a cell sample obtained by, for example, diluting or fixing the specimen or a cell derived from the specimen are mixed with each other, to prepare a measurement sample (suspension of the cell bound to the fluorescent dye) which can be measured by the particle analyzer 1000. The specimen is preferably peripheral blood, bone marrow, urine, or the like. For example, in the case of multicolor flow cytometry, one cell sample is analyzed for one or more detection items included in a test item, preferably, a plurality of detection items included in the test item, in one to several assays (also referred to as detection), in general. A set of one or more detection items included in the test item, preferably, a plurality of detection items included in the test item is also referred to as a panel. A set of a plurality of detection items measured in one assay is also referred to as a measurement item (subset panel). Therefore, the test item includes a subset panel that includes one or more, preferably, a plurality of detection items, and the panel includes one or more, preferably, a plurality of subset panels. For example, when the panel includes 20 detection items, the detection items are divided into 4 to 10 subset panels and measured in general.

In the present disclosure, the particle analysis is performed by the particle analyzer 1000. The particle analyzer 1000 includes, for example, the measurement unit 200 for performing particle analysis, and the control unit 100 for controlling the analysis in the measurement unit 200, as shown in FIG. 2. The measurement unit 200 and the control unit 100 may be connected to each other via a network in a wired or wireless manner. The measurement unit 200 and the control unit 100 may be integrated with each other. The particle analyzer 1000 and a client terminal 300 may be connected to each other via a network 99 in a wired or wireless manner, to configure a particle analysis system 5000.

The control unit 100 is implemented by, for example, a general-purpose computer, and generates quality control data. The quality control data is generated in the form of a file from which setting of a measurement condition for measuring a quality control sample based on a detection reagent can be read out in a process for the quality control for the particle analyzer, according to a procedure shown in a flow chart described below, for a combination of the detection reagents, for detecting a particle, for which the measurement condition of a control sample for quality control for the particle analysis in the particle analyzer is not provided by a provider. A user mixes the detection reagent with the particle sample to prepare a measurement sample 29. The prepared measurement sample 29 is stored in a sample container 28, and is set in the measurement unit 200, to analyze the particle.

An exemplary case where the control unit 100 controls the particle analysis in the particle analyzer 1000 and generates data that includes a management condition for quality control, based on the measurement data of the control sample, will be described herein. A general-purpose computer different from the control unit 100 may generate data that includes an evaluation criterion for quality control and transmit the data to the control unit 100.

[Hardware Configuration of Control Device]

Figure 3:
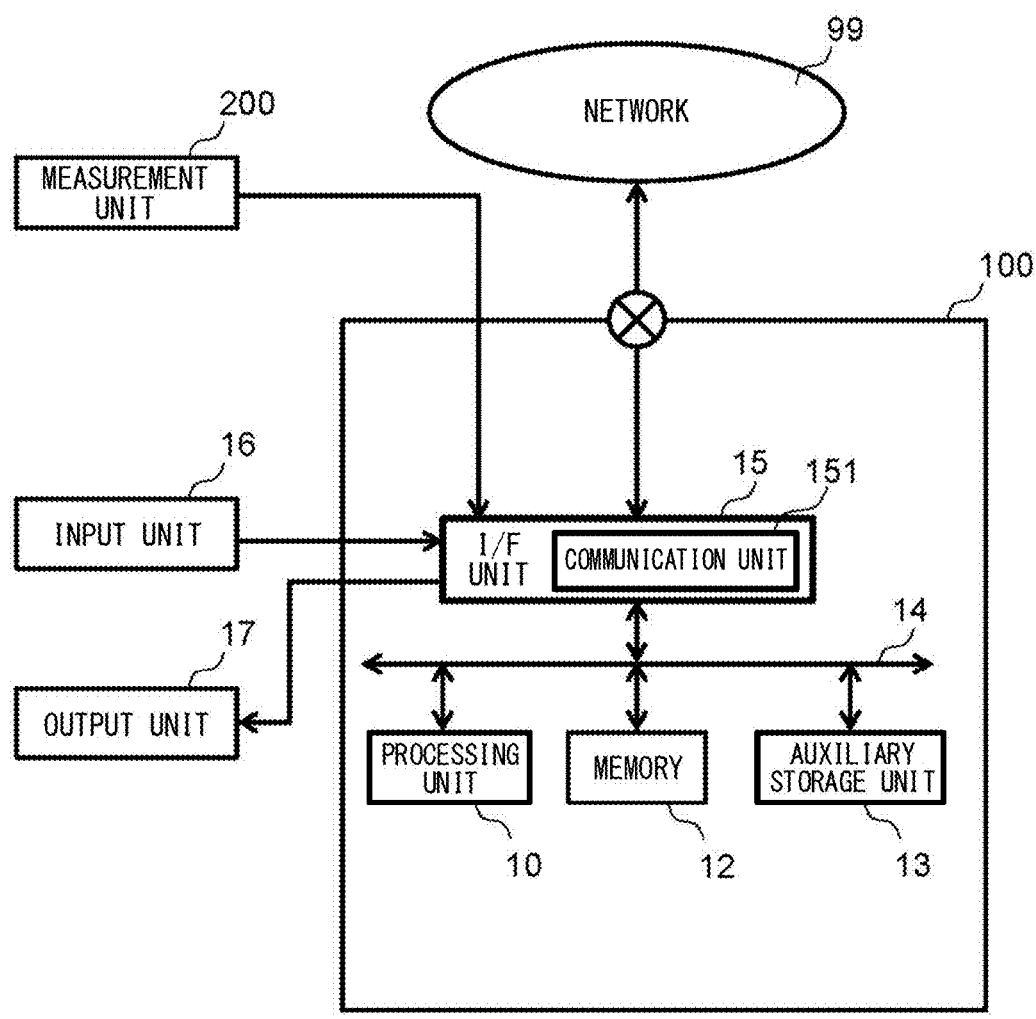
FIG. 3 illustrates an example of a hardware configuration of a control device.

FIG. 3 shows an example of a hardware configuration of the control unit 100. The control unit 100 includes the processing unit 10. Furthermore, the control unit 100 may include an input unit 16 and an output unit 17.

The control unit 100 includes a CPU (central processing unit) that acts as the processing unit 10 for performing data processing described below, a memory 12 to be used as a work area for the data processing, the auxiliary storage unit 13 for storing programs and process data described below, a bus 14 for performing data transmission among the components, and an interface unit 15 (hereinafter, referred to as "I/F unit") for performing input of data from an external device, output of data to an external device, and communication with an external device. An interface unit for performing communication in the interface unit 15 is a communication unit 151. The input unit 16 and the output unit 17 are connected to the processing unit 10. In the present disclosure, the memory and the auxiliary storage unit 13 may be collectively referred to as a storage unit. For example, the input unit 16 and the output unit 17 (display unit, printer, or the like) can be integrated to configure a touch-panel-type input display unit. As the input unit 16, a reading unit such as a barcode reader in addition to a keyboard and a mouse may be connected. The reading unit can read, for example, a barcode which is attached to an exterior portion for a detection reagent and in which information of the detection reagent and the like are registered.

In the control unit 100, a program according to the present disclosure is previously stored in the auxiliary storage unit 13 in, for example, an execute form (for example, generated by conversion from a programming language by a complier) in order to perform process steps of assisting in quality control described below, and the processing unit 10 performs processing by using the program stored in the auxiliary storage unit 13.

The processing unit 10 temporarily stores necessary data (intermediate data being processed, and the like) by using the memory 12 as a work area, and stores data such as calculation results to be saved for a long time, as appropriate, in the auxiliary storage unit 13.

[Configuration of Particle Analyzer]

The measurement unit 200 includes a suction unit 21, a fluid circuit 22, and a measurement section 23. In the measurement unit 200, the measurement sample 29 stored in the sample container 28 is suctioned by the suction unit 21, the suctioned measurement sample 29 is transported by the fluid circuit 22, and the transported measurement sample 29 is measured by the measurement section 23.

In the present embodiment, the control unit 100 doubles as a controller for the measurement unit 200. That is, optical information obtained through the measurement by the measurement section 23 is transmitted to the control unit 100, and the control unit 100 performs analysis for the number of particles and each antigen based on the optical information transmitted from the measurement section 23. In the control unit 100, a computer program, by which a process procedure for controlling the measurement unit 200 and a process procedure for measuring a measurement value transmitted from the measurement section 23 are specified, is previously stored in the auxiliary storage unit 13 described below. The control unit 100 controls the measurement unit 200 by causing the processing unit 10 described below to execute the computer program.

The suction unit 21 is, for example, a nozzle capable of suctioning and discharging a measurement sample or the like. The fluid circuit 22 is a flow path for fluid and the fluid is transported by, for example, a syringe pump. The particle analysis system 1000 is, for example, a flow cytometer. The particle analysis system 1000 is preferably a multicolor flow cytometer. The flow cytometer optically measures a sample by a flow cytometry method. Hereinafter, an exemplary case where the particle is a cell, and a detection reagent contains an antibody by which a target molecule in the cell is detected, will be described.

Figure 4:
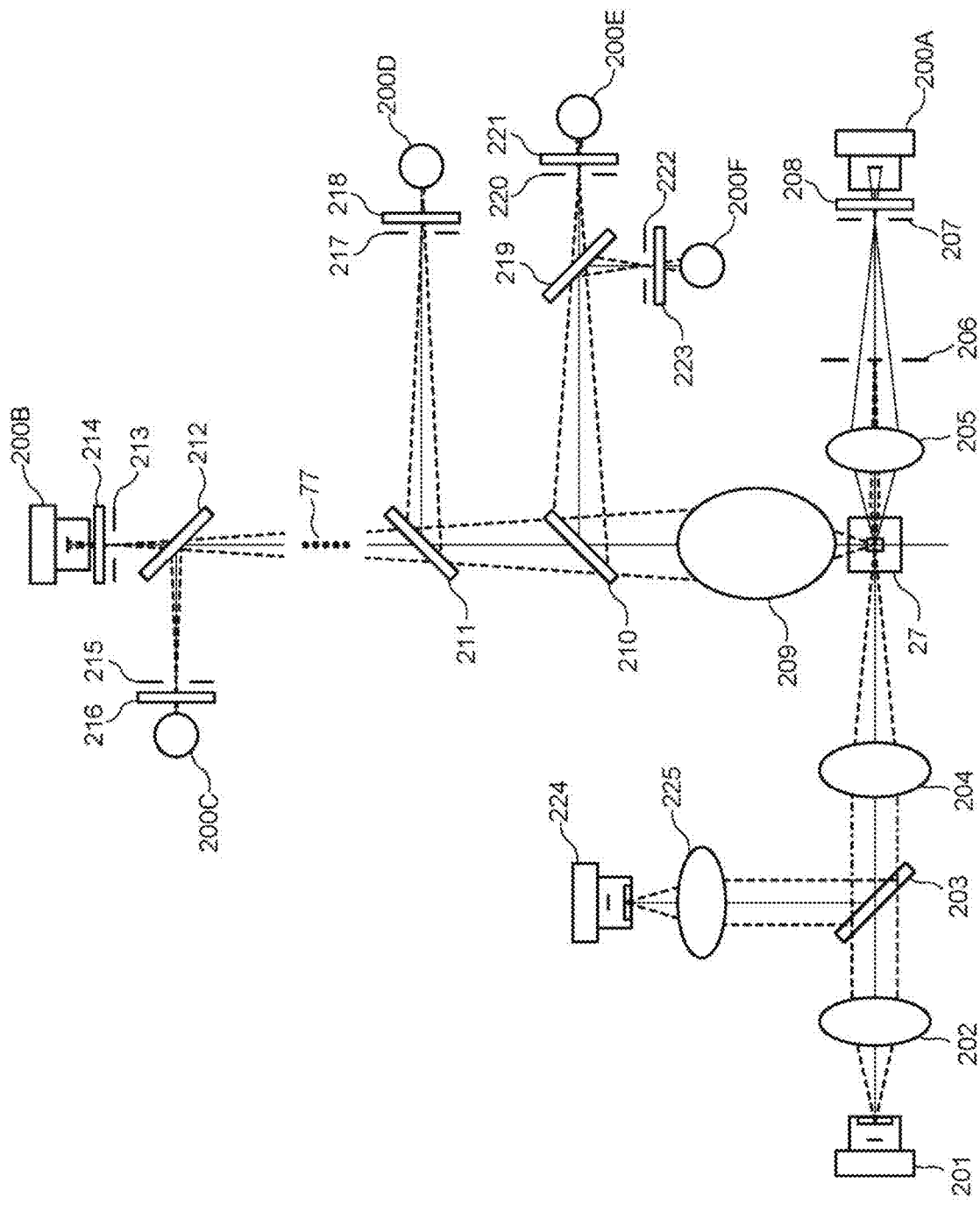
FIG. 4 illustrates an example of a configuration of a measurement section.

The number of light receiving elements (for example, photomultiplier tubes), of the measurement section 23, for detecting fluorescence is determined according to the number of fluorescent dyes which can be handled by the measurement unit 200. For example, when the measurement unit 200 can handle 10 colors of fluorescent dyes in one assay, the measurement unit 200 includes 10 light receiving elements for measuring fluorescence in total in the measurement section 23. Hereinafter, an optical system of the flow cytometer will be described with reference to FIG. 4 according to an exemplary case where a plurality of fluorescences are simultaneously measured. In FIG. 4, a dotted line represented by reference numeral 77 indicates that the light receiving elements which are actually disposed are omitted.

FIG. 4 shows an example of the optical system of the flow cytometer as an example of the measurement section 23. The flow cytometer includes a cell 27 that receives a cell-containing liquid that contains a cell in a measurement sample, light sources 201 and 224 for applying light to the cell that passes through the cell 27, and light receiving elements 200A to 200F each of which performs detection to obtain optical information of light derived from the cell, and outputs a detection signal which has been converted to an electrical signal. In practice, the number of the light sources is not two but three. However, for convenience of description, the light sources 201 and 224 are described as an example. In the following description for the flow cytometer shown in FIG. 4, an exemplary case where the measurement sample 29 is a mixture of blood and an antibody reagent will be described.

The cell preferably emits one or more lights when predetermined light is applied thereto. The lights emitted from the cell when the predetermined light is applied thereto are generically referred to as light derived from the cell. The light derived from the cell includes scattered light, luminescence, and the like. The light derived from the cell may have any wavelength. However, the light derived from the cell preferably has a peak wavelength in a range of 350 nm to 850 nm. More specifically, the light derived from the cell is preferably fluorescence. The light derived from the cell may be light emitted from a substance itself contained in the cell. Alternatively, the light derived from the cell may be detected as light emitted by the fluorescent dye contained in the detection reagent described above for analysis of the cell. Furthermore, the light derived from the cell preferably has a different peak wavelength for each antigen. In the first embodiment, fluorescence derived from the cell is derived from a fluorescent dye with which each antibody contained in the detection reagent is labelled.

The cell-containing liquid is liquid that contains a measurement sample suctioned from a sample into the flow cytometer, and includes a diluent as appropriate. The optical information is information that is included in one or more light wavelength spectrums emitted from the cell. The light wavelength spectrum includes: individual light wavelengths included in the light wavelength spectrum; light wavelength regions; and the intensities of lights having the respective light wavelengths or the intensities of lights in the respective light wavelength regions. The individual light wavelength and the light wavelength region can be specified by determining one light receiving element, among at least one light receiving elements described below, which has received light. The intensity of light having each light wavelength or the intensity of light in each light wavelength region can be specified by an electrical signal outputted by the light receiving element having received the light.

An exemplary case where the light derived from the cell is scattered light and fluorescence will be specifically described below. Light emitted from the light source 201 is applied to the cell 27 through a collimator lens 202, a dichroic mirror 203, and a condenser lens 204. Forward scattered light, of the light derived from the cell, which passes through the cell 27 is condensed by a condenser lens 205, and is incident on the light receiving element 200A through a beam stopper 206, a pinhole plate 207, and a band-pass filter 208.

Meanwhile, side scattered light and side fluorescence, of the light derived from the cell, which pass through the cell 27 are condensed by a condenser lens 209. The side scattered light is incident on the light receiving element 200B through dichroic mirrors 210, 211, 212, a pinhole plate 213, and a band-pass filter 214. The side fluorescence having a wavelength of not less than 520 nm and not greater than 542 nm is transmitted through the dichroic mirrors 210 and 211, is reflected by the dichroic mirror 212, and is incident on the light receiving element 200C through a pinhole plate 215 and a band-pass filter 216. The side fluorescence having a wavelength of not less than 570 nm and not greater than 620 nm is transmitted through the dichroic mirror 210, is reflected by the dichroic mirror 211, and is incident on the light receiving element 200D through a pinhole plate 217 and a band-pass filter 218. The side fluorescence having a wavelength of not less than 670 nm and not greater than 800 nm is reflected by the dichroic mirror 210, is transmitted through a dichroic mirror 219, and is incident on the light receiving element 200E through a pinhole plate 220 and a band-pass filter 221.

Light emitted from the light source 224 is applied to the cell 27 through a collimator lens 225, the dichroic mirror 203, and the condenser lens 204. The side fluorescence, of the light derived from the cell, which passes through the cell 27 is condensed by the condenser lens 209. The side fluorescence having a wavelength of not less than 662.5 nm and not greater than 687.5 nm is reflected by the dichroic mirror 210 and reflected by the dichroic mirror 219, and is thereafter incident on the light receiving element 200F through a pinhole plate 222 and a band-pass filter 223.

In the example shown in FIG. 4, a laser diode having a wavelength of 488 nm is used for the light source 201, and a laser diode having a wavelength of 642 nm is used for the light source 224. A sheath flow cell is used for the cell 27. A photodiode is used for the light receiving element 200A for receiving the forward scattered light. An avalanche photodiode (APD) is used for the light receiving element 200B for receiving the side scattered light. A photomultiplier tube (PMT) is used for each of the light receiving elements 200C to 200F for receiving the side fluorescence.

Thus, in the flow cytometer shown in FIG. 4, for convenience of description, the number of the light receiving elements for receiving the side fluorescence is four (light receiving elements 200C to 200F). However, the number thereof is 10 in practice. The flow cytometer in this example includes four light receiving elements for detecting fluorescence, and can simultaneously measure four colors of fluorescences in one assay. However, in practice, the flow cytometer includes 10 light receiving elements for detecting fluorescence, and can simultaneously measure 10 colors of fluorescences in one assay.

A detection signal outputted from each of the light receiving elements 200A to 200F is amplified by an amplifier circuit (not shown), and is subjected to A/D conversion to digital data by an A/D converter (not shown). According to the present embodiment, the detection signal having been converted to the digital data is transmitted to the control unit 100 to analyze the cell. The amplifier circuit is, for example, a known amplifier circuit implemented by an operational amplifier or the like.

The number of the light sources may be one or more. The flow cytometer preferably has at least three light sources mounted thereto. The light source is selected according to a wavelength region of the light derived from the cell. When the number of the light sources is not less than two, the light sources preferably emit lights having different peak wavelengths.

The number of each of the photodiodes, the dichroic mirrors, and the band-pass filters can be changed according to the number of the peak wavelengths of the light derived from the cell. The kind of each of the photodiode, the dichroic mirror, and the band-pass filter can be also selected according to the peak wavelength or the wavelength region of the light derived from the cell, and the intensity thereof.

The control unit 100 operates to transmit, to the measurement section 23, information about a detection sensitivity in the case of the measurement section 23 detecting the scattered light and the fluorescence, information about fluorescence correction according to a combination of the detected fluorescences, and information about gating for selecting a distribution region for a cell to be detected. The control unit 100 controls the measurement section 23 based on the information such that appropriate optical information can be obtained according to the antigen.

[Outline of Operation of Control Unit]

In the control unit 100, for example, the processing unit 10 obtains a test request which is necessary for a doctor to determine whether or not a patient suffers from a disease (for example, leukemia). A user prepares the measurement sample 29 according to a plurality of measurement items corresponding to the received test request, and sets the measurement sample 29 in the measurement unit 200. Thereafter, according to input, from the user, of an instruction for staring the measurement, the measurement unit 200 measures each target molecule according to a process procedure for analyzing a cell as described below.

[Client Terminal]

The particle analyzer 1000 and the client terminal 300 may be connected to each other via the network 99. For example, a test request from a doctor is transmitted through the client terminal 300 to the particle analyzer 1000 via the network. The client terminal 300 is implemented by, for example, a general-purpose computer that includes a processing unit and a memory. A specimen to be tested is separately delivered to a user. The client terminal 300 transmits the inputted test request to the control unit 100. The particle analyzer 1000 may transmit a measurement result to the client terminal 300.

[Method for Assisting in Quality Control and Quality Control Method]

The present disclosure relates to assisting in quality control for cell analysis performed by the particle analyzer 1000. Firstly, the outline of the quality control will be described.

(Outline of Quality Control and Effect of Method for Assistance)

The quality control includes internal quality control for controlling accuracy of analysis in each clinical laboratory, and external quality control for controlling accuracy of analysis among a plurality of independent clinical laboratories. The present disclosure relates to internal quality control. In the present disclosure, the "quality control" or simply called "QC" represents internal quality control.

The quality control for particle analysis is performed in order to monitor reproducibility and variation in analysis. The quality control includes quality control (device quality control or device QC) for the analyzing performance of the measurement unit 200 itself, and quality control (test item quality control), of a test item, in which the quality of a detection reagent and a measurement sample preparation method are controlled. In the present disclosure, the quality control is preferably test item quality control.

The method for assisting in quality control will be described below by using, as an example, cell analysis in which the flow cytometer is used as the measurement unit 200 and a detection antibody is used as a detection reagent.

In general, when the device QC is performed, a control sample (device control sample), for device quality control, which includes, for example, a fluorescent bead corresponding to a fluorescence wavelength measured by the measurement unit 200 is used. Specifically, when the measurement unit 200 is started up, it is preferable that such a device control sample is firstly measured to confirm that the detection system for the measurement unit 200 is operating normally. The result of the device quality control is preferably stored in the auxiliary storage unit 13 such that a date when the quality control is performed, and the history of the quality control with the contents of the abnormality, if any, are stored each time the device quality control is performed.

Next, test item quality control corresponding to a test item is performed. In general, the test item is written on a test request sheet or the like, and the test item corresponds to, for example, a kind of a particle to be tested. When the test is performed for the test item, the measurement unit 200 measures, as the detection items, a plurality of target molecules corresponding to the kinds of the particles. For example, the test item (for each cell type) is a CD4-positive T-cell, and the detection item (kind of target molecule) that satisfies the request is CD3 and CD4 that are surface antigens on a T cell. The test item quality control is preferably performed for each test item, and all the detection items included in each test item are preferably performed. Therefore, the test item quality control is preferably performed by using a control sample (test item control sample) which is prepared by using a detection reagent similar to a detection regent used when a measurement sample is prepared from a specimen, with the use of a cell of the same cell type as the cell type of the test item or a cell similar thereto, so as to satisfy the test request. The test item quality control is preferably performed prior to measurement of the measurement sample. The result of the test item quality control is preferably stored in the auxiliary storage unit 13 such that a date when the quality control is performed and the history of the quality control with the contents of the abnormality, if any, are stored each time the test item quality control is performed.

The device quality control and the test item quality control described above are performed at least once on, for example, a day on which the measurement is performed, when the device is started up or before a measurement sample is measured. Therefore, the device quality control and the test item quality control may be each referred to as daily QC.

In the present disclosure, the device control sample and the test item control sample may be collectively referred to as a control sample. When the device control sample is obtained from a provider of the control sample or a provider of the particle analyzer 1000, information indicating, for example, a measurement condition for the device control sample in the particle analyzer 1000 is also provided in general. Meanwhile, even if the test item control sample is obtained from a provider, information indicating a measurement condition for the test item control sample is not provided in many cases. In particular, when the particle analyzer 1000 is a multicolor flow cytometer, information indicating a measurement condition for the test item control sample is not provided.

The kinds of control samples provided by control sample providers or particle analyzer providers are limited. The test item control sample according to a test request may not be constantly obtained on a commercial basis. In such a case, a control sample, in particular, a test item control sample needs to be prepared in each clinical laboratory.

Therefore, a user needs to particularly set the measurement condition of the test item control sample and/or an evaluation criterion for the quality control, in each clinical laboratory.

To date, the device quality control has been managed by the control unit 100 of the particle analyzer 1000. Meanwhile, the results of the quality control using the test item control samples have not been managed by a system for managing the particle analyzer 1000. Therefore, in each clinical laboratory, the results of the quality control using the test item control samples need to be managed by a system different from the system for controlling the particle analyzer 1000.

In the present disclosure, the control unit 100 for controlling the particle analyzer 1000 can perform setting of conditions for the quality control using the test item control sample, and management of results, of the quality control, which are obtained by measurement performed under the set conditions. In other words, an evaluation criterion used for the quality control using the test item control sample, is inputted to the control unit 100, and the result of the performed quality control is displayed on an application screen of the particle analyzer 1000 based on the inputted evaluation criterion.

(Method for Assisting in Quality Control)

Figure 2:
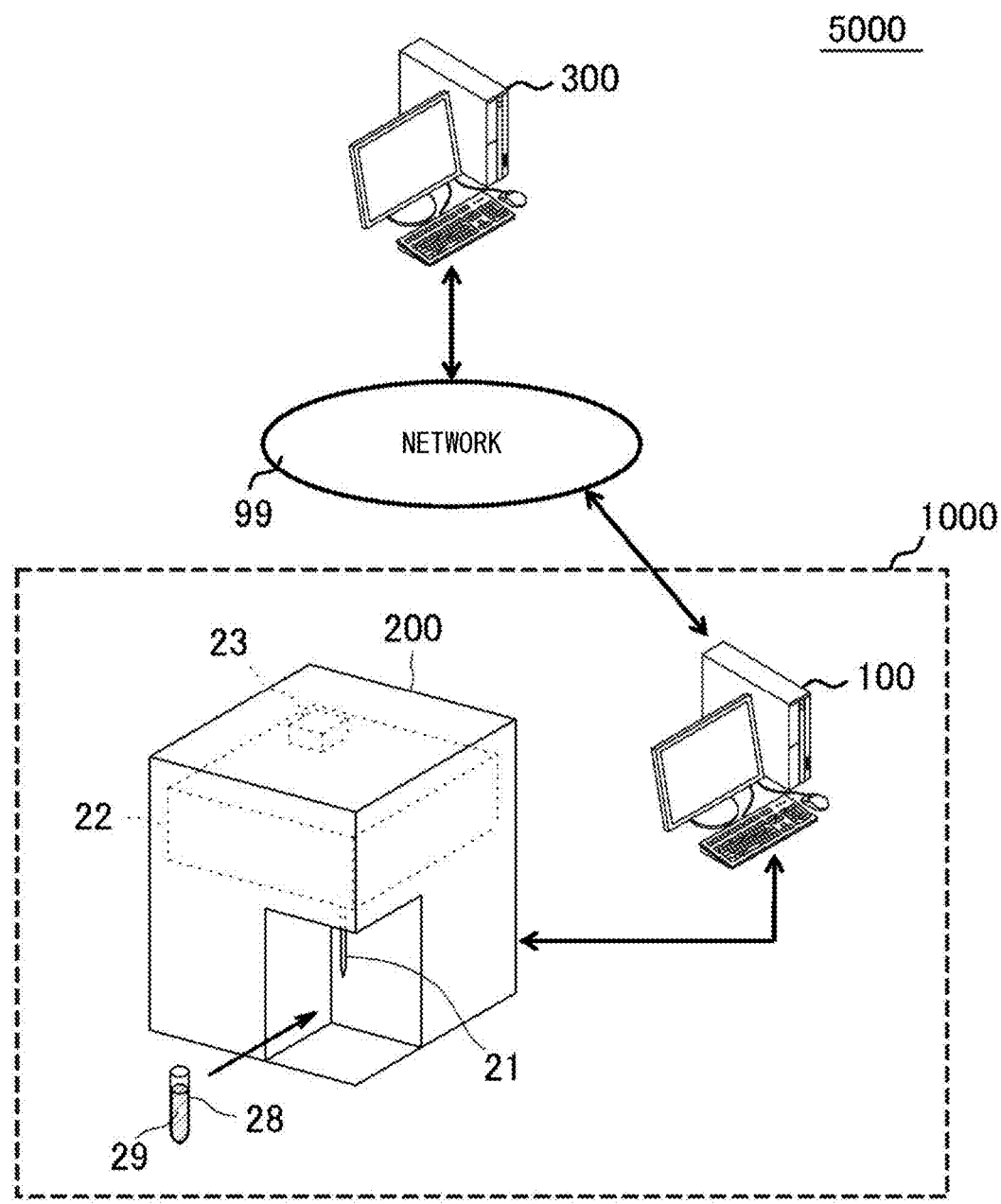
FIG. 2 is a schematic diagram illustrating a measurement system.
Figure 5:
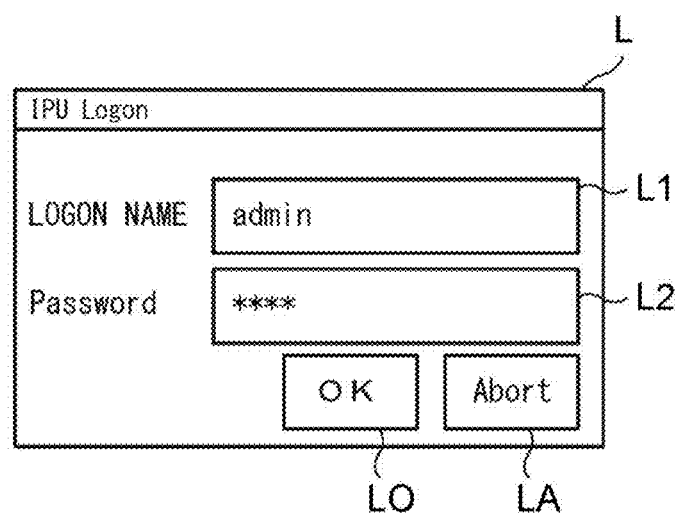
FIG. 5 illustrates an example of display on a log-on screen.

In step S1 in FIG. 1, when an instruction from a user for performing a starting-up process is inputted to the control unit 100 (for example, staring-up of application software for performing particle analysis), the processing unit 10 displays a log-on screen L shown in FIG. 5. The processing unit 10 receives, for example, input of an ID and a password of a user through the log-on screen, and displays a main screen B shown in FIG. 6 on the output unit (display unit) 17.

Firstly, the main screen B shown in FIG. 6 and each process for assisting in the quality control will be described. Each screen serves as a user interface for receiving input from a user in order to assist in the quality control. The "input region" used in the following description is a region that allows input of necessary information when a user inputs characters through the input unit. The "icon" is a selection region for displaying a screen on which a process for an operation designated by a user is performed when the user selects the region. The user is allowed to select the icon by operating the input unit 16. The "pull-down list" is a list that allows a user to select each item displayed on the list in which options, to be selected, having already been stored in the memory 12, the auxiliary storage unit 13, or the like are indicated in the form of a list, when the user selects the region by using the mouse or the touch panel.

Main Screen

Figure 6:
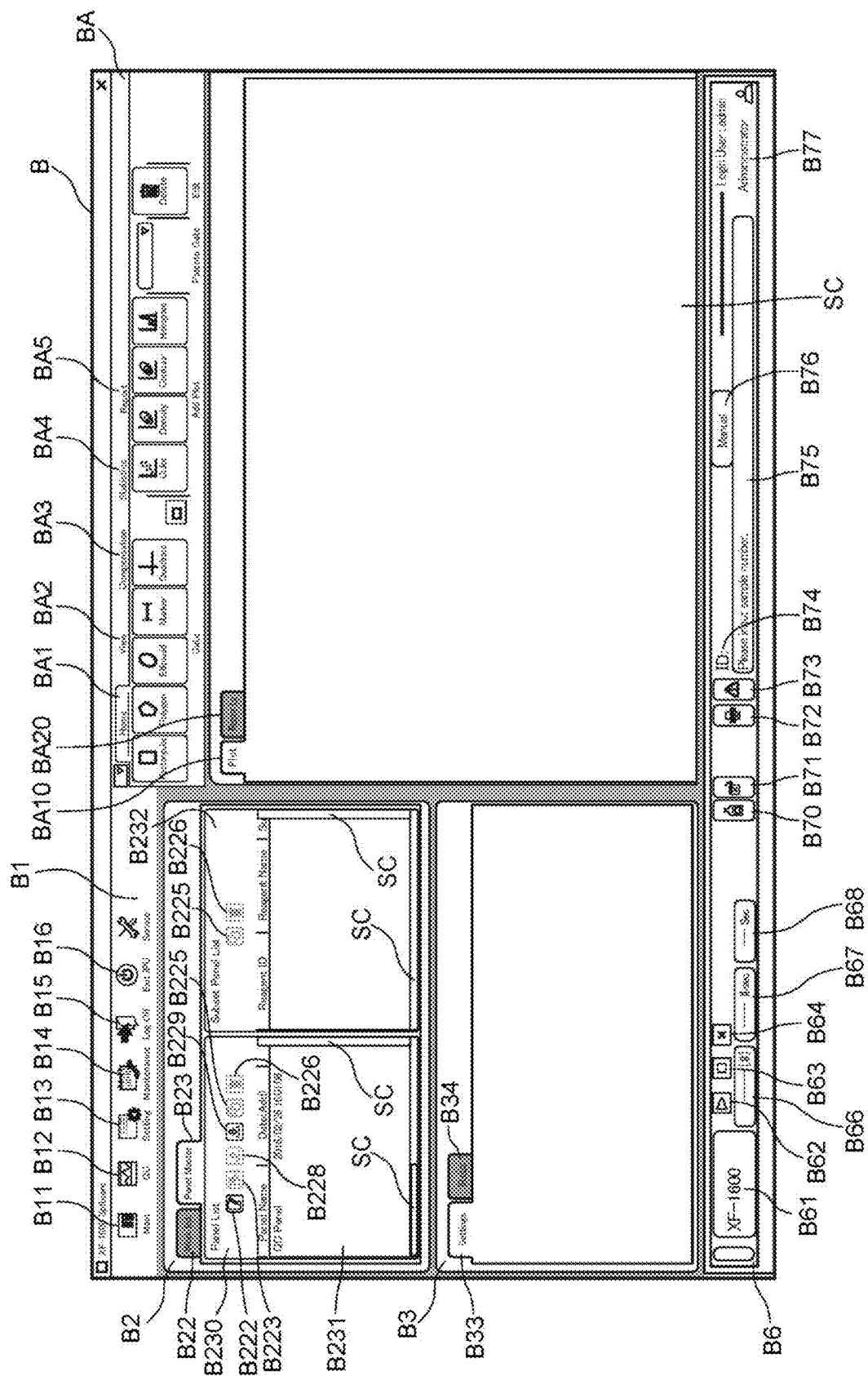
FIG. 6 illustrates an example of display on a main screen.

FIG. 6 illustrates the main screen B on which an operation for controlling the particle analyzer 1000 is performed. The main screen B is a screen displayed when the control unit 100 is started up to start an application for controlling the particle analyzer 1000. The main screen B includes a main operation region B1, a work list region B2, a particle analysis condition setting region B3, an analysis state display region BA, and an analysis operation region B6.

In the main operation region B1, a main icon B11 for displaying a main operation region, a QC icon B12 for displaying a quality control region, a setting icon B13 for displaying the particle analysis condition setting region B3, a maintenance icon B14 for displaying a maintenance region, and a log-off icon B16 used when a user logs off from the main screen, are displayed. The computer program for assisting in quality control according to the present disclosure can be accessed by using the QC icon B12.

In the work list region B2, a work list tab B22 for displaying a list of measurement samples for measurement, and a panel master tab B23 for setting a test item for which each measurement sample is measured are selectively displayed.

In the particle analysis condition setting region B3, a setting tab B33 for setting a measurement condition, and a stop tab B34 for operation for stopping the analysis are selectively displayed.

In the analysis state display region BA, a home tab BA1 for displaying light received from a measurement sample in real time or displaying the light as a recorded image, and tabs BA2 to BA5 for other operations are selectively displayed. In the home tab BA1, for example, a plot tab BA10 for plotting, as a dot plot, the light received from the measurement sample, and a report tab BA5 for displaying a result are selectively displayed.

In the analysis operation region B6, a measurement apparatus state display region B60 for operating the measurement unit 200, a measurement apparatus name display region B61, a measurement start icon B62, a measurement stop icon B63, a measurement erasing icon B64, regions B66 to 68 for displaying the number of measured particles and a measurement time, an icon B70 for displaying a remaining amount of a reagent, an icon B71 for displaying a waste fluid state, an icon B72 for indicating a state of the printer, an error display icon B73, a measurement sample information input region B74, a message display region B75, a measurement mode display region B76, and a user information display region B77, are displayed.

An operation screen, described below, including the main screen is displayed when, for example, the processing unit 10 executes application software stored in an auxiliary storage unit 13, or the like.

Device QC Setting Process

The processing unit 10 performs a device QC setting process in step S2 shown in FIG. 1. An example of the device QC setting process will be described below. For example, the processing unit 10 receives selection of the QC icon B12 on the main screen B, as shown in FIG. 6, for operation of allowing a user to control the particle analyzer 1000 in order to allow the user to set a management condition for measurement data of a control sample (step S101 shown in FIG. 7). As shown in FIG. 8, instead of the work list region B2, a QC file list region BQC0 and a subset panel list display region BQC3 are displayed. In the QC file list region BQC0, a QC file operation region BQC1 for operation for a QC file and a list display region BQC2 for displaying a list of the QC files are displayed. In the QC file operation region BQC1, for example, a QC icon X1 for a QC file, in the list display region BQC2, selected by a cursor, a setting icon X2 for performing setting of the QC file, a device QC file registration icon X3 for registering a new QC file, a subset panel selection icon X4, and a deletion icon X5 are displayed. The QC files correspond to the respective test items (panels). In the subset panel file region BQC3, a list BQC4 for displaying subset panels included in each panel selected by a cursor or the like in the list display region BQC2 is displayed.

Figure 7:
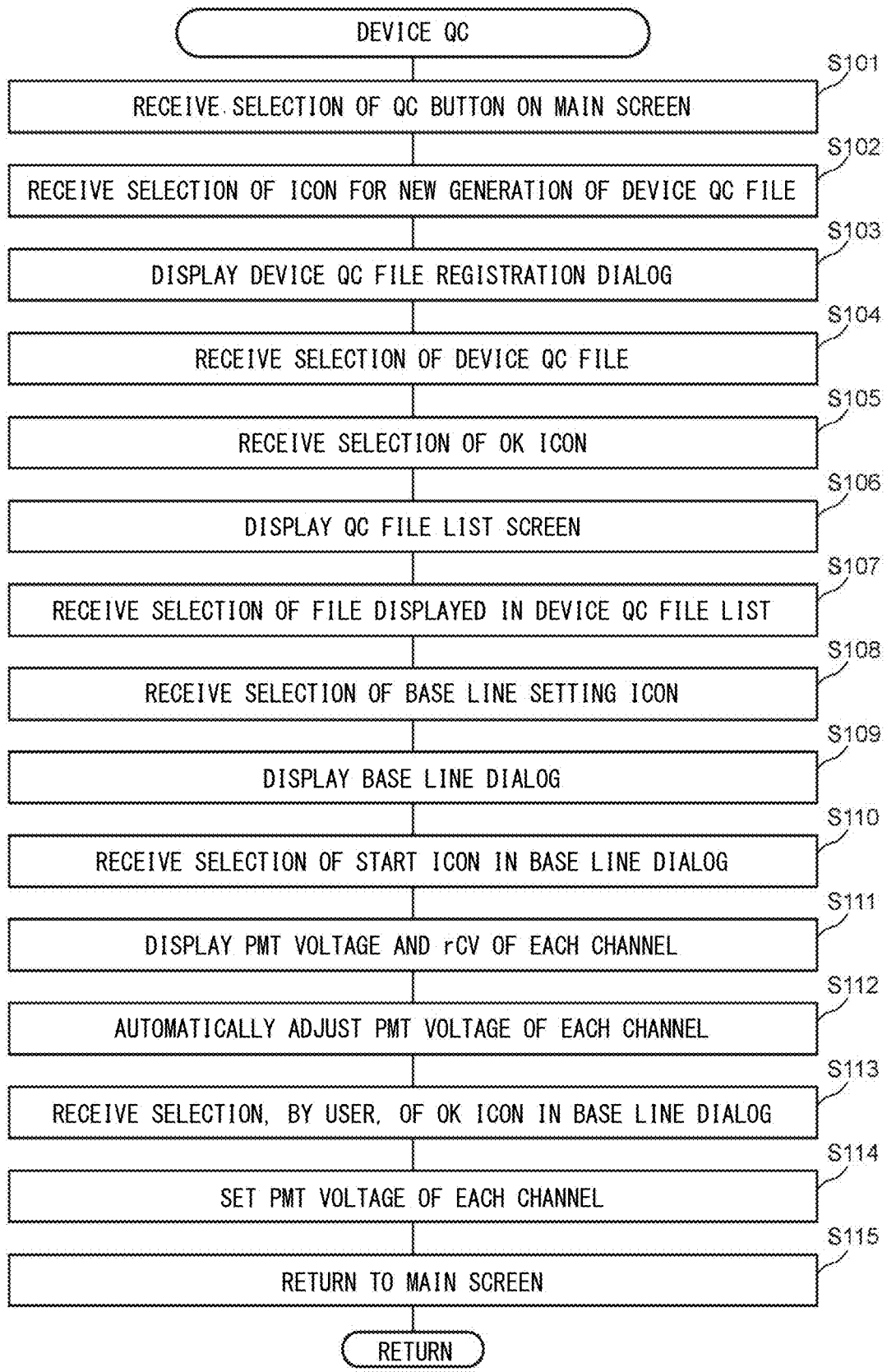
FIG. 7 shows an example of a flow chart for a device QC setting process.
Figure 8:
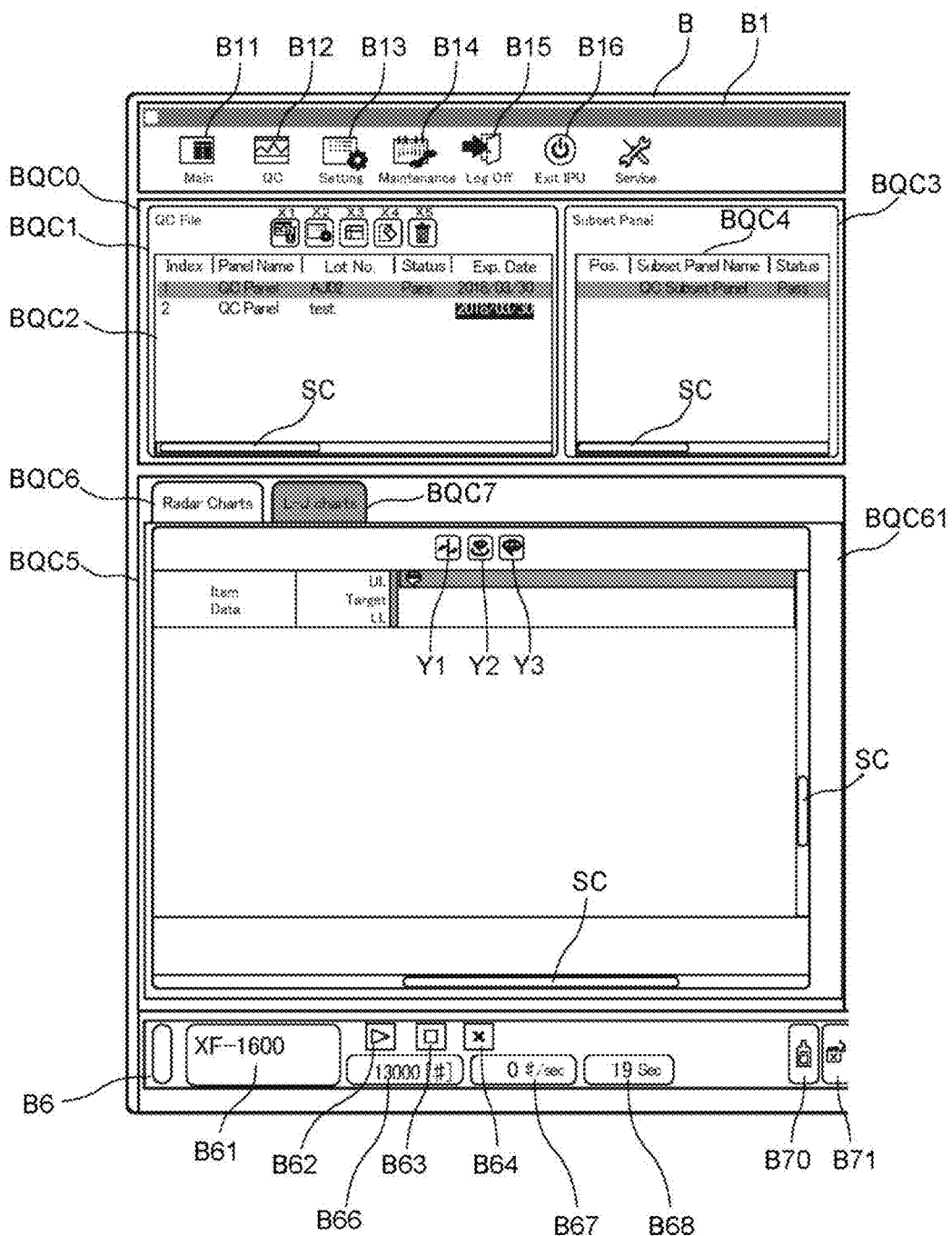
FIG. 8 shows an example of display on a quality control setting screen.

In step S101 shown in FIG. 7, the processing unit 10 displays a region BQC5 for indicating a measurement result of a control sample instead of the particle analysis condition setting region B3 as shown in FIG. 8. In the region BQC5, a radar chart tab BQC6 for displaying a measurement result for each channel, and an L-J chart tab BQC7 for chronologically displaying the measurement result for each channel are selectively displayed.

Figure 9:
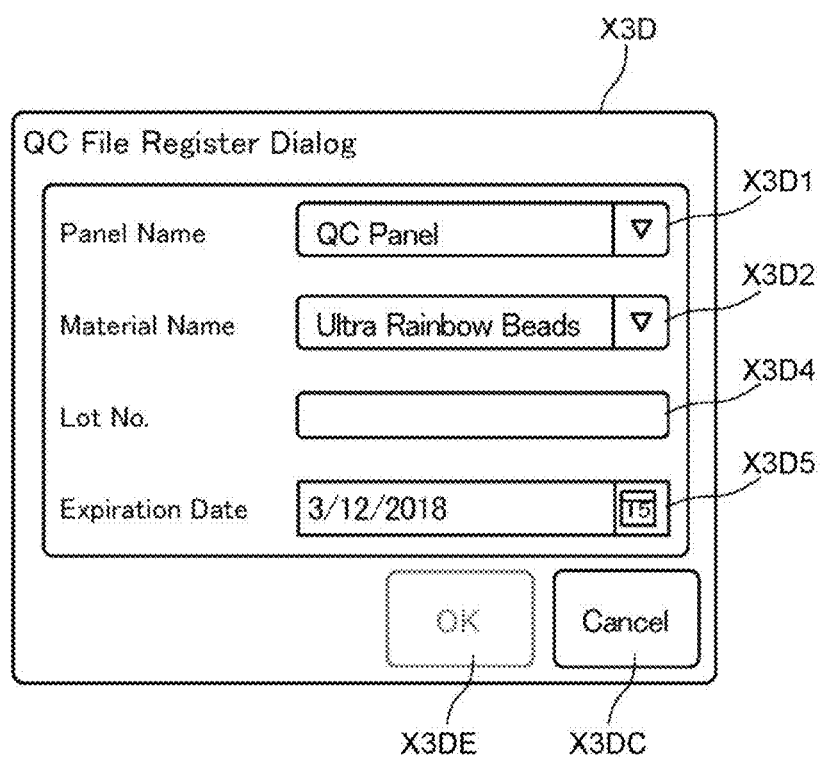
FIG. 9 shows an example of display on the quality control setting screen.

In FIG. 7, when the processing unit 10 receives selection of the icon X3 from the user in step S102, a device QC file dialog shown in FIG. 9 for setting a management condition for measurement data of a new control sample is displayed (step S103).

A device QC file registration dialog X3D is displayed. In the device QC file registration dialog X3D, for example, a pull-down list region X3D1 for selection of a panel name indicating that the QC file is for a device, a pull-down list region X3D2 for selection of a device control sample name, a region X3D4 for input of a lot number of the device control sample, a region X3D5 for input of an expiration date of the device control sample, a determination (OK) icon X3DE for determining input to proceed to the next step, and a cancel icon X3DC for stopping the setting, are displayed.

Figure 10:
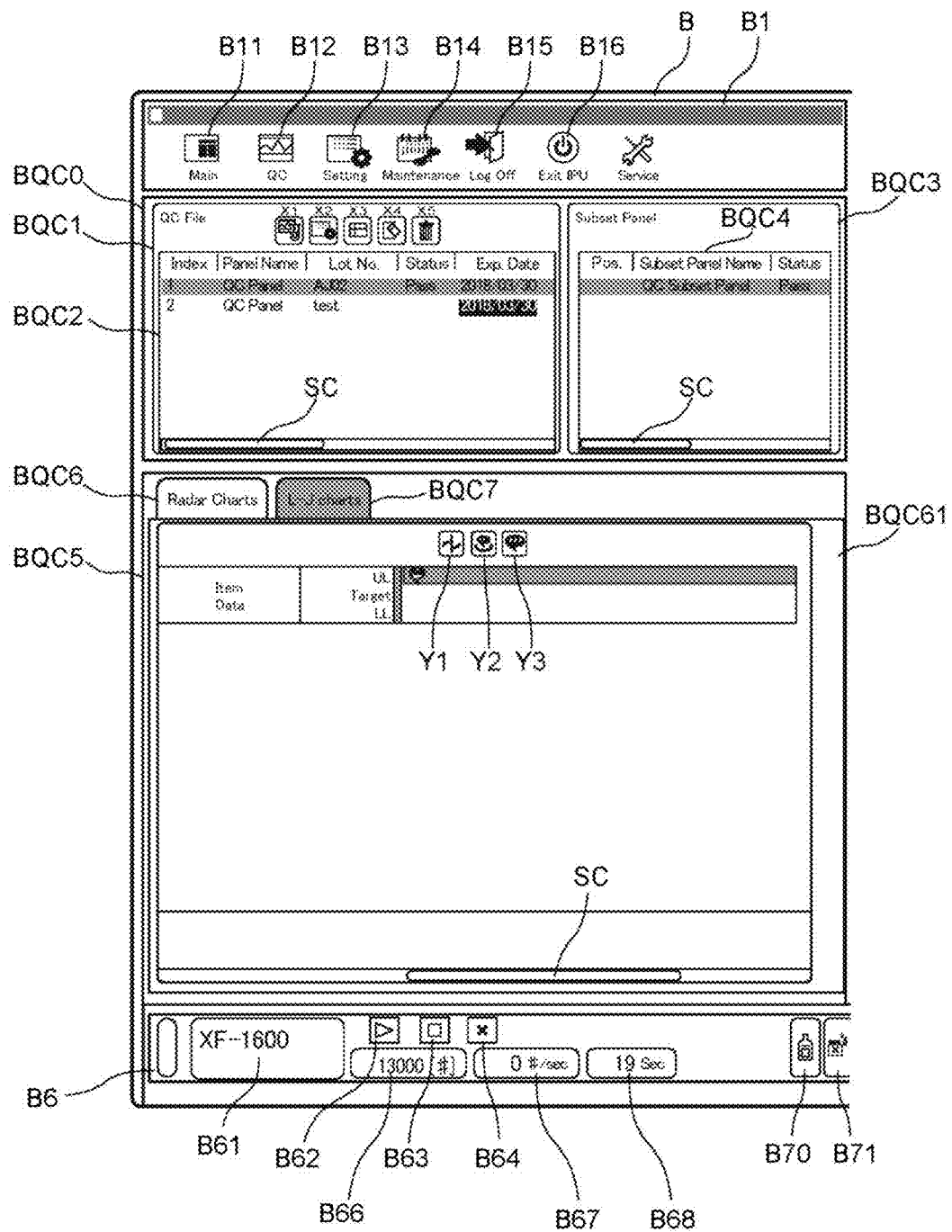
FIG. 10 shows an example of display on the quality control setting screen.

The processing unit 10 receives, for example, selection in the pull-down list region X3D1 from a user in step S104. The processing unit 10 receives input of the lot number of the device control sample into the region X3D4 from the user and/or input of the expiration date of the device control sample into the region X3D5 as appropriate. Subsequently, the processing unit 10 stores input contents inputted into the device QC file registration dialog X3D by selection of the determination (OK) icon X3DE by the user in step S105, and the processing unit 10 closes the device QC file registration dialog X3D. The display of the screen is returned to the main screen B for displaying the QC file BQC0 shown in FIG. 10 (step S106).

The processing unit 10 selects a QC file to be set by the user specifying a QC file listed in the device QC file list BQC2 in step S107 (step S107), and receives instruction for setting a QC file by the user selecting the setting icon X2 in order to set a base line (step S108).

Figure 11:
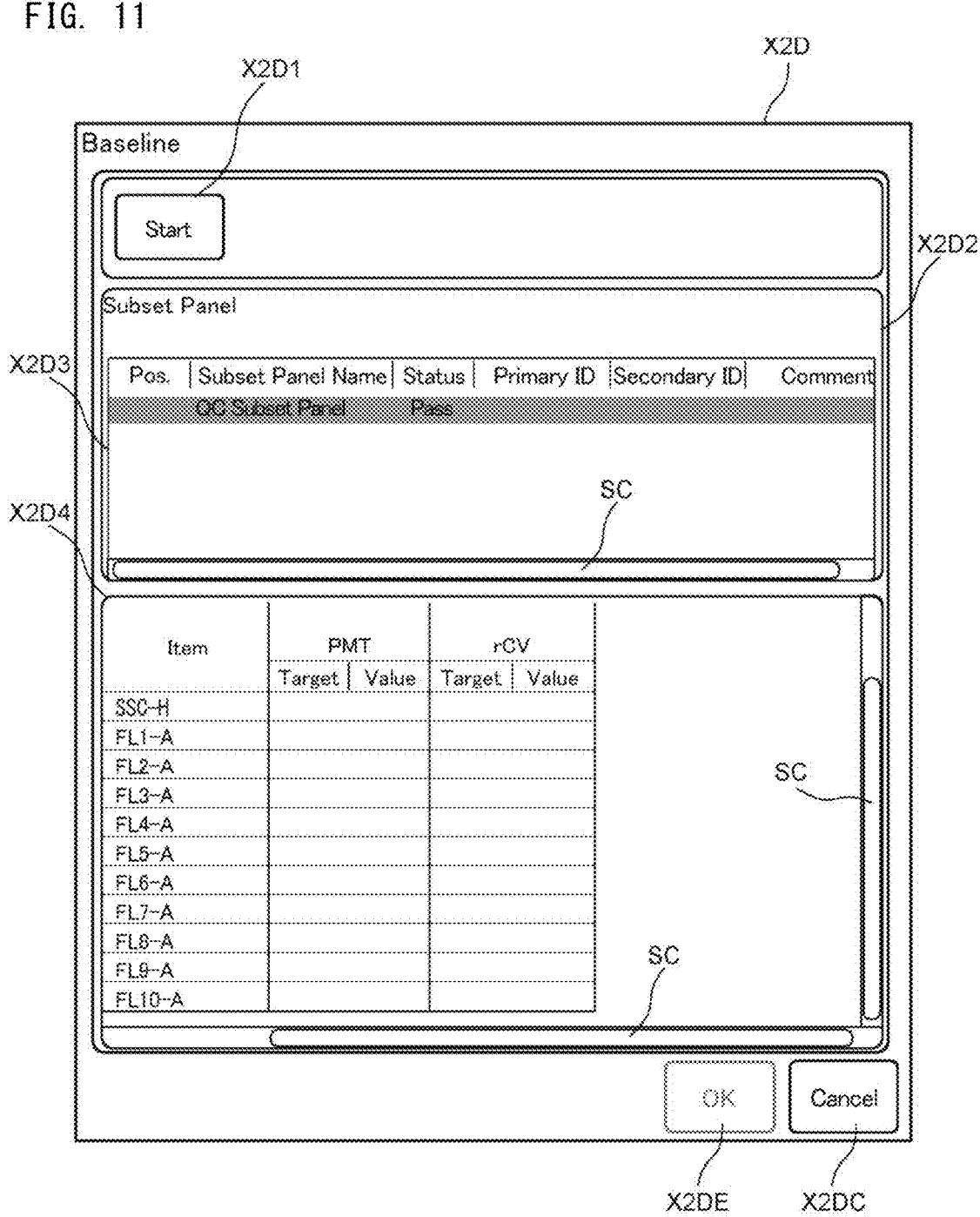
FIG. 11 shows an example of display on the quality control setting screen.

The processing unit 10 subsequently displays a base line dialog X2D (FIG. 11) for setting a base line (step S109). In the base line dialog X2D, a start icon X2D1 for starting measurement, a subset panel list display region X2D2, a light receiving element status display region X2D4, a determination (OK) icon X2DE for determining input to proceed to the next step, and a cancel icon X2DC for stopping the setting are displayed. A subset panel list X2D3 is displayed in the subset panel list display region X2D2. In the light receiving element status display region X2D4, a region for displaying voltages and dispersions (Rubust Coefficient Value: rCV) of the light receiving elements (PMT) is displayed for each channel (kind of received light). The region for the PMT voltage and rCV includes a region for displaying a target value (Target) and a region for displaying a measured value (Value). The light receiving elements for which the quality control is performed include the element for receiving fluorescence, the element for receiving forward scattered light (FSC), and the element for receiving side scattered light (SSC).

After or before a process step of step S109, the user prepares a device control sample and sets the device control sample in the suction unit 21 of the particle analyzer 1000.

Figure 12:
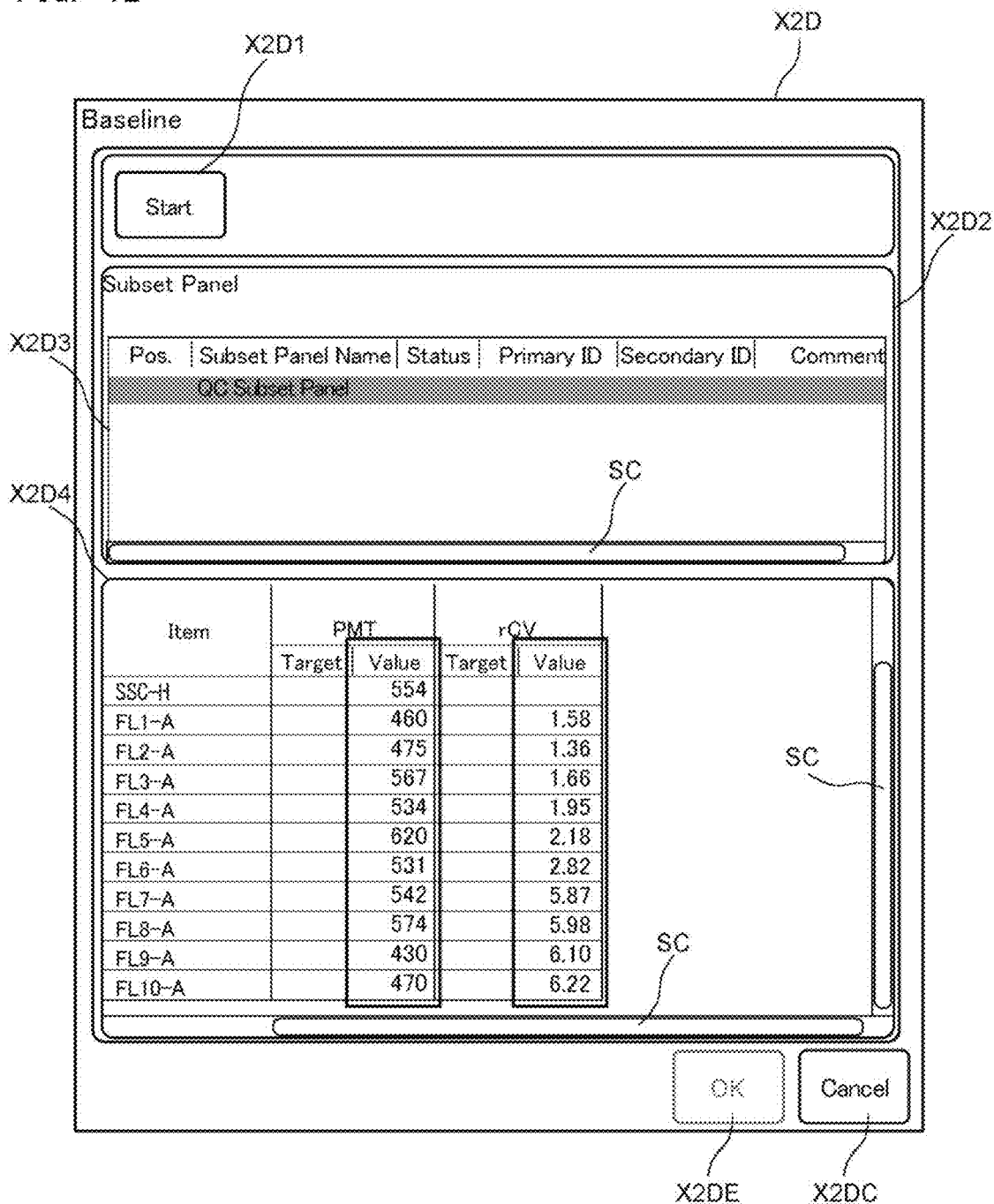
FIG. 12 shows an example of display on the quality control setting screen.

In step S110, the processing unit 10 receives selection, by the user, of the start icon X2D1 and starts measuring the device control sample. The processing unit 10 displays the PMT voltage and rCV, for each channel, of the control sample being measured, as shown in FIG. 12 (step S111). In the processing unit 10, the target values of the PMT voltage and rCV in the case of the control sample being measured by the measurement unit 200 are previously stored in the storage unit. Therefore, when the device control sample is measured, voltage to be applied to the light receiving element is automatically adjusted such that the measured value of the PMT voltage approaches the target value, preferably, the measured value ranges from about the target value −300V to about the target value +300V (step S112).

When the adjustment of the PMT voltage of the light receiving element has been ended for all the channels, the processing unit 10 automatically ends the measurement. When the measurement has been ended, the determination icon X2DE can be selected. The processing unit 10 receives selection of the determination icon X2DE that can be selected by the user (step S113), to store the PMT voltage value of each channel, and rCV calculated by the processing unit 10 as set values of the QC panel (step S114). The processing unit 10 ends the device QC setting process, closes the base line dialog X2D, and displays the main screen B for displaying the work list region B2 (step S115).

(Panel Registration Process)

According to the present disclosure, a test item QC setting process is performed in step S3 to step S6 shown in FIG. 1, that is, performed by operating a screen illustrated in FIG. 14 to FIG. 22, and FIG. 24, in order to assist in quality control using the control sample prepared in each clinical laboratory. That is, the test item QC setting process may include a panel registration process step S3, a quality control (QC) file registration process (step S4), and a base line setting process (step S5). Furthermore, the test item QC setting process may include a report generation process (step S6).

Test Item QC Setting Process

Panel Registration

Figure 13A:
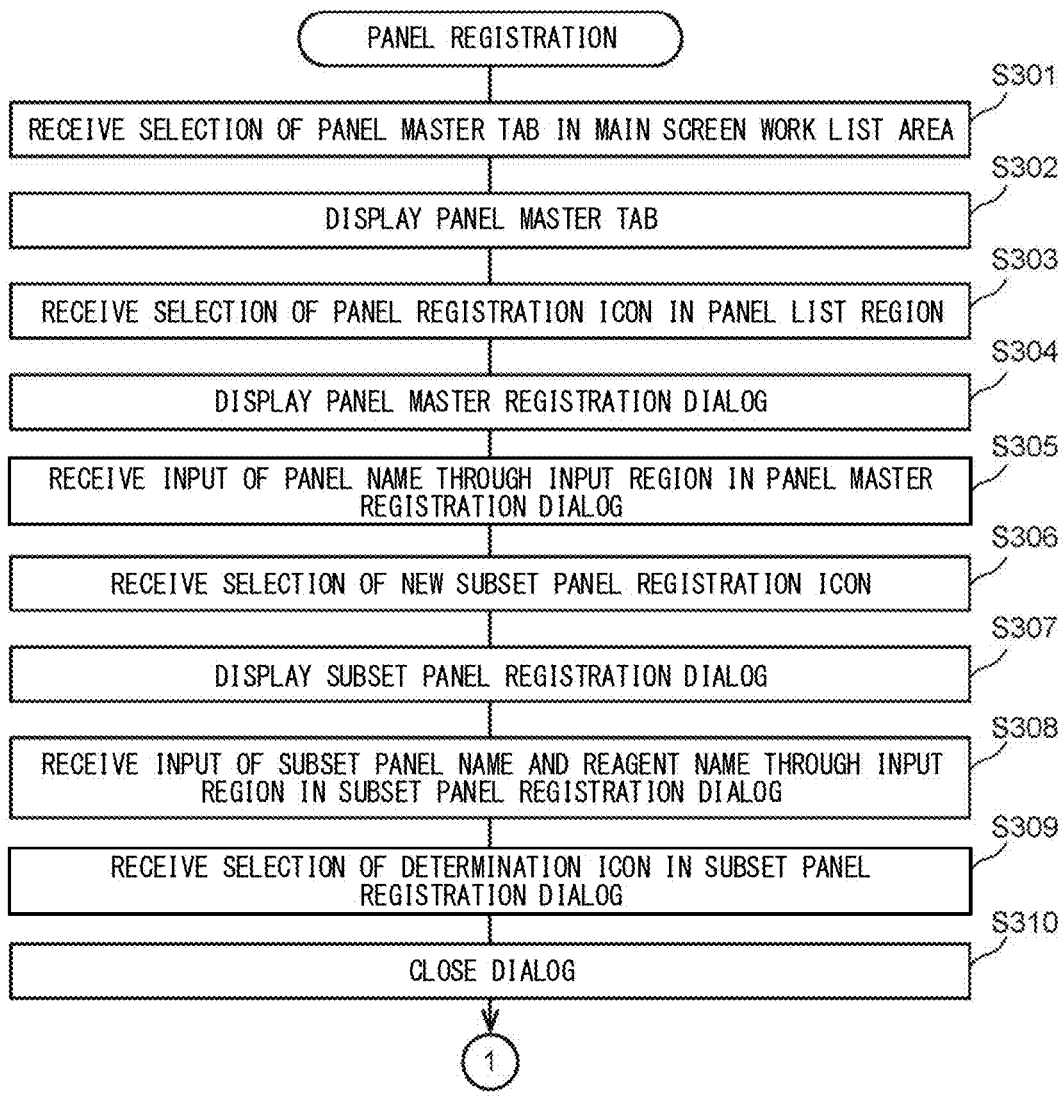
FIG. 13A shows an example of a flow chart for a panel registration process.

An example of the test item QC setting process will be described below. In the test item QC setting process, firstly, the processing unit 10 receives registration of a panel by a user. The processing unit 10 receives selection, by the user, of the panel master tab B23 displayed in the work list region B2 on the main screen B shown in FIG. 6 (FIG. 13A, step S301). The processing unit 10 displays the panel master tab B23 (FIG. 13A, step S302). When the panel master tab B23 has already been displayed, step S301 and step S302 may be skipped. In the panel master tab B23, as shown in FIG. 6, a panel list area B230 and a panel setting list B231 are displayed. The panel list area B230 includes, for example, a panel registration icon B222 to be selected when setting of a new test item QC is started, a panel rewrite icon B223 for rewriting the test item QC having already been registered, a copy icon B225 for copying the registered test item QC, a deletion icon B226 for deleting the registered test item QC, an import icon B228 for reading the registered test item QC, and an export icon B229 for writing out the test item QC. A subset panel list display region B232 is displayed next to the panel list area B230. When the user selects one of the panel settings listed in the panel setting list B231, a list of subset panels included in the panel setting is displayed in the subset panel list display region B232. In the subset panel list display region B232, a replication icon B225 for replicating the subset panel setting, and an elimination icon B226 for eliminating the setting are displayed.

Figure 14:
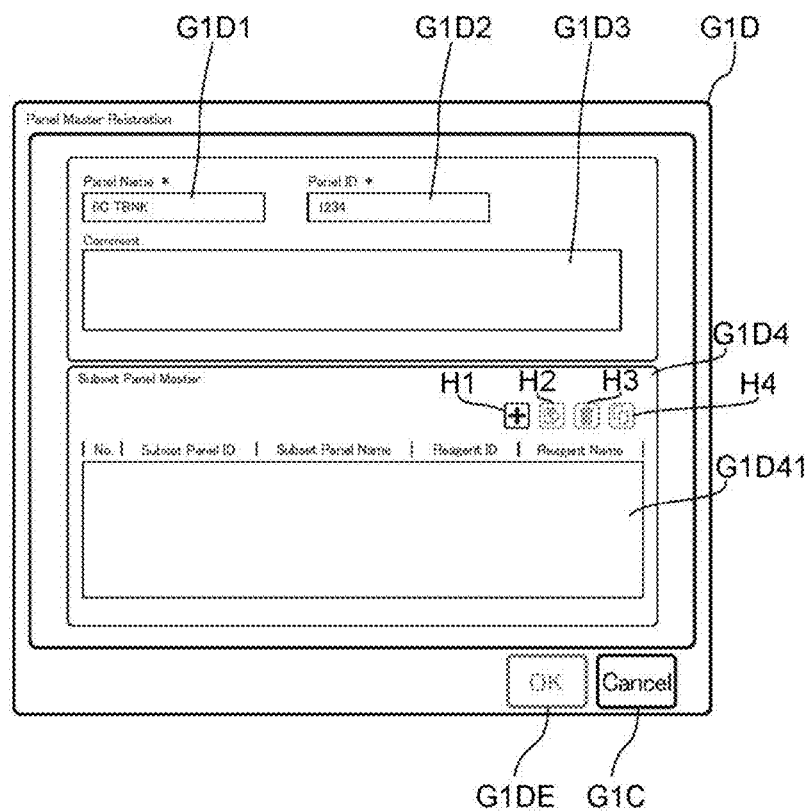
FIG. 14 shows an example of display on the quality control setting screen.

In step S303 shown in FIG. 13A, the processing unit 10 receives selection, by the user, of the panel registration icon B222 in the panel list area B230 to display a panel master registration dialog G1D shown in FIG. 14. In the panel master registration dialog G1D, a panel name input region G1D1 for inputting a test item name and the like, a panel ID input region G1D2 for inputting a panel identification number, a comment input region G1D3 for allowing input of a comment for the test item, and the like, a subset panel display region G1D4 for displaying input for displaying a list of measurement items included in the panel, a determination icon G1DE to be selected when input into the panel master registration dialog G1D is determined, and a cancel icon G1DC to be selected when the setting is stopped, are displayed. In the subset panel master region G1D4, a subset panel list G1D41, a subset panel registration icon H1 for registering a new subset panel, a subset panel update icon H2 to be selected when the setting of the registered subset panel is updated, a deletion icon H3 for deleting setting of the subset panel, and a replication icon H4 for replicating setting of the subset panel are displayed.

The processing unit 10 receives input, by the user, into each input region of the panel master registration dialog G1D in step S305 shown in FIG. 13A. FIG. 14 illustrates input of "6C TBNK" into the panel name input region G1D1 and illustrates input of "1234" into the panel ID input region G1D2. Subsequently, the processing unit 10 receives selection, by the user, of the subset panel registration icon H1 in step S306.

Figure 15:
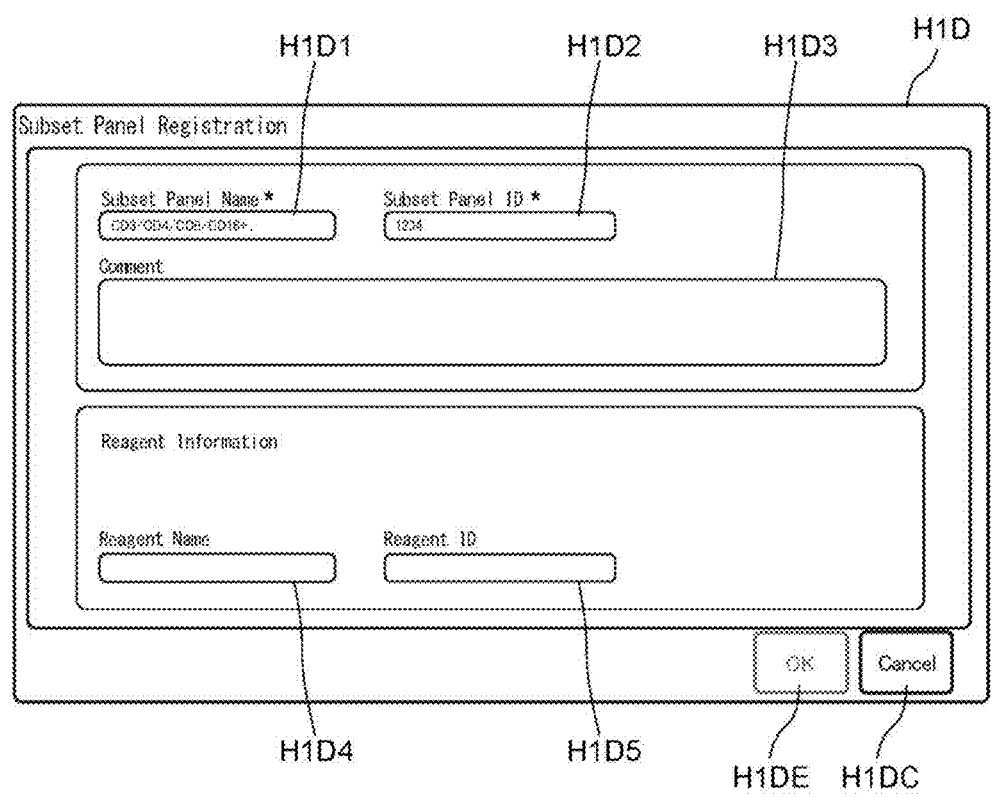
FIG. 15 shows an example of display on the quality control setting screen.

Next, the processing unit 10 displays a subset panel registration dialog H1D shown in FIG. 15 in step S307 in FIG. 13A In the subset panel registration dialog H1D, a subset panel name input region H1D1 for inputting a subset panel name or the like, a subset panel ID input region H1D2, a comment input region H1D3 for inputting a comment as appropriate, a detection reagent name input region H1D4 for inputting a name of a detection reagent, a detection reagent ID input region H1D5 for inputting an identification number of the detection reagent, a determination icon HIDE for determining input, and a cancel icon H1DC for stopping the setting, are displayed. In step S308 in FIG. 13, the processing unit 10 receives input, by the user, into each input region of the subset panel registration dialog H1D. In the description herein, for example, "CD3/CD4/CD8/CD16+ . . . " is inputted in the subset panel name input region H1D1, and "1234" is inputted in the subset panel ID input region H1D2. A plurality of the subset panels can be registered.

After input, by the user, into the subset panel registration dialog H1D, the processing unit 10 receives selection, by the user, of the determination icon HIDE and closes the subset panel registration dialog H1D. Next, the processing unit 10 receives selection, by the user, of the determination icon G1DE in the panel master registration dialog G1D and closes the panel master registration dialog G1D (FIG. 13A, step S310).

Figure 16:
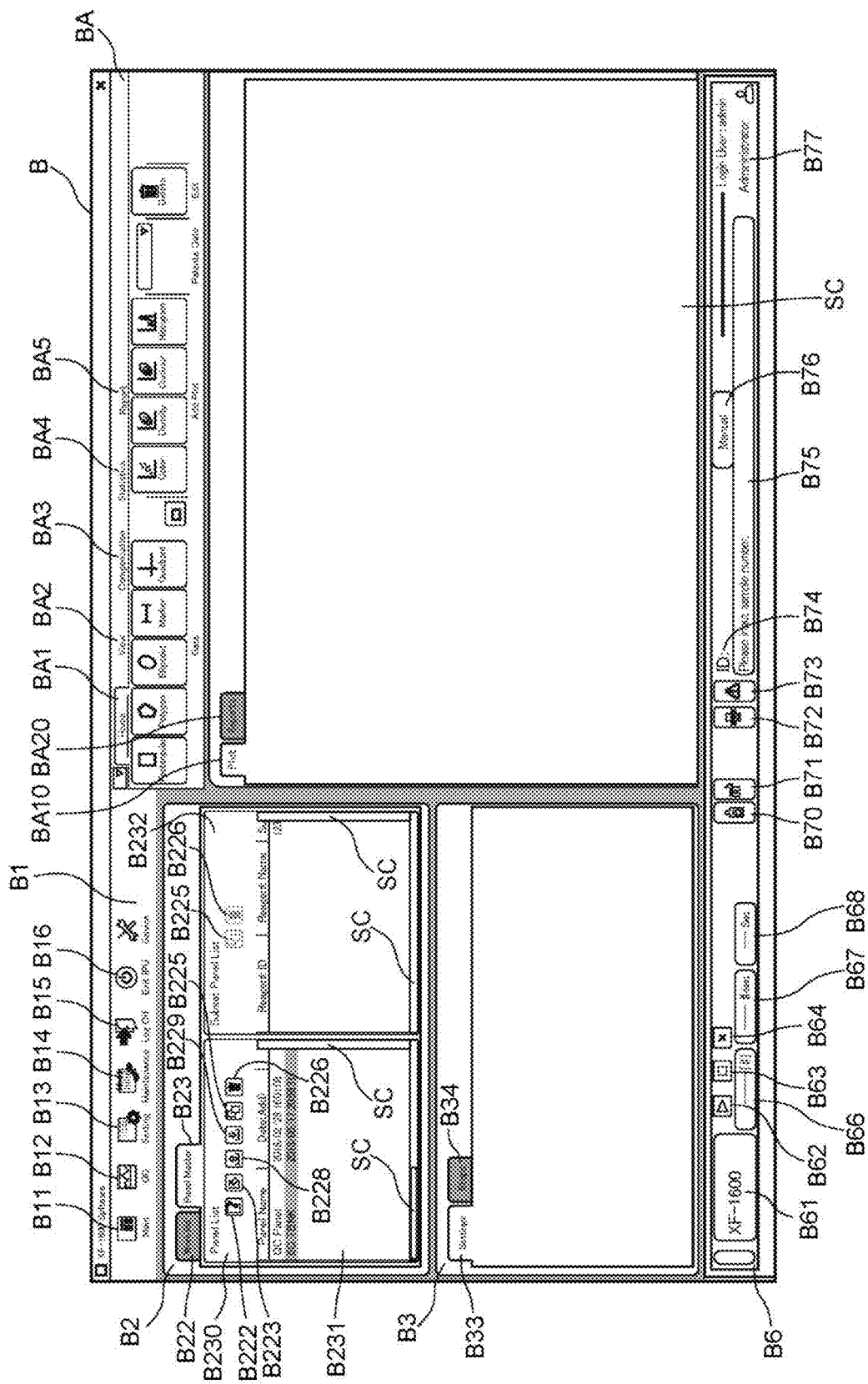
FIG. 16 shows an example of display on the quality control setting screen.

When the panel master registration dialog G1D has been closed, the processing unit 10 displays a name of the panel setting which has been newly registered in the process steps from step S301 to step S309, in the panel setting list B231 in the panel master tab B23 on the main screen B, as shown in FIG. 16 (in which "6C TBNK" is displayed). In the panel setting list B231, a date and time when the panel has been registered can be displayed in addition to the panel name.

Figure 13B:
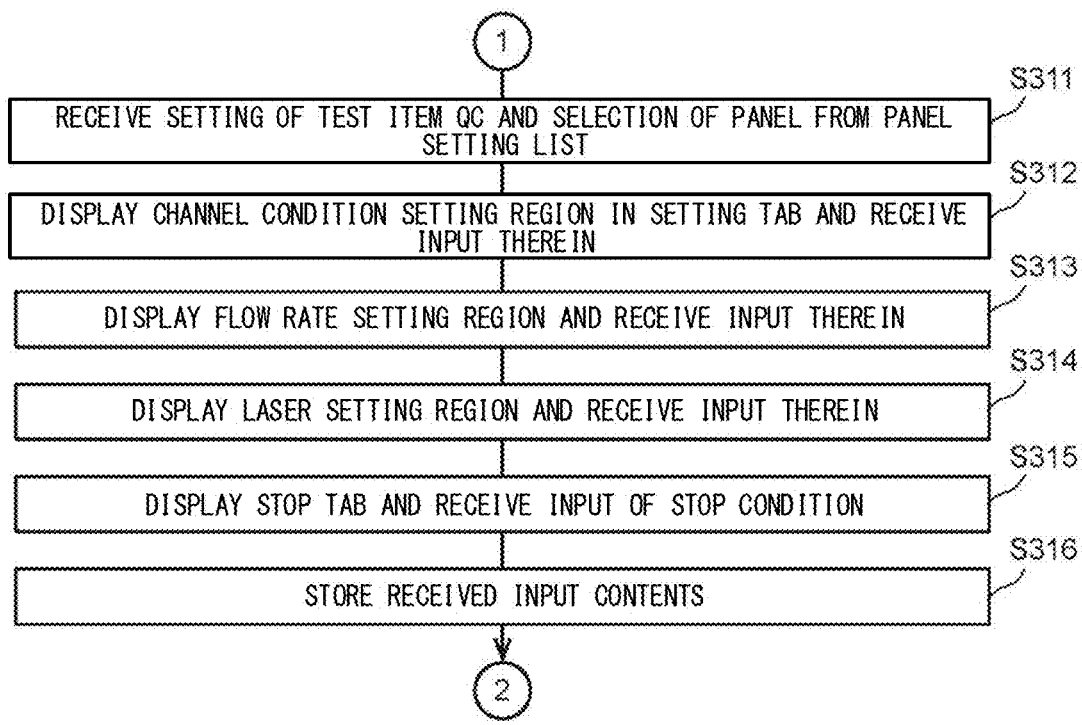
FIG. 13B shows an example of a flow chart for the panel registration process.
Figure 17:
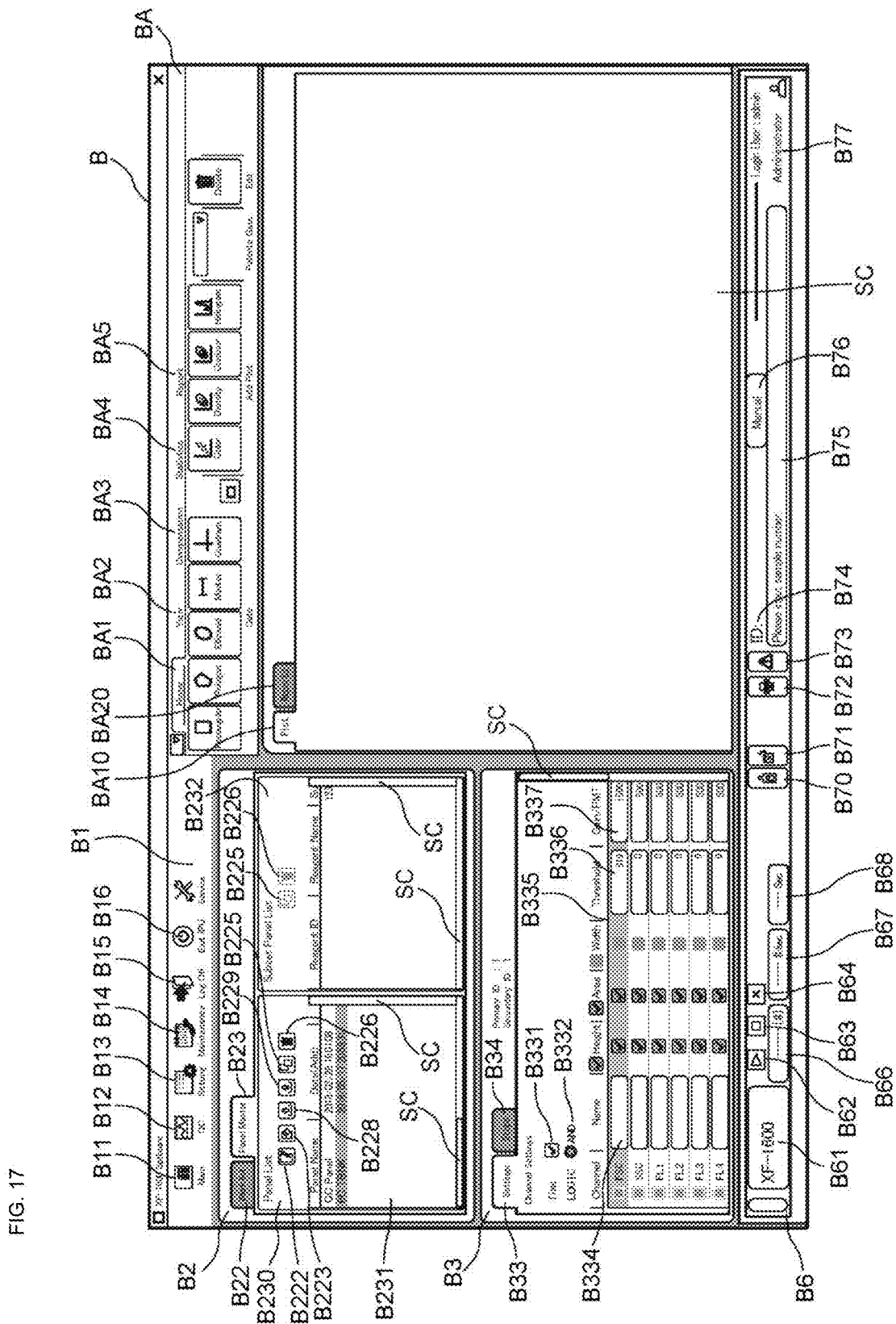
FIG. 17 shows an example of display on the quality control setting screen.

Next, the user selects a panel for which the test item QC is to be newly registered, from the panels displayed in the panel setting list B231, and the processing unit 10 receives the selection (FIG. 13B, step S311). As an example, "6C TBNK" is selected. When one panel is selected by the user, the processing unit 10 displays a channel condition setting region B335 for setting a light reception condition such as a gain of each light receiving element, in the setting tab B33 of the particle analysis condition setting region B3, as shown in FIG. 17, and receives the selection or input in each region by the user (FIG. 13B, step S312). In the region B335, FSC represents forward scattered light and SSC represents side scattered light. Under Name, an input region B334 in which a user is allowed to input information indicating, for example, light detected by each light receiving element, is displayed. Gain/PMT represents an amplified voltage of the light receiving element. Threshold is set for FSC in general, and represents a cutoff value that is set for receiving light having a predetermined or higher intensity. Time indicates whether or not a time axis needs to be obtained. Logic represents a logic obtaining condition for Threshold. Height indicates whether or not a peak value of a fluorescence intensity needs to be obtained. Area indicates whether or not an area value needs to be obtained. Input regions B336 and B337 for allowing the user to input values are displayed for each light receiving element in the columns for Gain/PMT and Threshold. The input into these regions may be performed by the processing unit 10 receiving a value inputted by the user, or by the processing unit 10 displaying setting of Gain/PMT and Threshold, for each light receiving element, which are stored in the storage unit so as to correspond to each light receiving element. The inputted setting is temporarily stored in the memory 12 when the tab is switched or the panel is switched.

In the channel condition setting region B335, the user is allowed to change a display region by using a scroll key SC. In the example shown in FIG. 17, FL1 to FL10 can be set as the light receiving elements for receiving fluorescence. However, the number of the light receiving elements depends on the number of lasers mounted to the measurement unit 200.

Figure 18:
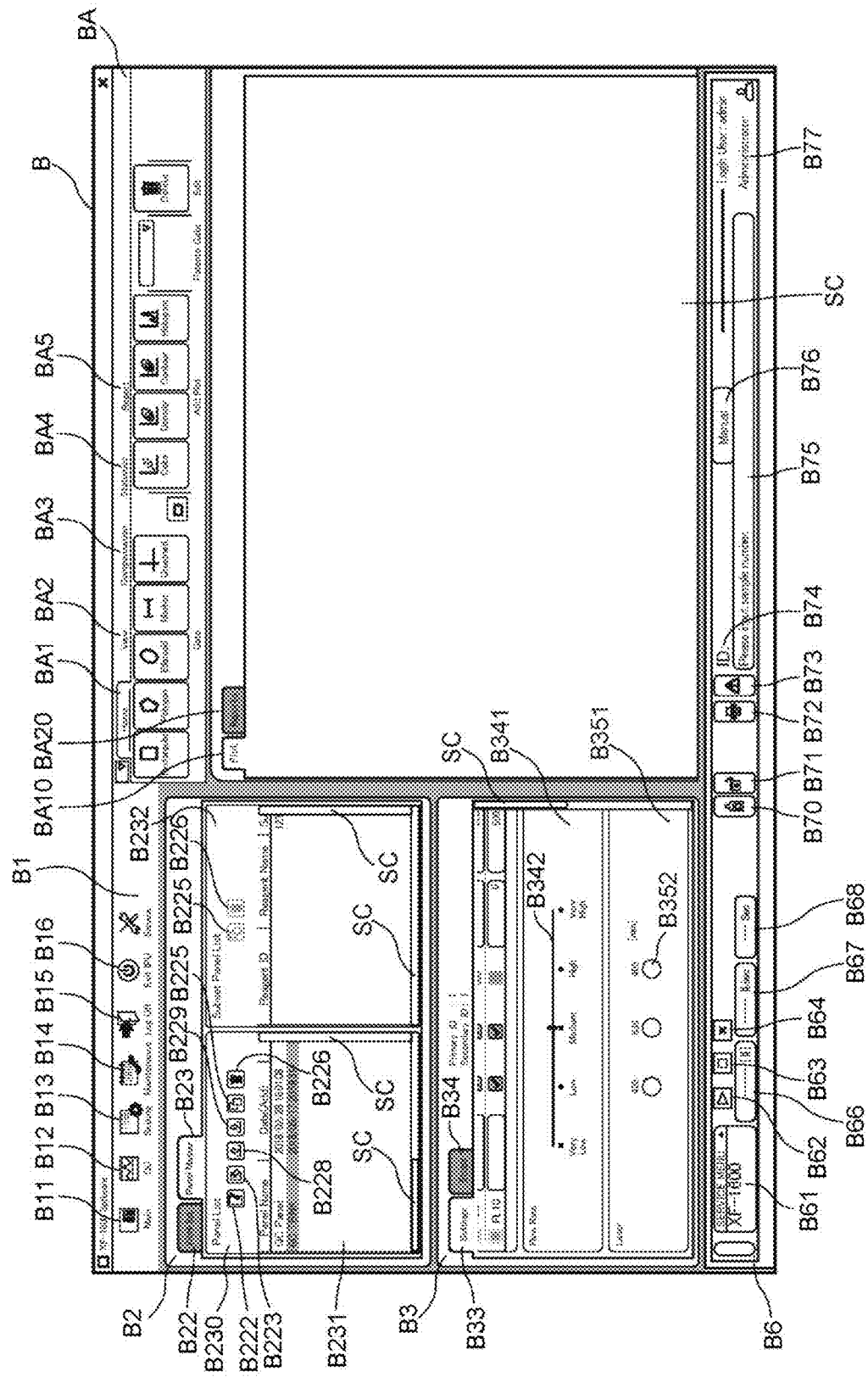
FIG. 18 shows an example of display on the quality control setting screen.
Figure 19:
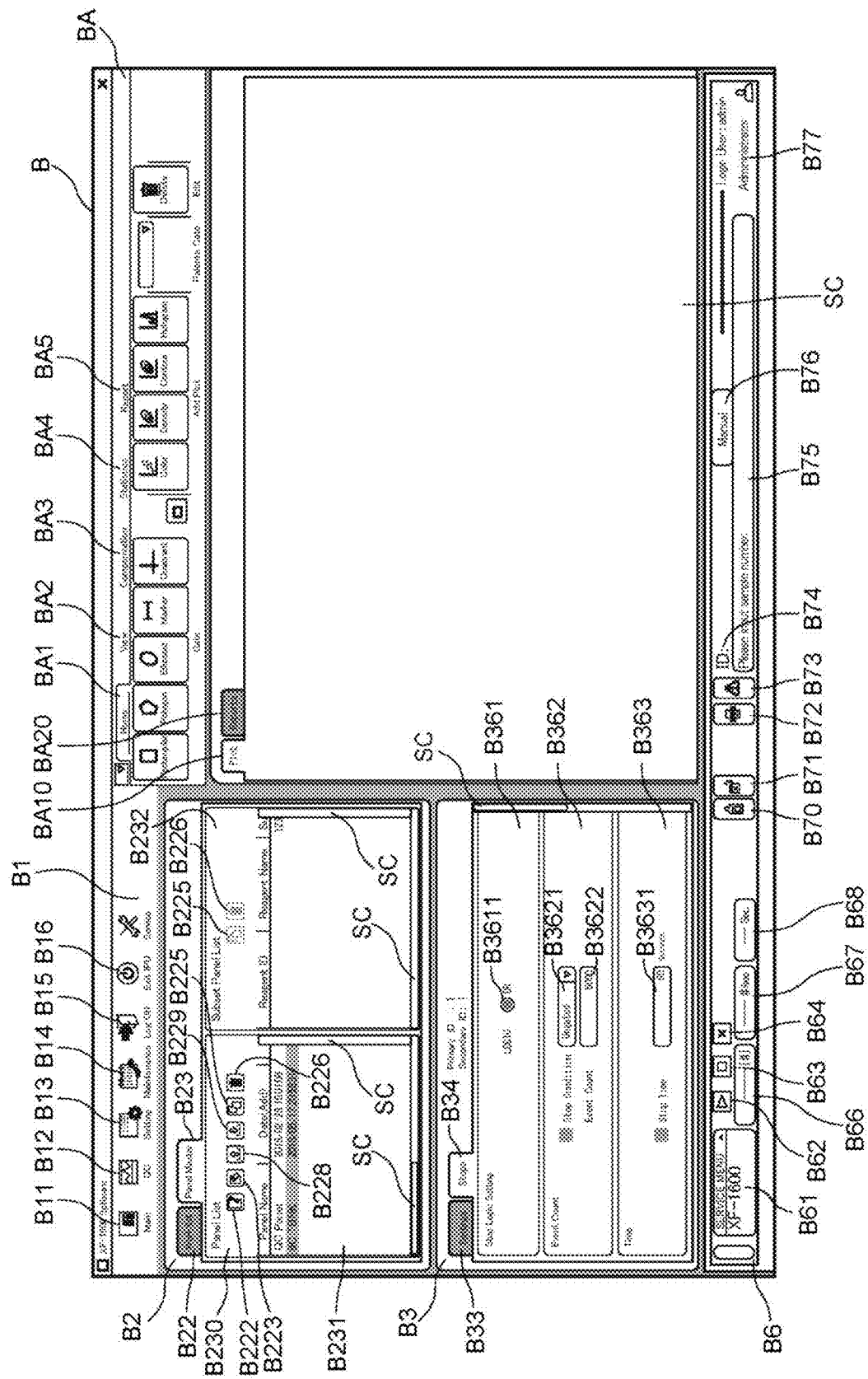
FIG. 19 shows an example of display on the quality control setting screen.
Figure 20:
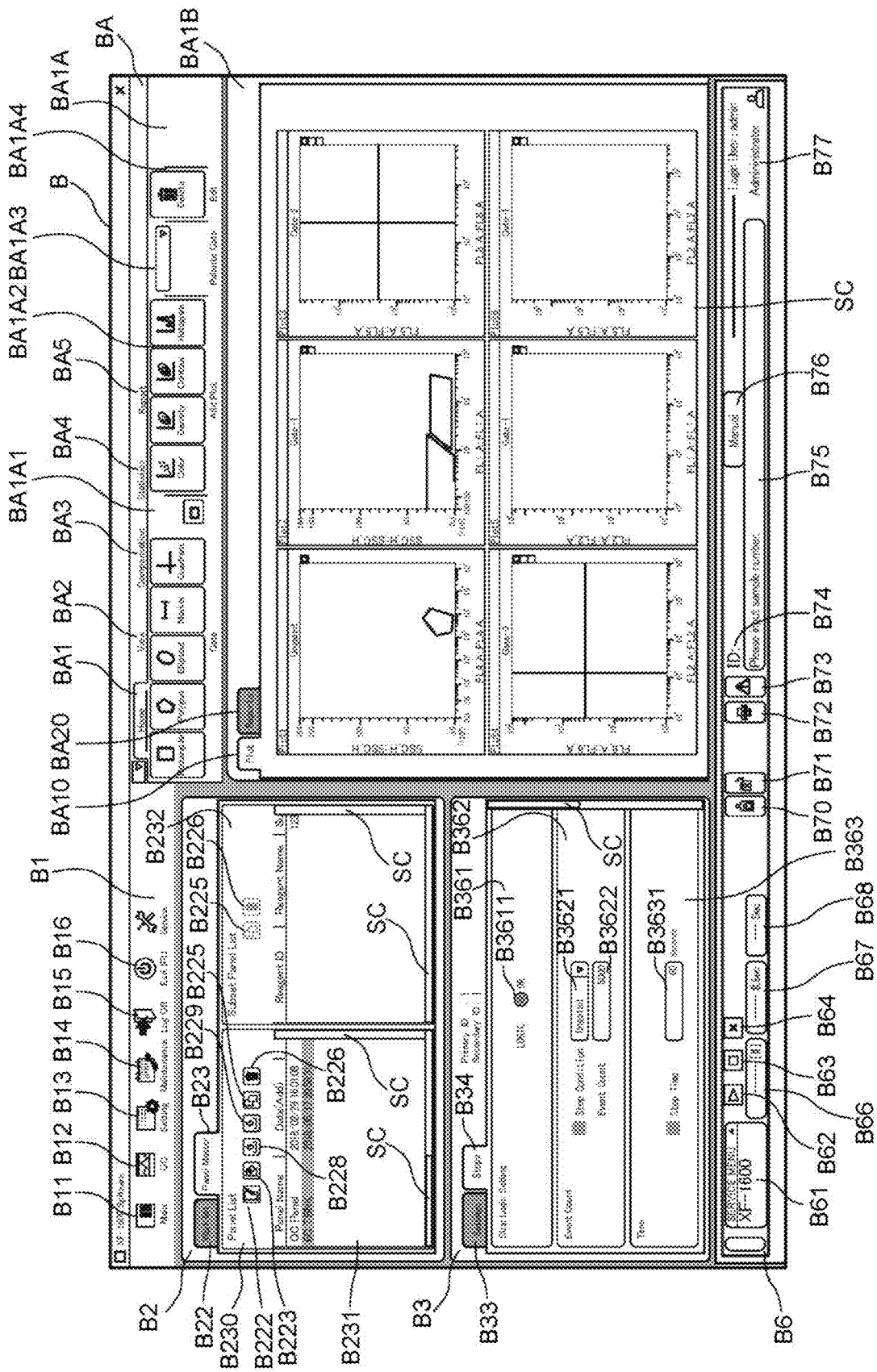
FIG. 20 shows an example of display on the quality control setting screen.

When the user scrolls down the channel condition setting region B335, the processing unit 10 operates to display a flow rate setting region B341 illustrated in FIG. 18 below the channel condition setting region B335, and further display a setting region B351 for laser to be used, below the flow rate setting region B341, and receives selection or input in each region by the user (FIG. 13B, step S313, step S314). The flow rate setting region B341 includes a flow rate adjustment bar B342 that allows a flow rate in the flow cytometer to be adjusted stepwise. The processing unit 10 receives adjustment of the flow rate adjustment bar B342 by an operation from the user, and controls a flow rate of liquid in the flow cell 27 of the measurement unit 200 via the I/F unit 15. The setting region B351 for laser includes an icon B352 that allows laser used by the user to be selected. When, for example, the icon B352 indicated below a wavelength which is not used by the user is selected, the processing unit 10 changes the color of the icon and then displays the icon in order to indicate that the laser is not selected, and the processing unit 10 transmits the information indicating that the icon has been selected, via the I/F unit 15, to the measurement unit 200. In another aspect, when the icon B352 indicated below a wavelength used by the user is selected, the processing unit 10 may change the color of the icon and then display the icon in order to indicate that the laser has been selected, and the processing unit 10 may transmit the information indicating that the icon has been selected, via the I/F unit 15, to the measurement unit 200.

Next, the processing unit 10 receives selection, by the user, of the stop tab B34. The processing unit 10 subsequently displays the stop tab B34 illustrated in FIG. 19, and receives selection or input in each region by the user (FIG. 13B, step S315). The stop tab B34 includes a Stop Logic Setting region B361, an Event Count region B362, and a Time region B363 for receiving input of setting for a stop condition. The Stop Logic Setting region B361 includes a logic setting icon B3611 for a stop condition, and, when "or" is set, setting cannot be changed. The Event Count region B362 includes a pull-down list display region B3621 for setting a stop condition (Stop condition), and an input region B3622 for the number of measured cells at which the measurement is stopped. The Time region B363 includes an input region B3631 in which time setting is inputted in order to end the measurement in a predetermined period of time. Either the Event Count region B362 or the Time region B363 can be selected. When the condition inputted by the user is satisfied, the processing unit 10 transmits an instruction for stopping the measurement, via the I/F unit 15, to the measurement unit 200, to stop the measurement.

The inputted setting is temporarily stored in the memory 12 or automatically stored in the auxiliary storage unit 13 when the tab is switched or the panel is switched (FIG. 13B, step S316).

Figure 13C:
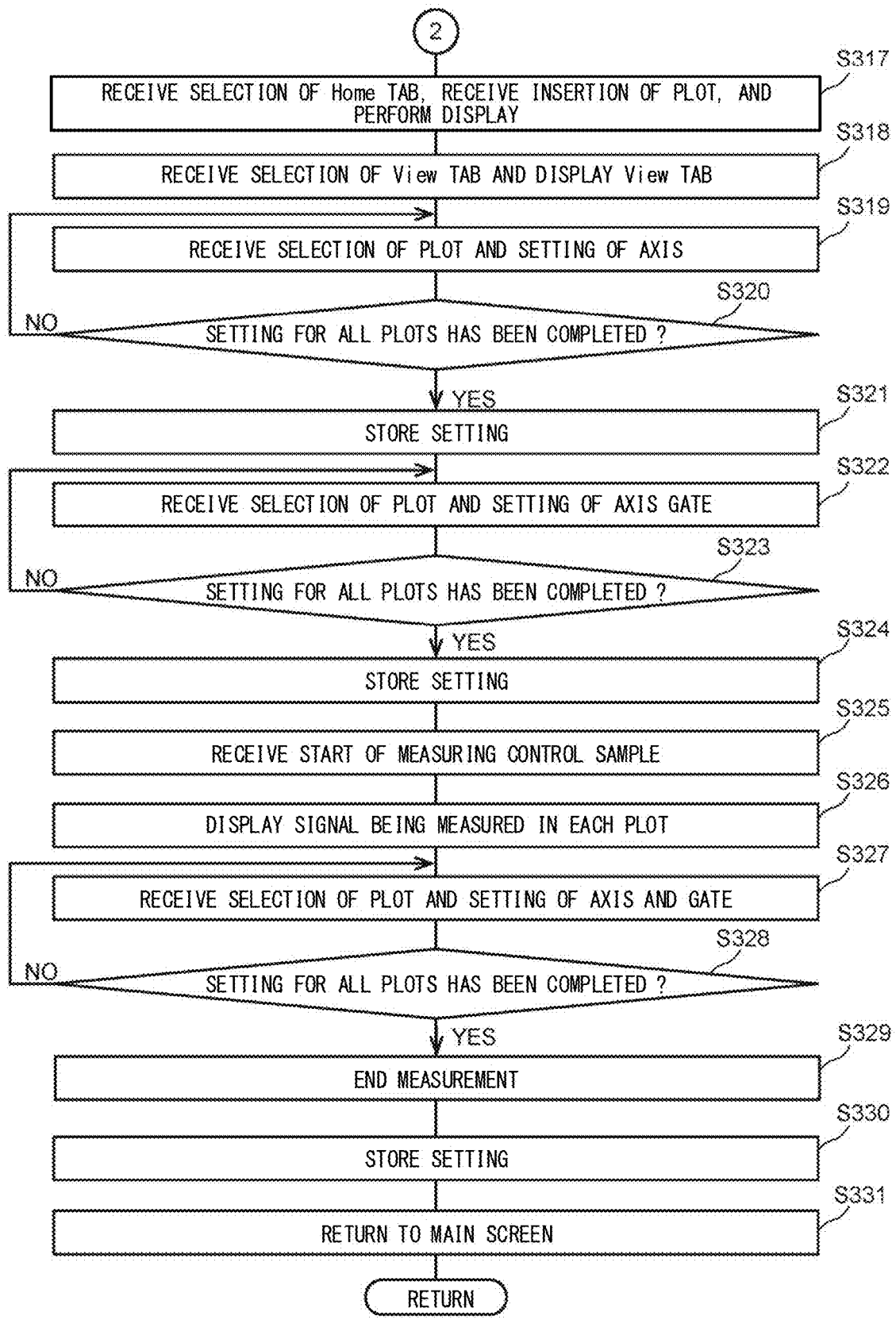
FIG. 13C shows an example of a flow chart for the panel registration process.

Next, the processing unit 10 receives insertion of a new plot by the user. The processing unit 10 receives input of a new plot into the plot tab of the home tab BA1 displayed in the region BA in FIG. 20. When the Home tab BA1 is not displayed, before input of a new plot into the plot tab is received, selection of the home tab BA1 by the user is received (FIG. 13C, step S317). The Home tab BA1 includes a plot insertion region BA1A for inserting a plot and a plot display region BA1B for displaying the plot. The plot insertion region BA1A includes a Gate region BA1A1 having icons for gate insertion, an Add Plot region BA1A2 having icons for adding a plot in the plot display region BA1B, a region BA1A3 for displaying a Palente Gate for developing, into a plot, only particles in a gate set by a parent gate, and an Edit region BA1A4 having a deletion icon for deleting a plot. The processing unit 10 receives selection, by the user, of any of the icons displayed in the Add Plot region BA1A2, and adds a blank plot corresponding to the selected icon in the plot display region BA1B, and displays the blank plot (FIG. 13C, step S317).

Next, the processing unit 10 receives setting by the user for the plot added in step S317. Specifically, the processing unit 10 receives selection, by the user, of a view tab BA2, and displays the view tab illustrated in FIG. 21 (step S318). In the view tab BA2, a plot setting region BA2A for setting display of each plot and the plot display region BA1B for displaying each plot, are displayed. The plot setting region BA2A further includes a Scaling region BA2A1 and a Histogram style region BA2A2. In the Scaling region BA2A1, an input region for setting for an X axis and a Y axis for each plot is displayed. For each axis, the Scaling region BA2A1 includes pull-down lists (BA21 for X axis, BA211 for Y axis) for setting a light receiving element displayed at the axis, pull-down lists (BA22 for X axis, BA212 for Y axis) for selecting from among display as a linear function and display as a logarithmic function, input regions (BA23 for X axis, BA213 for Y axis) for inputting the minimum value of the axis, input regions (BA24 for X axis, BA214 for Y axis) for inputting the maximum value of the axis, and pull-down lists (BA25 for X axis, BA215 for Y axis) for displaying Negative % that is one parameter for the Logicle axis. In the plot setting region BA2A, the Histogram style region BA2A2 includes an Auto Scaling selection region BA221 for allowing the user to determine, through the selection, whether or not the axis is to be automatically set, and a region BA222 for imputing Max count that is a display region for the Y axis in the selected histogram. The plot display region BA1B includes the plot tab BA10 for displaying a plot and a report tab BA20 for generating a report.

Figure 21:
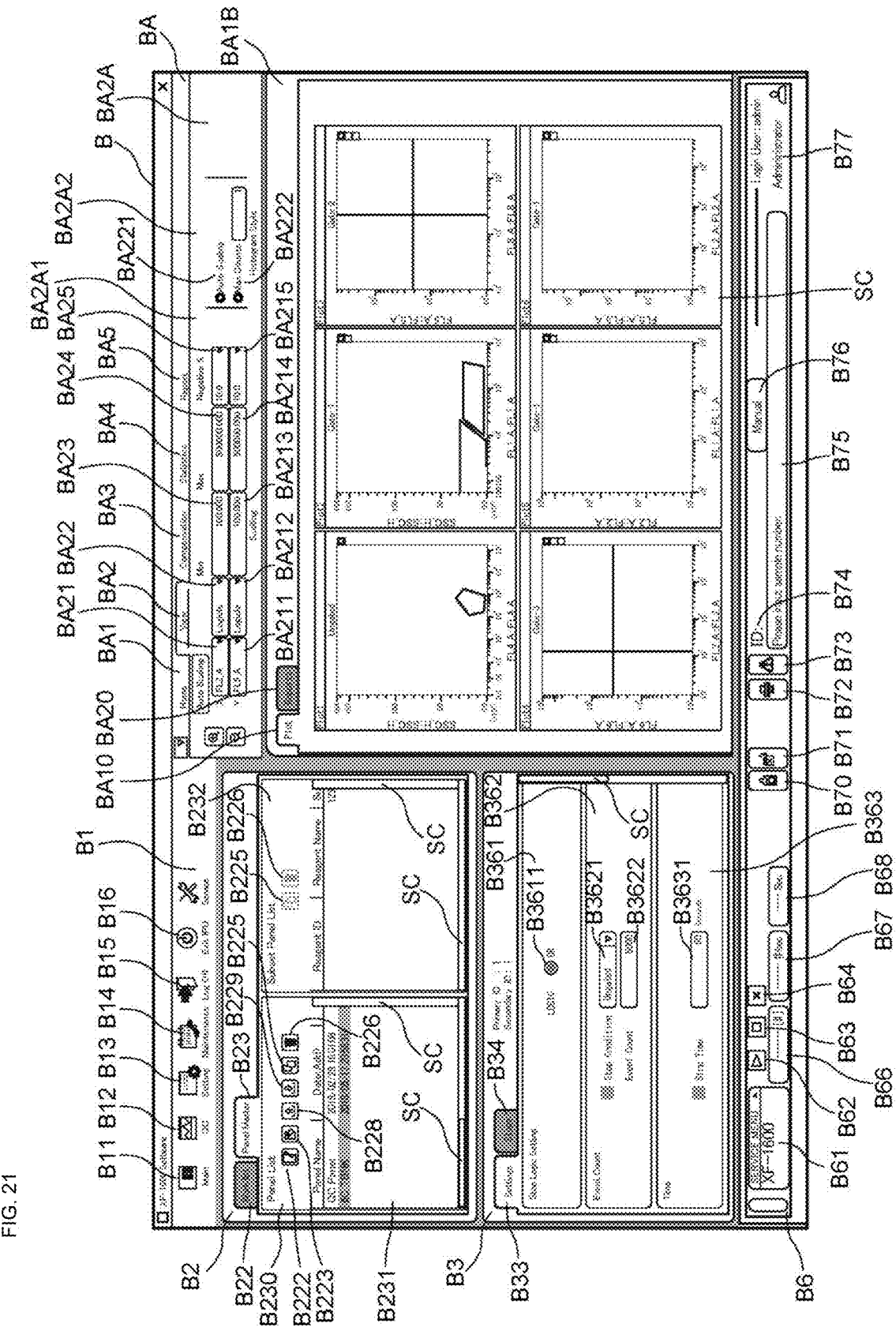
FIG. 21 shows an example of display on the quality control setting screen.

FIG. 21 illustrates an example of the plot tab in which a signal of light received by the measurement unit 200 is displayed as a scattergram having two axes of a combination of different light receiving elements, in six plots from Plot1 to Plot6. The plots can be displayed according to the number of combinations of different light receiving elements. The plot may be indicated such that a signal of light received by the measurement unit 200 is represented as a histogram by using the intensity of light and the number of particles for each light receiving element, instead of being indicated by a dot plot.

Each plot can be selected by, for example, the user clicking a displayed plot. For the plot selected by the user, the processing unit 10 receives setting of the axis which has been set in the Auto Scaling having a function of displaying ranges of the maximum value and the minimum value of a measured particle, for the selected Plot, or receives the contents selected or inputted, by the user, in each region of the plot setting region BA2A for each plot (FIG. 13C, step S319).

When setting for all the plots by the user has been completed, the processing unit 10 receives the input of the completion (FIG. 13C, step S320). When the input of the completion has been received (Yes), the processing unit 10 temporarily stores the contents of the setting for each plot in the memory 12 or automatically stores the contents of the setting for each plot in the auxiliary storage unit 13 when the tab is switched or the panel is switched (step S321). When the input of the completion is not made, the process is returned to step S319 to receive further selection and input of a plot by the user.

Next, the processing unit 10 performs setting of a gate for the plot for which the setting stored in step S320 has been completed. The processing unit 10 receives selection of the home tab BA1 by the user, and displays the plot insertion region BA1A (see the plot insertion region BA1A in FIG. 20). Subsequently, as in step S319, the processing unit 10 receives selection of a plot by the user, and displays a gate corresponding to any gate icon which is displayed in the Gate region BA1A1 and selected by, for example, clicking or touching by the user, in the plot selected in the plot display region BA1B. The gate displayed in the plot can be moved by selecting and dragging by the user or according to an operation of an arrow key on the keyboard, or the like. The processing unit 10 receives the position of the gate determined by the user, as the setting for the gate (FIG. 13C, step S322). When setting for all the plots by the user has been completed, the processing unit 10 receives the input of the completion (FIG. 13C, step S323). When the input of the completion has been received (Yes), the processing unit 10 temporarily stores the contents of the setting for each plot in the memory 12 or automatically stores the contents of the setting for each plot in the auxiliary storage unit 13 when the tab is switched or when the panel is switched (step S324). When the input of the completion is not made, the process is returned to step S322 to further receive selection of a plot and setting of the gate by the user.

Figure 22:
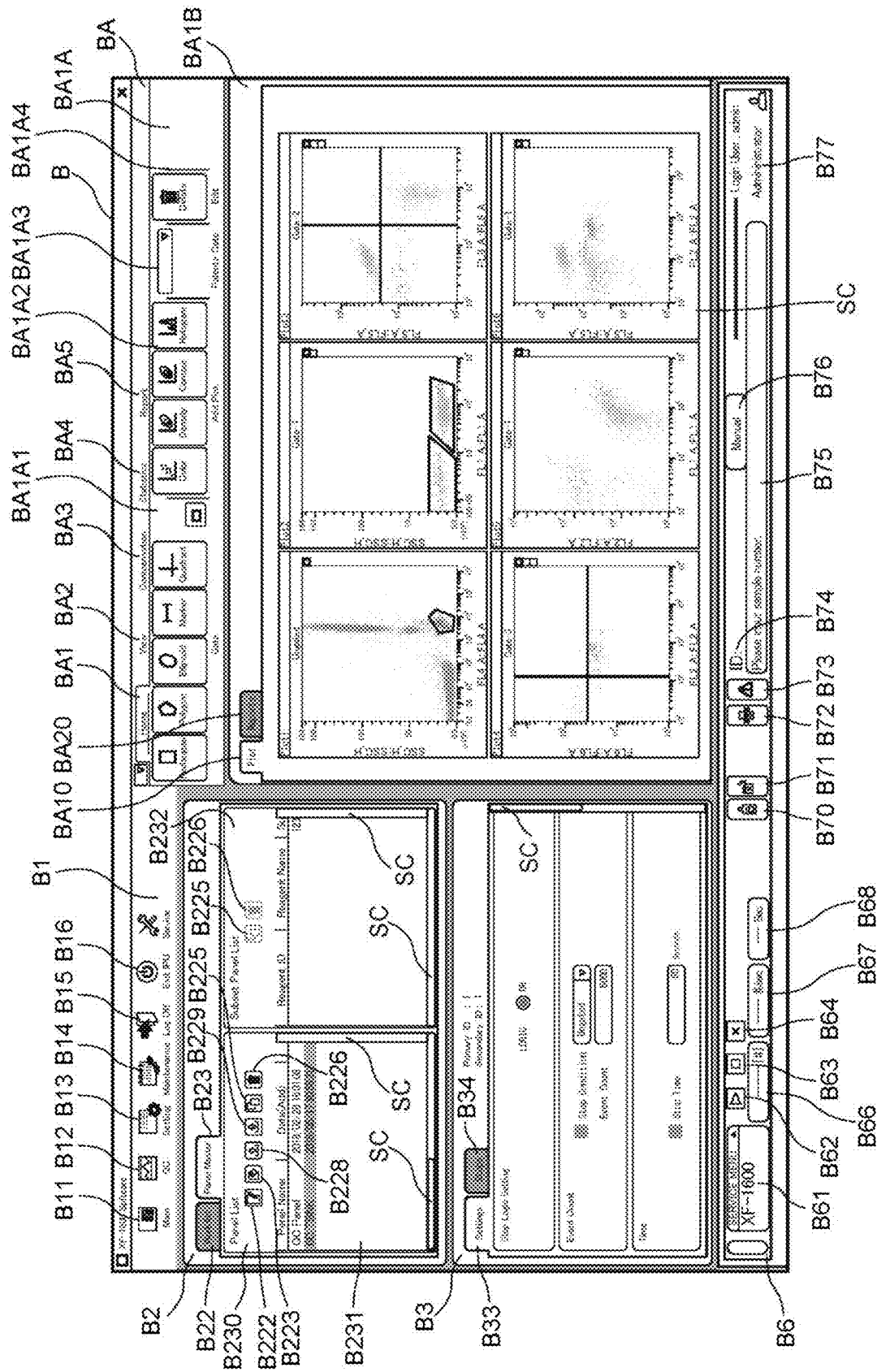
FIG. 22 shows an example of display on the quality control setting screen.

Next, the processing unit 10 receives further adjustment by the user for setting, of each plot, which has been set in steps S322 to S329 while the measurement unit 200 measures the test item control sample prepared by the user (FIG. 13C, step S325). The user sets a specimen in the suction unit 21 of the measurement unit 200, and selects the measurement start icon B62 shown in FIG. 22. The processing unit 10 receives selection of the measurement start icon B62 by the user, and transmits an instruction for starting the measurement via the I/F unit 15 to the measurement unit 200. The processing unit 10 receives information of a signal of light detected by each light receiving element of the measurement section 23 via the I/F unit 15. The processing unit 10 displays the information of the signal of the received light, as a plot corresponding to the intensity of light and/or a plot corresponding to the size of a cell, in the plot corresponding to each light receiving element in the plot display region BA1B (FIG. 13C, step S326, FIG. 22). The plot is preferably a dot plot or a histogram. While the user views each plot, the user performs selection of the plot and readjustment of the axis and/or the gate, and the processing unit 10 receives the selection of the plot by the user, and readjustment of the axis and/or the gate by the user (FIG. 13C, step S327). When the setting for all the plots by the user has been completed, the processing unit 10 receives the input of the completion (FIG. 13C, step S328). When the input of the completion has been received (Yes), the processing unit 10 temporarily stores the contents of the setting for each plot in the memory 12 or automatically stores the contents of the setting for each plot in the auxiliary storage unit 13 when the tab is switched or the panel is switched (step S329). When the input of the completion is not made, the process is returned to step S327 to further receive selection of the plot and setting of the gate by the user.

QC File Registration

Figure 23:
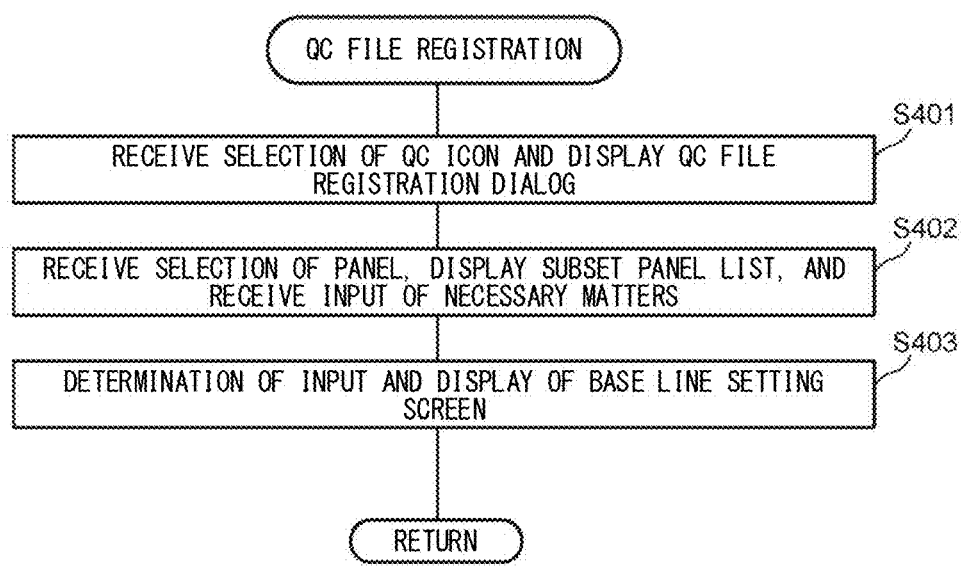
FIG. 23 shows an example of a flow chart for QC file registration.
Figure 24:
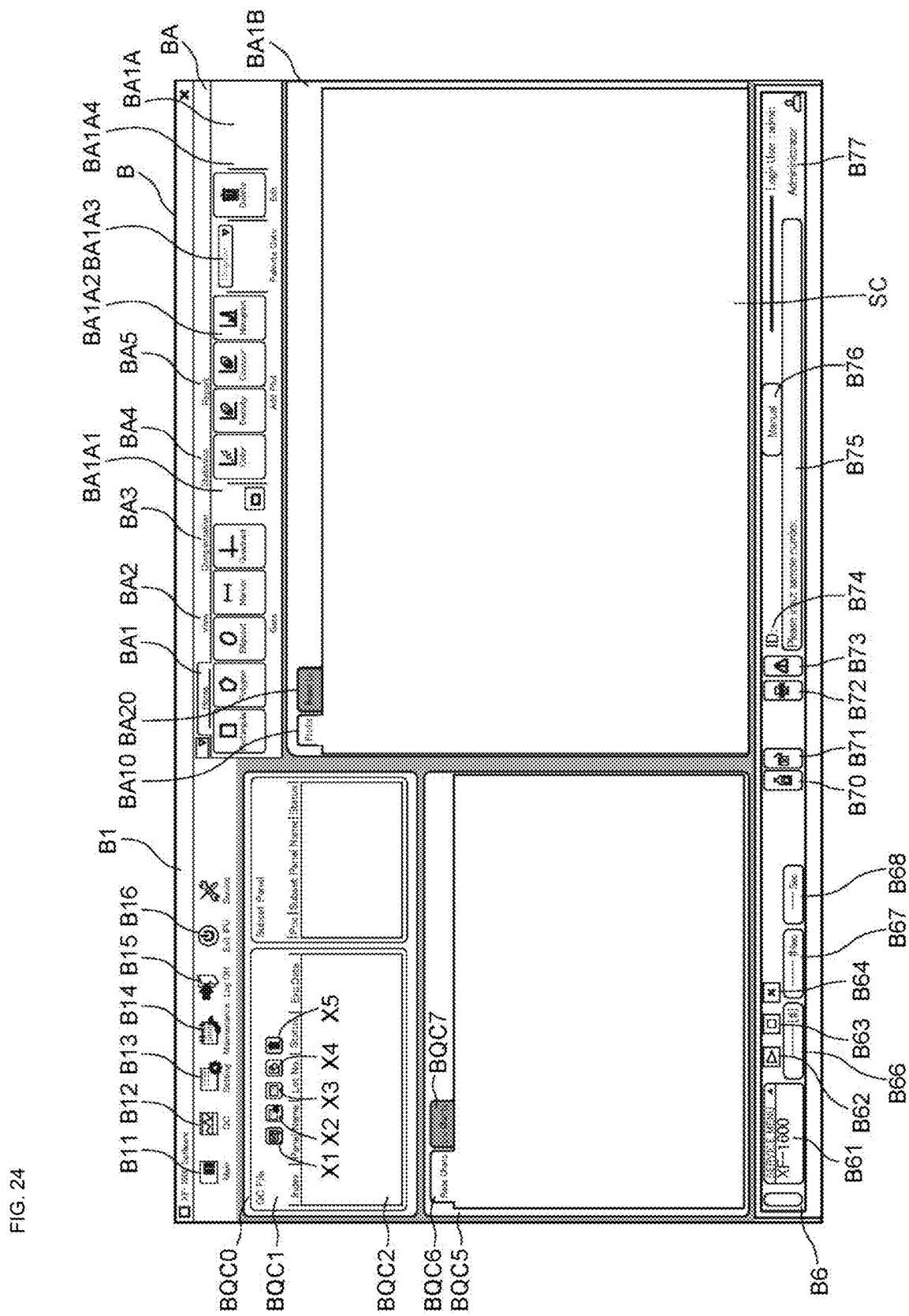
FIG. 24 shows an example of display on the quality control setting screen.
Figure 25:
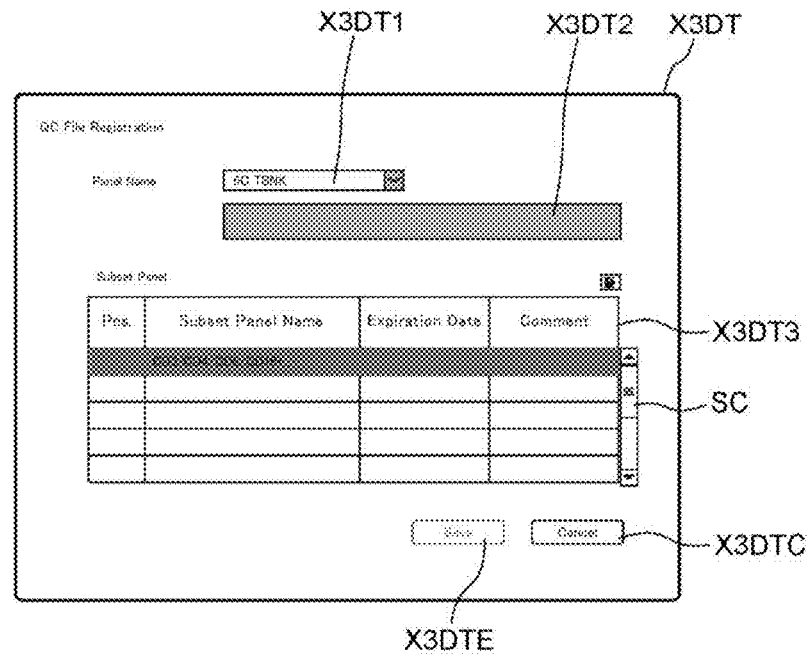
FIG. 25 shows an example of display on the quality control setting screen.

When the process for registering the panel is ended, the processing unit 10 subsequently receives registration of the QC file by the user (FIG. 1, step S4). The processing unit 10 receives selection, by the user, of the QC icon B12 in FIG. 22, and displays the QC file BQC0 on the main screen B (FIG. 24). Subsequently, the processing unit 10 receives selection, by the user, of the QC file registration icon X3 in the QC file operation region BQC1, and displays a QC file registration dialog X3DT shown in FIG. 25 (FIG. 23, step S401). The QC file registration dialog X3DT includes a panel name pull-down list region X3DT1 for displaying names of the registered panels, a comment display region X3DT2 for displaying a comment annexed to the registered panel, a subset panel display region X3DT3 for displaying a subset panel registered in the panel, a save icon X3DTE for determining the setting and closing the QC file registration dialog X3DT, and a cancel icon X3DTC for closing the QC file registration dialog X3DT without saving the setting.

In the pull-down list region X3DT1, a list of panel names having been set in "Panel registration" described above is displayed. In the comment display region X3DT2, the contents inputted in the comment input region G1D3 of the panel master registration dialog G1D are displayed.

In the subset panel display region X3DT2, the subset panel name inputted in step S308 in FIG. 13 is displayed.

Figure 26:
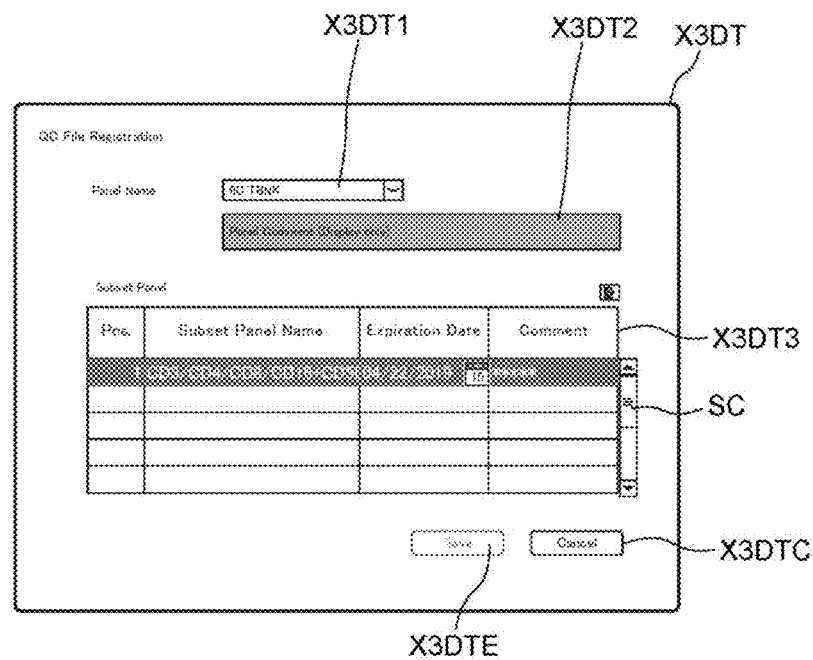
FIG. 26 shows an example of display on the quality control setting screen.

Next, the processing unit 10 receives selection, by the user, of a panel name from the panel name pull-down list, and displays the subset panel list corresponding to the selected panel name, in the subset panel display region X3DT3, as shown in FIG. 26 (FIG. 23, step S402). One subset panel list includes, for example, a position number (Pos.) of a reagent, a subset panel name, an expiration date (Expiration Date) of the reagent, a region for displaying a comment or the like. The position number of the reagent, the expiration date of the reagent, the comment, and the like are inputted by receiving the input thereof from the user, and the processing unit 10 receives the input (FIG. 23, step S402). In FIG. 26, the expiration date of the reagent can be selected by the user selecting a date mark in a column for the expiration date of the reagent, or selecting a date from a calendar which is displayed by pointing. However, the date may be directly inputted.

Next, the processing unit 10 receives determination of the input by the user, that is, selection of the save icon X3DTE by the user (FIG. 23, step S403), and closes the QC file registration dialog X3DT. At this time, the processing unit 10 stores the contents inputted by the user in the memory 12 or the auxiliary storage unit 13. Subsequently, the processing unit 10 receives selection, by the user, of the subset panel selection icon X4 shown in FIG. 24, and displays a base line setting screen T shown in FIG. 27 (FIG. 23, step S403).

Setting of Base Line

The processing unit 10 receives setting of an evaluation criterion for quality control or the like on the base line setting screen T, based on the measurement data obtained by the particle analyzer 1000 measuring the test item control sample prepared in each clinical laboratory, in step S325 in FIG. 13C. The setting is the base line setting process in step S5 in FIG. 1.

Figure 27:
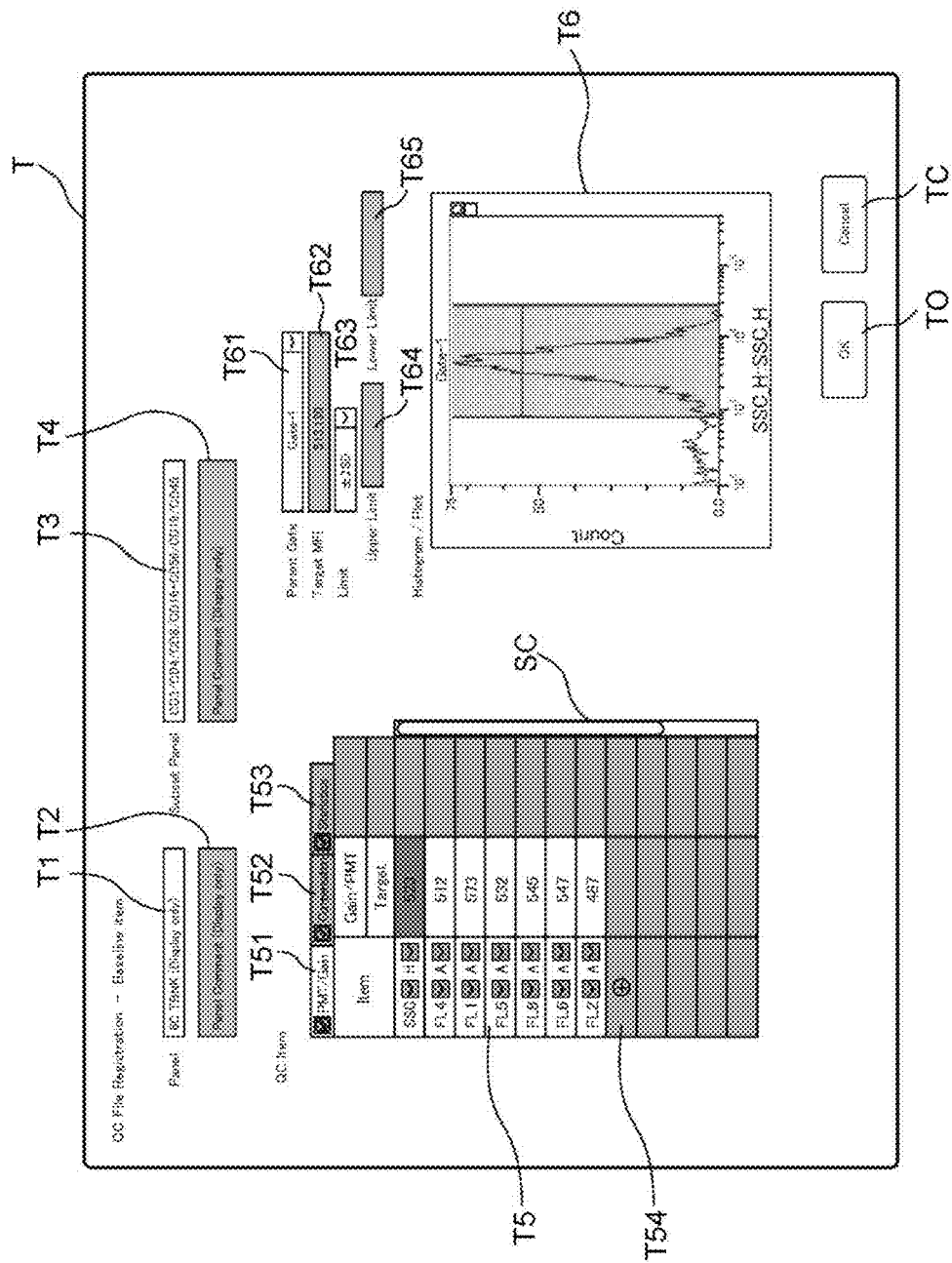
FIG. 27 shows an example of display on the quality control setting screen.

On the base line setting screen T shown in FIG. 27, a panel name display region T1, a panel comment display region T2, a subset panel name display region T3, a subset panel comment display region T4, a setting region (QC Item) T5 for each channel, a particle distribution display region T6, a list display region T61 for displaying setting of the parent gate, a target MFI display region T62 for inputting a fluorescence intensity to which a voltage value is adjusted, a predetermined range setting region T63 for an evaluation criterion (Limit) for quality control, a region T64 for allowing manual input of an upper limit value (Upper Limited) of the evaluation criterion for the quality control, a region T65 for allowing manual input of a lower limit value (Lower Limited) of the evaluation criterion for the quality control, a determination (OK) icon TO for determining the setting, and a cancel icon TC for stopping the setting, can be displayed. In the example shown in FIG. 27, the list display region T61 for displaying setting of the parent gate and the predetermined range setting region T63 are displayed as a pull-down list. However, input of characters by the user may be received. In the predetermined range setting region T63, statistical information can be inputted. The statistical information represents, for example, ±1SD (SD represents standard deviation), ±2SD, ±3SD, a mean value, a median, the number of cells, or the like.

In the setting region T5 for each channel, a PMT value/gain setting tab T51, a compensation tab T52 for performing fluorescence correction, and a statistics tab T53 are displayed so as to be switchable. A check box CB which is checked by, for example, clicking or touching by the user is disposed next to the display of the label name for each tab of "PMT Value/Gain", "Compensation", "Statistics", or the like. By checking the check box CB, the item of the tab which has been checked can be set as a management item of the quality control. The PMT value/gain setting tab T51 includes an Item region for selecting each channel (light receiving element), and a Target region for selecting a target (PMT value and/or rCV) to be controlled. In the Target region, a value which is set in the device QC is displayed. Reference numeral T54 represents an icon selected by the user when a channel is added. SSC, FSC, FL4, FL1, FL5, FL8, FL6, FL2, and the like displayed in the Item region are character strings corresponding to the respective channels (light receiving elements). "H" represents a Height value, and "A" represents an Area value. The Item region is displayed, by the processing unit 10, so as to correspond to an axis label of each plot displayed in the plot tab shown in FIG. 20. Whether or not each item is to be set as a management item for quality control is determined in units of tabs by the user clicking the check box CB. It may be determined for each light receiving element by the user selecting one cell in the Target region through double clicking or the like.

A distribution of particles in the case of a test item control sample being measured is displayed in the particle distribution display region T6 in which the vertical axis represents the number of particles and the horizontal axis represents a fluorescence intensity. In the particle distribution display region T6, a plot based on the intensity of light and/or a plot based on the size of a cell is displayed, preferably, as a histogram or a dot plot. In the particle distribution display region T6, switching between display as the histogram and display as the dot plot can be performed. In the particle distribution display region T6, each plot displayed in the plot tab BA10 shown in FIG. 22 is displayed. FIG. 27 shows an example of the particle distribution represented as a histogram. In this region, a peak range of a collection of particles to be controlled is set by a gate. The position and the width of the gate can be adjusted by the user moving a T8 region with the use of the mouse or the like.

A range in which the fluorescent signal is obtained is displayed as the gate T8 in the particle distribution display region T6.

In the panel name display region T1, information of the panel name which has been set in "Panel registration" described above is displayed. In the panel comment display region T2, the contents inputted in the comment input region G1D3 of the panel master registration dialog G1D are displayed. In the subset panel name display region T3, the subset panel name inputted in step S308 in FIG. 13 is displayed. In the subset panel comment display region T4, the comment received in the comment input region H1D3 shown in FIG. 15 is displayed.

Figure 28:
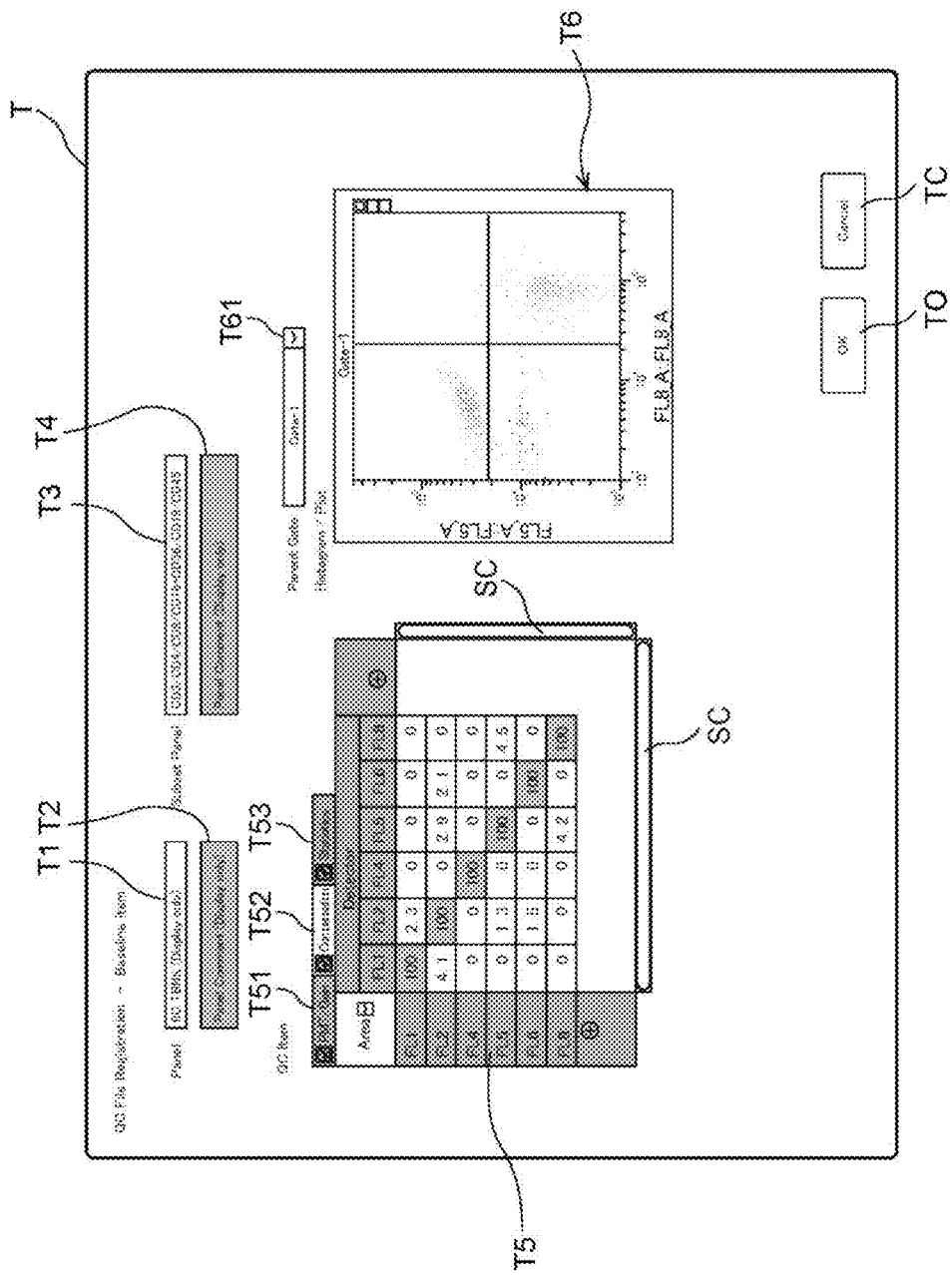
FIG. 28 shows an example of display on the quality control setting screen.

When the user selects the compensation tab T52, the processing unit 10 displays a table in which values representing fluorescence intensities in the case of arranging the light receiving element labels in the column direction and the row direction have been inputted, as shown in FIG. 28, instead of display of the Item region and the Target region. In a case where the setting for automatically performing fluorescence correction has been performed when the panel is registered, the processing unit 10 displays, in the table, values stored in the auxiliary storage unit 13 or the memory 12 when the control sample is measured. The Area values are indicated in the row direction, and the detectors are indicated in the column direction. For example, in the cell at the row FL1 and the column FL1, "100" is indicated. This means that light in a region of fluorescence wavelengths to be detected by the light receiving element of FL1 is detected by the light receiving element of FL1 by 100%. Meanwhile, for example, in the cell at the row FL2 and the column FL1, "4.1" is displayed. This means that 4.1% of light in a region of fluorescence wavelengths to be detected by the light receiving element of FL2 is detected by the light receiving element of FL1. This means that, in such a case, when a particle is detected by using FL1 and FL2 in combination, correction for subtracting, from an amount of light detected by the light receiving element of FL1, 4.1% of the amount of light needs to be performed.

When the compensation tab T52 is selected, the particle distribution display region T6 is switched and displayed as a plot. When the compensation tab T52 is selected, only the parent gate can be selected in the example shown in FIG. 28.

Figure 29:
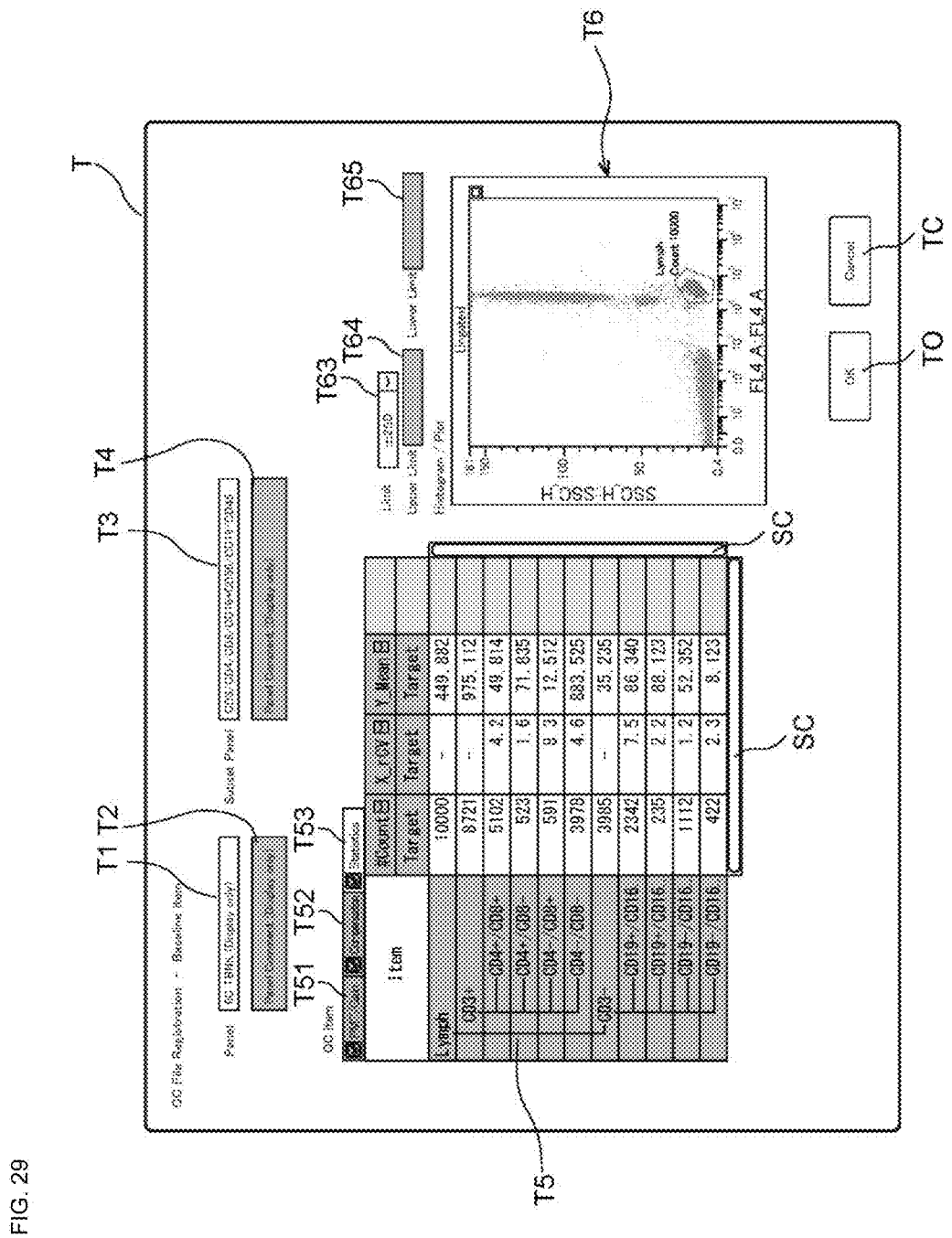
FIG. 29 shows an example of display on the quality control setting screen.

When the user selects the statistics tab T53, the processing unit 10 indicates a statistical result of the gate, in each plot, which is set by measuring the control sample when the panel is registered, as shown in FIG. 29. In the example shown in FIG. 29, in the first column for the statistical result, the Item names, for example, the labels indicating measurement items (marker) of lymphocyte (Lymph) that is the test item (panel) name are displayed. The processing unit 10 displays, in the Item name, a name corresponding to a gate of a plot in the plot tab BA10 shown in FIG. 22. In the Lymph, a CD3-positive (CD3+) group and a CD3-negative (CD3−) group are separately displayed. The CD3+ group is further divided into CD4+/CD8+, CD4+/CD8−, CD4−/CD8+, and CD4−/CD8− according to a fine population of lymphocyte. The CD3− group is divided into CD19+/CD16+, CD19+/CD16−, CD19−/CD16+, and CD19−/CD16−. In the second column for the statistical result, the counted number of cells (#Count) is displayed. For example, it is indicated in the row for Lymph that 10,000 cells have been counted. It is indicated in the row for CD3+ that 8721 CD3+ are in Lymph. It is indicated in the row for CD4+/CD8+ that 5102 CD4+/CD8+ cells are in CD3+. X_rCV represents dispersion of fluorescence intensities in the X axis. Y_mean represents an arithmetic mean of fluorescence intensities in the Y axis.

When the user selects the statistics tab T53, a histogram or a plot corresponding to Item is displayed in the particle distribution display region T6. Furthermore, the predetermined range setting region T63 for the evaluation criterion (Limit) for quality control, the region T64 for allowing manual input of the upper limit value (Upper Limited) of the evaluation criterion for the quality control, and the region T65 for allowing manual input of the lower limit value (Lower Limited) of the evaluation criterion for the quality control, are displayed for setting the evaluation criterion for the quality control. The processing unit 10 receives selection in the region by the user or input into the region by the user.

Setting of Evaluation Criterion for Quality Control

A method for setting the base line in step S5 shown in FIG. 1 (setting of an evaluation criterion for quality control) will be described by using an example shown in FIG. 30A.

Figure 30A:
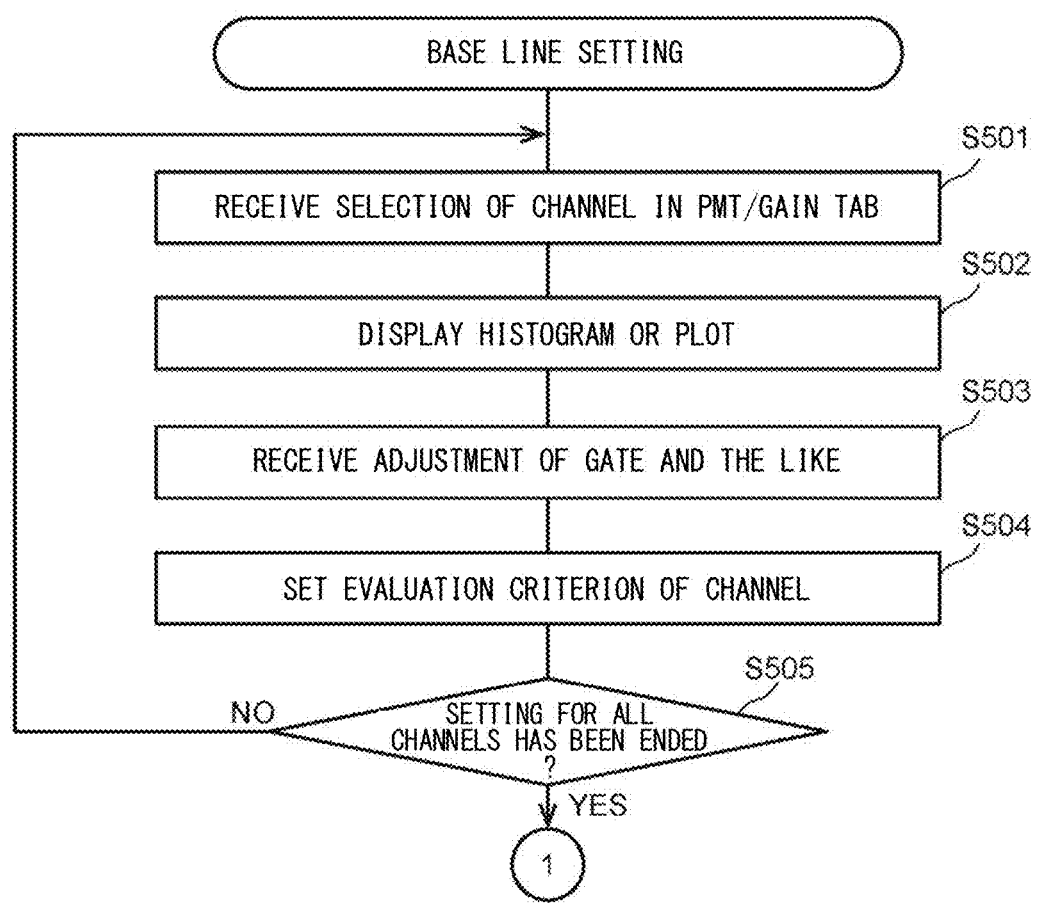
FIG. 30A shows an example of a flow chart for base line setting.

In step S501 in FIG. 30A, the processing unit 10 receives selection, by the user, of a channel in the PMT value/gain setting tab T51. When the PMT value/gain setting tab 51 is not selected, the processing unit 10 receives selection of the PMT value/gain setting tab 51 from the user before the step S501, and displays the PMT value/gain setting tab 51.

Next, the processing unit 10 displays a histogram or a plot corresponding to the selected channel (step S502).

Next, the processing unit 10 receives adjustment of the gate T8 by the user (step S503).

Next, the processing unit 10 receives selection or input in the list display region T61 for displaying setting of the parent gate by the user, the target MFI display region T62, and the predetermined range setting region T63 or the region T64 which allows manual input in Upper Limited and the region T65 which allows manual input in Lower Limited (step S504). This step is the evaluation criterion setting step.

Next, when the user performs an operation corresponding to completing of all the settings, the processing unit 10 determines that setting for all the channels has been ended (YES), the process proceeds to the next step. When the user does not perform the operation corresponding to completing of all the settings, the process is returned to step S501 and the processing unit 10 receives selection of the next channel.

Figure 30B:
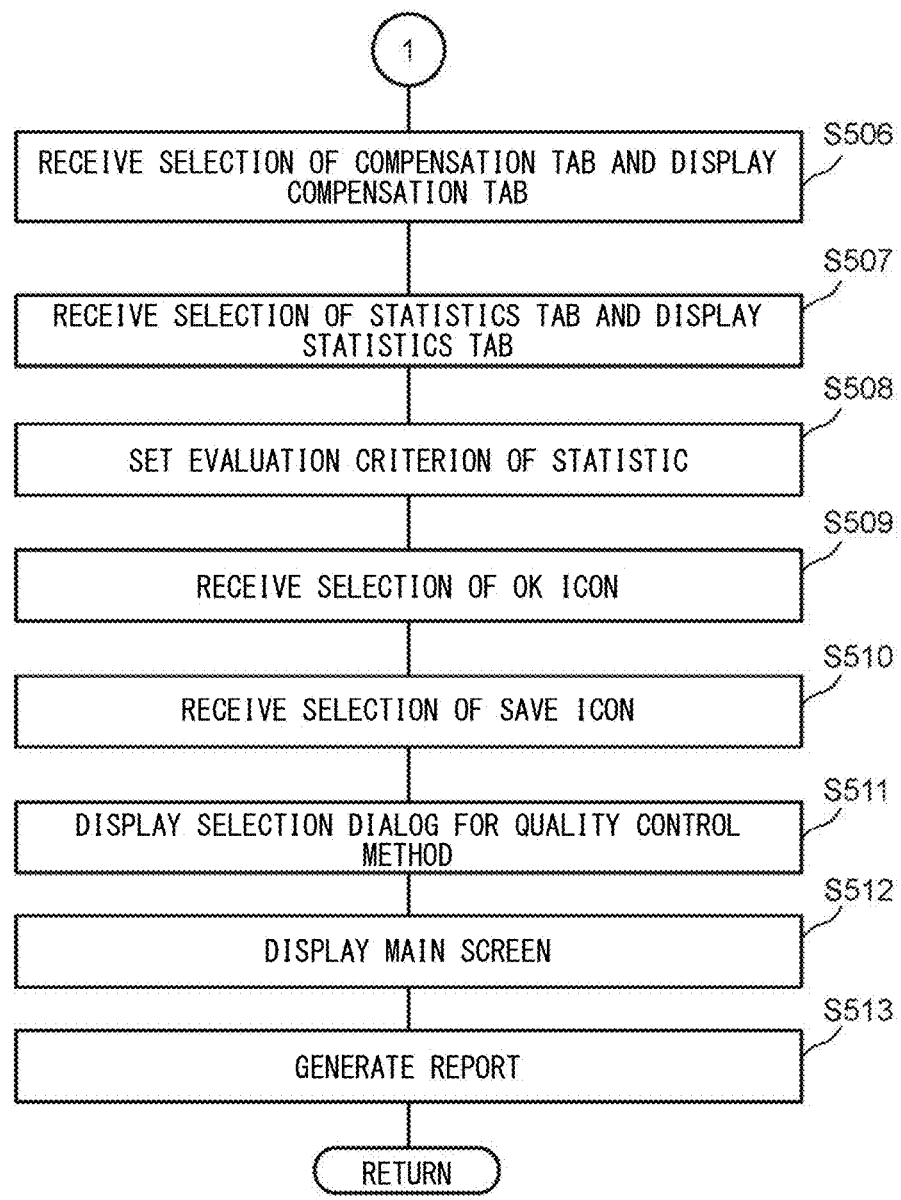
FIG. 30B shows an example of a flow chart for base line setting.

Next, when the setting of the PMT value/gain setting tab T51 has been ended, the processing unit 10 then receives selection, by the user, of the compensation tab T52, and displays the compensation tab T52 (FIG. 30B, step S506).

Next, the processing unit 10 receives selection of the statistics tab T53 by the user, and displays the statistics tab T53 (FIG. 30B, step S507).

Next, the processing unit 10 receives, from the user, selection or input in the predetermined range setting region T63 or the region T64 which allows manual input of Upper Limited and the region T65 which allows manual input of Lower Limited (FIG. 30B, step S508). This step is the evaluation criterion setting step based on the statistics.

Next, the processing unit 10 receives selection, by the user, of the OK icon TO on the base line setting screen T (FIG. 30B, step S509). When receiving the selection of the OK icon TO, the processing unit 10 closes the base line setting screen T and displays the QC file registration dialog X3DT (FIG. 30B, step S509).

Next, the processing unit 10 receives selection, by the user, of the save icon X3DTE of the QC file registration dialog X3DT, and the processing unit 10 stores the setting of the evaluation criterion in the storage unit, as data in the form of a file which can be read out by the program for controlling the operation of the particle analyzer 200, in the daily QC process described below. The processing unit 10 stores the setting of the evaluation criterion in the memory 12 or the auxiliary storage unit 13, preferably, in the auxiliary storage unit 13 in a non-volatile manner (FIG. 30B, step S510).

Figure 31:
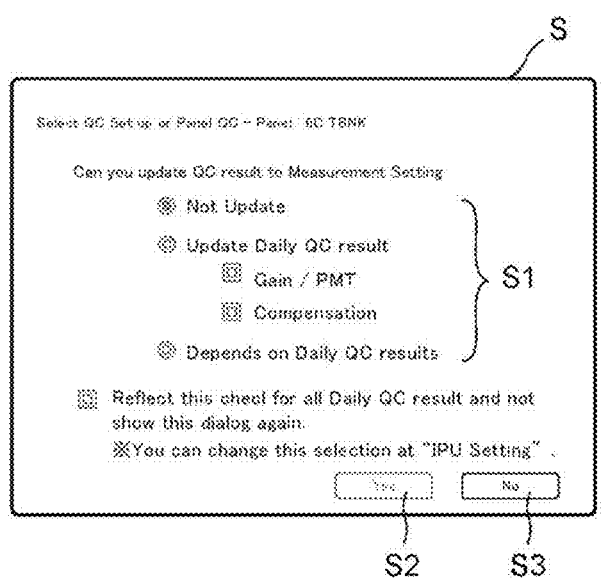
FIG. 31 shows an example of display on the quality control setting screen.
Figure 32:
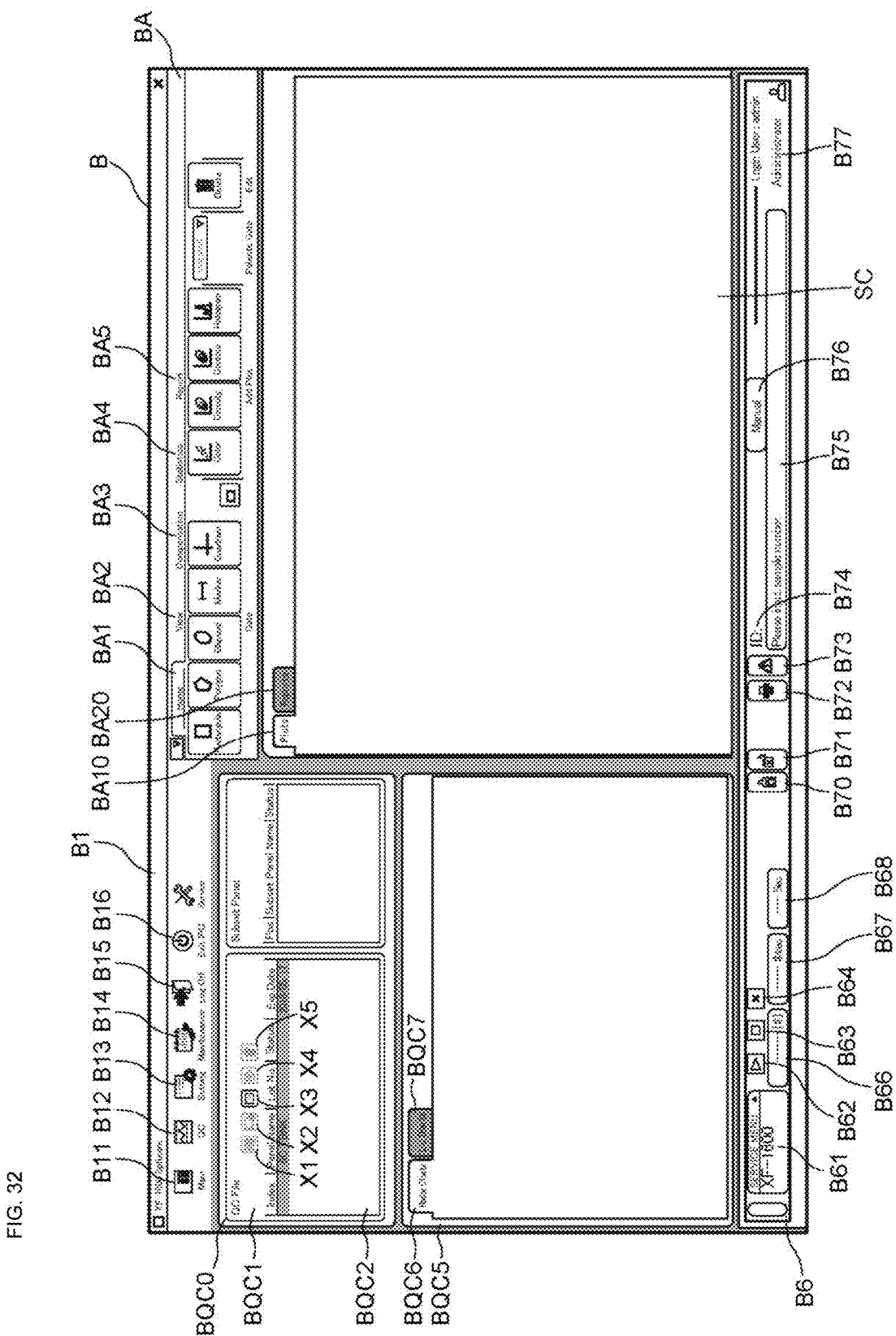
FIG. 32 shows an example of display on the quality control setting screen.

Next, the processing unit 10 displays a selection screen dialog S for the quality control method as shown in FIG. 31, on the monitor serving as the output unit 17 (step S511). A region S1 in the selection screen dialog S is an example of a region for allowing the user to select the quality control method. A Yes region S2 is a region for determining selection by the user, and a No region S3 is a region for receiving selection for canceling the setting. When the user selects o for Not Update in the region S1, the processing unit 10 performs quality control described below by using the evaluation criterion for quality control having been set in the method described for the setting of the test item QC. When receiving selection, by the user, of the Yes region S2 or the No region S3, the processing unit 10 closes the selection screen dialog S for the quality control method and displays the main screen B including the QC file list region BQC0 shown in FIG. 32 (FIG. 30B, step S512).

Generation of Report

Figure 33:
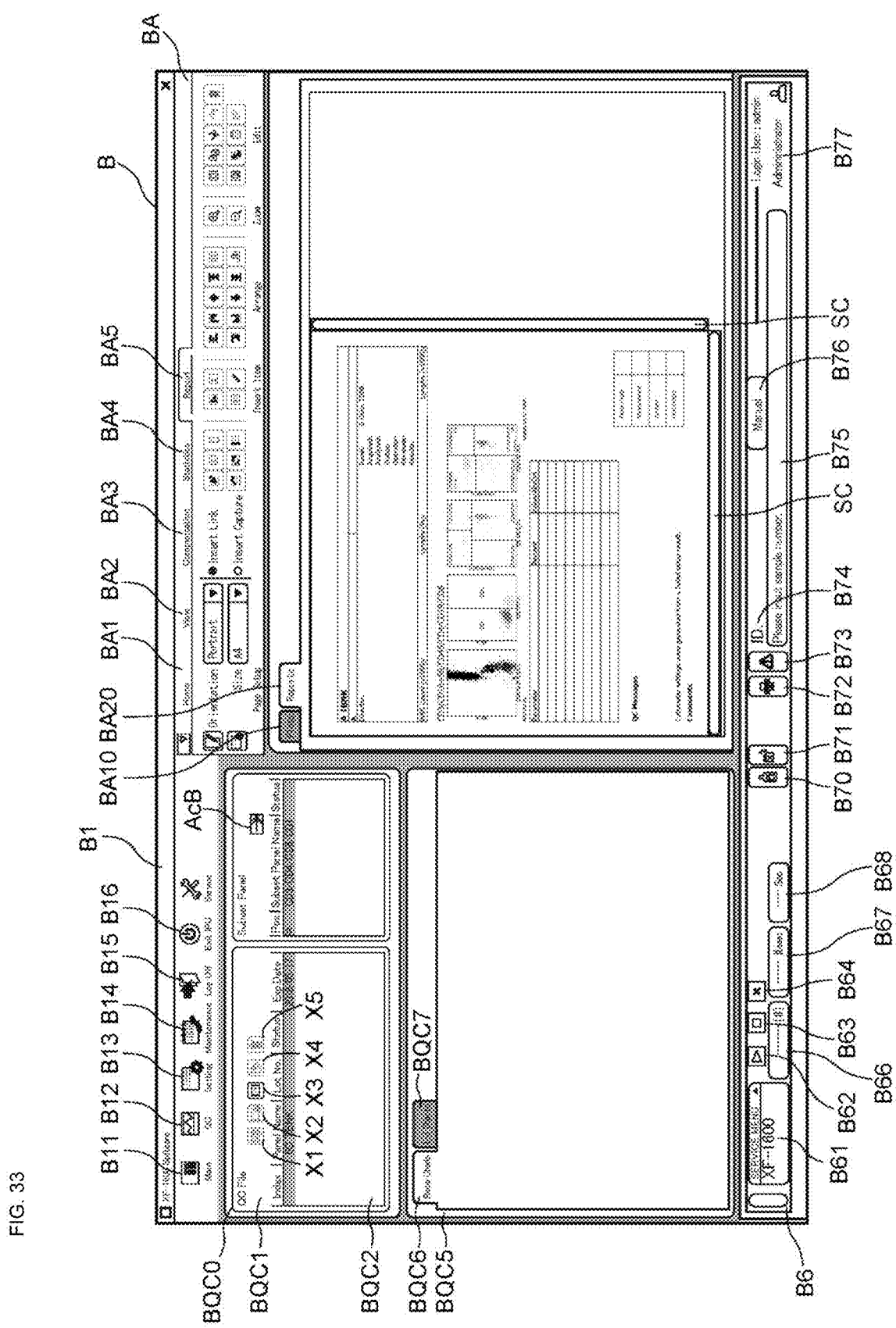
FIG. 33 shows an example of display on the quality control setting screen.

Next, the processing unit 10 performs a report generation process shown in step S6 in FIG. 1. As shown in FIG. 33, the processing unit 10 displays, in the QC file operation region BQC1, the QC file for "6C TBNK" for which the evaluation criterion for quality control has been set. When the user selects the QC file in the QC file operation region BQC1, the list of the subset panels is displayed in the list BQC4. In this example, the subset panel list of "CD3/CD4/CD8/CD16+ . . ." is displayed. When the processing unit 10 receives, from the user, selection of the subset panel list and selection of an archive button AcB, the processing unit 10 displays a report in the report tab BA20. In the report tab BA20, a result which is optionally selected by the user is displayed. For example, a specimen information display region BA201, a plot display region BA202, a counting result display region BA203, a measurer signature region BA204, and the like are displayed.

In step S1 to step S5 shown in FIG. 1, a user's access right is preferably restricted. For example, only a user having a management authority preferably manages a password to be inputted in the log-on screen L shown in FIG. 5. Thus, for example, the evaluation criterion, for quality control, having been once set can be prevented from being recklessly rewritten.

(Quality Control Method)

The control unit 100 performs quality control (also referred to as "daily QC") in a daily test, by using the evaluation criterion, for the quality control of each subset panel, which has been set in the "test item QC setting" described above. At this time, the control unit 100 acts as a quality control device.

Daily QC Process

Step S7, shown in FIG. 1, of performing the daily QC by using the control sample prepared in each clinical laboratory will be described. The setting of the evaluation criterion for quality control need not be performed every time, before the daily QC. The setting of the evaluation criterion for quality control may be performed at predetermined intervals, for example, once a week or once a month, or may be performed when the lot of a detection reagent or a control sample is changed. Screens necessary for performing the daily QC may be generically referred to as quality control screen.

Figure 34:
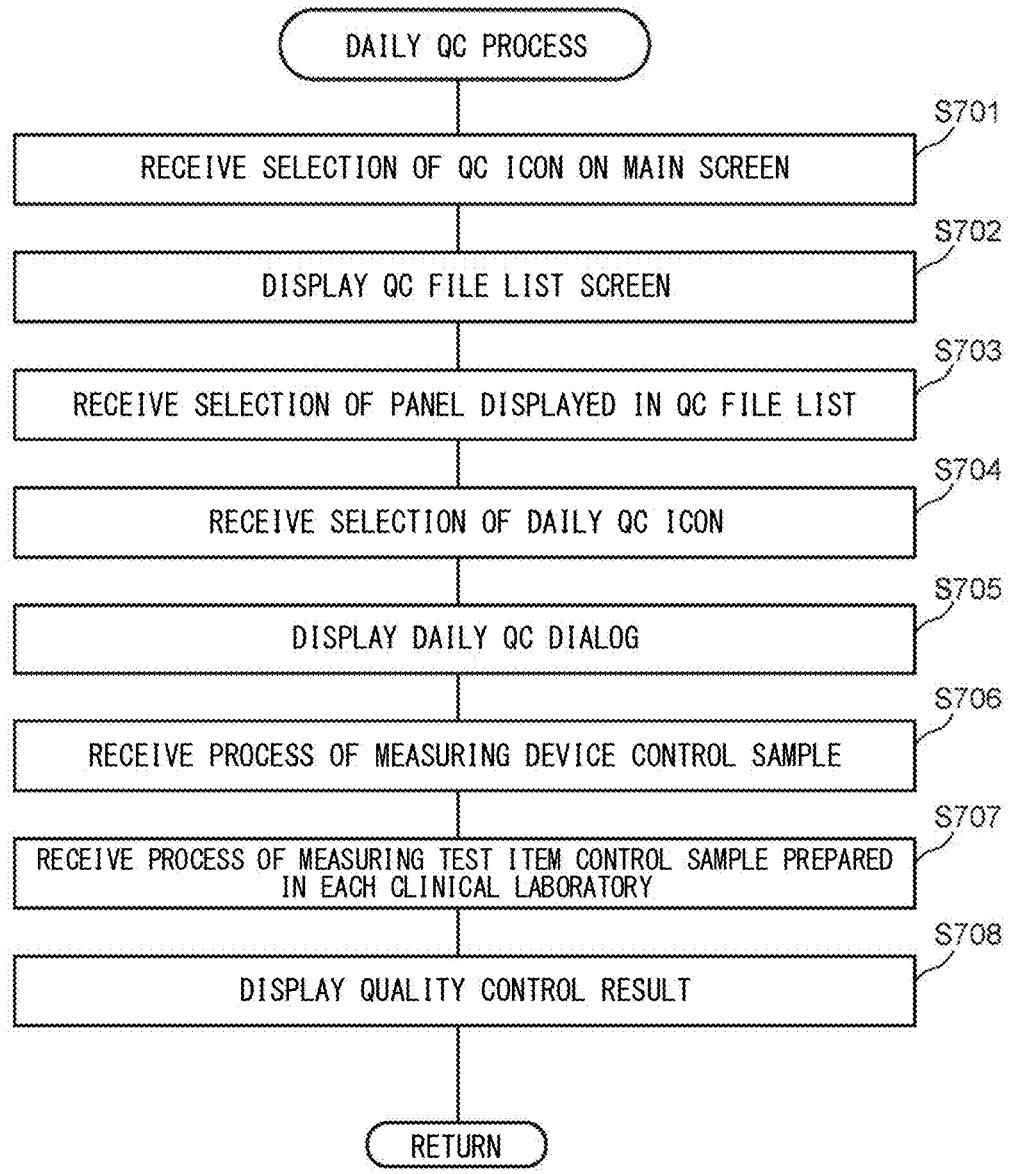
FIG. 34 shows an example of a flow chart for daily QC.
Figure 35:
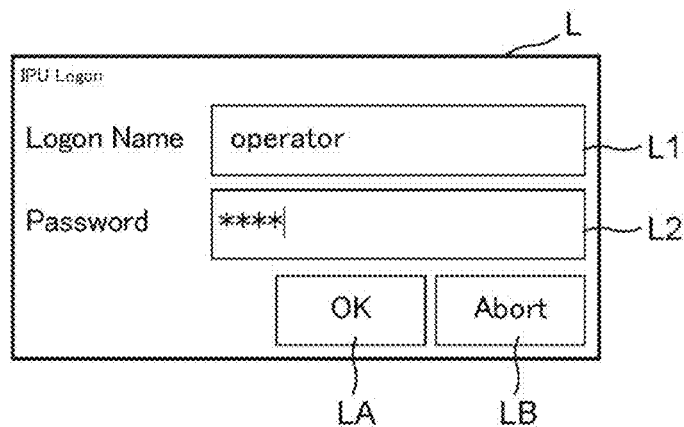
FIG. 35 shows an example of display on a quality control screen.

FIG. 34 shows a flow of the daily QC process. FIG. 35 shows an example of the log-on screen L for performing the daily QC. The daily QC may be performed by a user having no authority. Therefore, the log-on screen L may not necessarily be displayed. The processing unit 10 receives selection of the QC icon B12 by the user in step S701.

Figure 36:
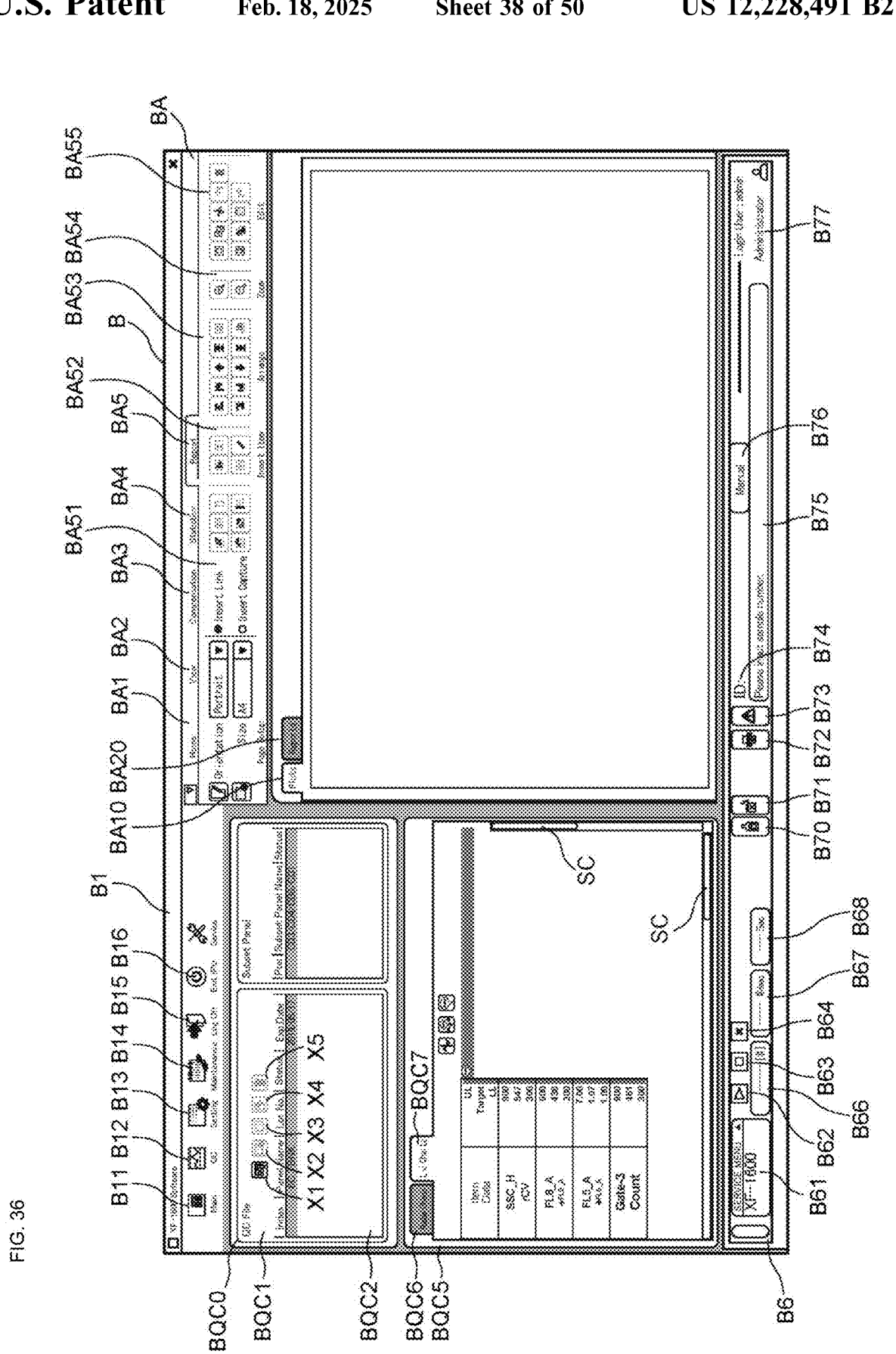
FIG. 36 shows an example of display on the quality control screen.

Subsequently, the processing unit 10 displays the QC file list region BQC0 and the subset panel list display region BQC3 in step S702, as shown in FIG. 36.

Next, in step S703, the processing unit 10 receives selection, by the user, of the QC panel which is displayed in the QC file list region BQC0 and generated in the test item QC setting process. The processing unit 10 subsequently receives selection, by the user, of the QC icon X1 for displaying the contents of the QC file in step S704.

Figure 37:
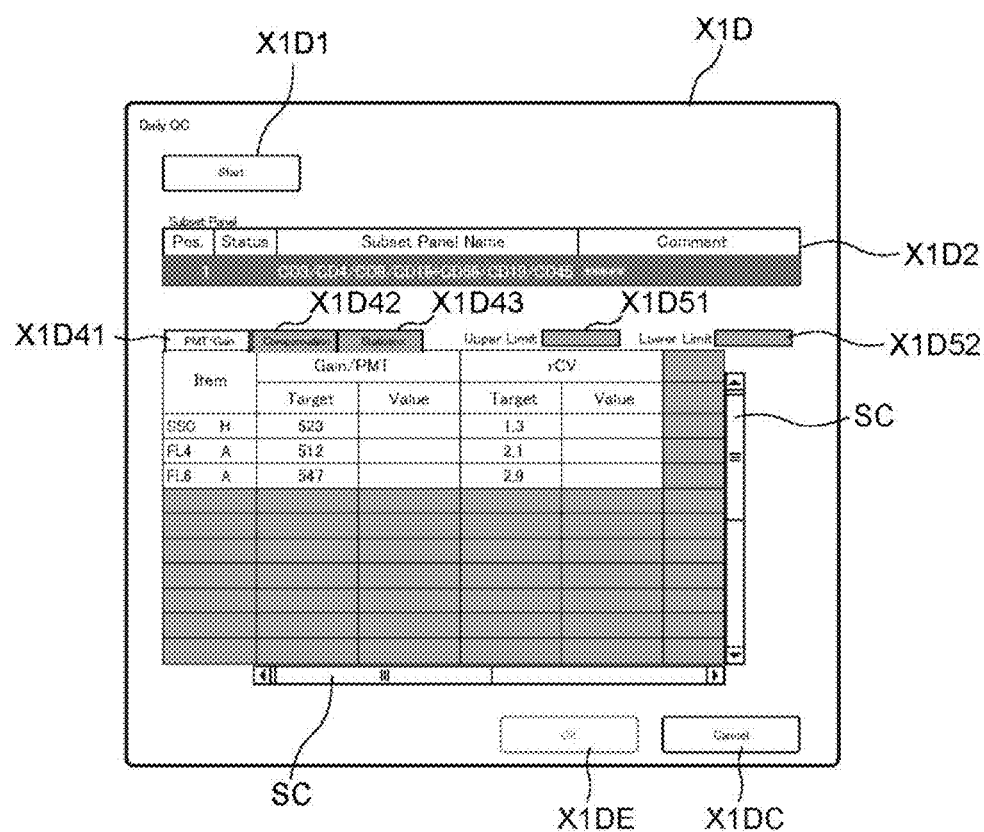
FIG. 37 shows an example of display on the quality control screen.

Next, the processing unit 10 displays a daily QC dialog X1D shown in FIG. 37 in step S705. In the daily QC dialog X1D, a start icon X1D1 for starting the measurement, a subset panel list display region X1D2, a light receiving element status display region X1D4, a determination (OK) icon X1DE for determining the input to proceed to the next step, and a cancel icon X1DC for stopping the setting, are displayed. A subset panel list X1D3 is displayed in the subset panel list display region X1D2. In the light receiving element status display region X1D4, a region for displaying the voltage and dispersion (rCV) of each light receiving element (PMT) for each channel is displayed. The region for the PMT voltage and rCV includes a region for displaying a target value (Target) and a region for displaying a measured value (Value). In the region for displaying the target value, a predetermined target value is displayed. The user sets the device control sample in the suction unit 21 in the particle analyzer 1000 after step S705 or before step S705.

Figure 38:
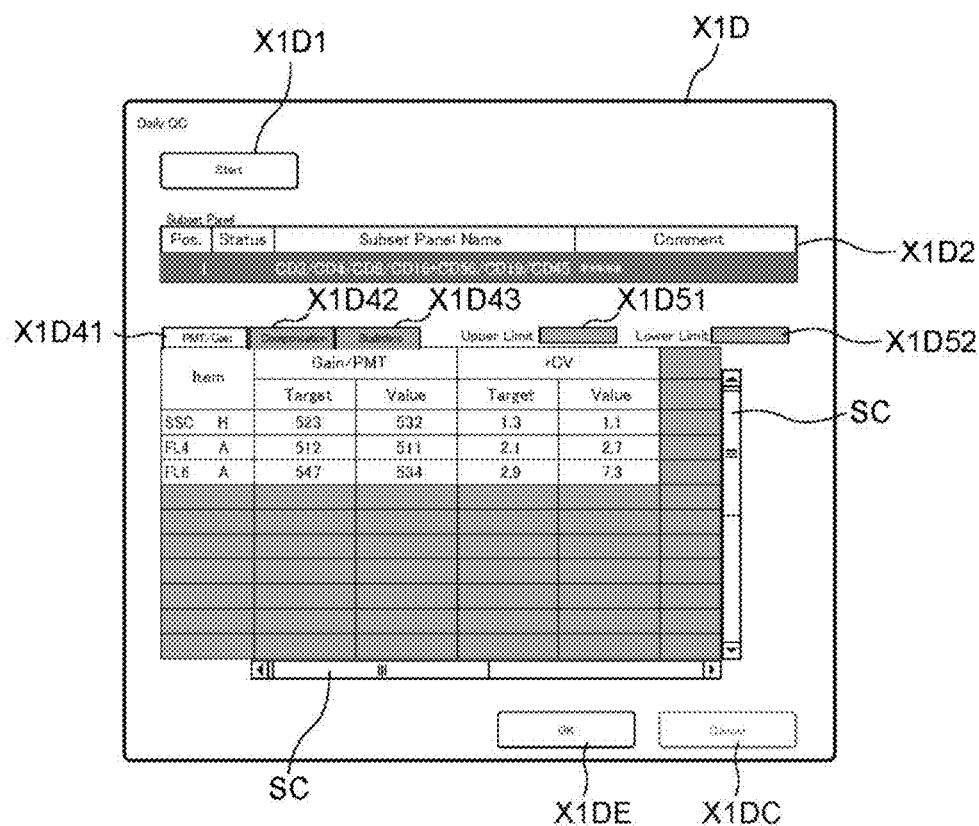
FIG. 38 shows an example of display on the quality control screen.

In step S706, as shown in FIG. 38, the processing unit 10 displays the PMT voltage value of each channel in the case of the device control sample being measured, and the rCV calculated by the processing unit 10, and receives selection of the start icon X1D1 by the user, to start measuring the device control sample. When the measurement has been started, the PMT voltage is automatically set so as to be close to the target value according to the measurement item, as shown in FIG. 23. When the PMT voltage has been set, the determination icon X1DE can be selected. The processing unit 10 receives selection of the determination icon X1DE by the user and closes the daily QC dialog X1D.

Subsequently, the user sets, in the suction unit 21, the test item control sample prepared in the clinical laboratory. The processing unit 10 starts measuring the test item control sample prepared in the clinical laboratory when the user inputs an instruction for starting the measurement (step S707). When the measurement has been ended, the processing unit 10 outputs the result of the quality control (step S708). The result of the quality control may be displayed as a numerical value or a chart such as a graph. As the chart, a graph (for example, radar chart) which is defined by a plurality of axes and in which each channel is represented as an axis, can be displayed as an example. Furthermore, as the chart, a time series graph such as an Xbar-R control chart (Levey-jennings chart: L-J chart) or an Xbar-Rs-R control chart for each channel can be displayed as an example. The PMT voltage value and/or the rCV value of each channel may be separately displayed for each channel. The result of the quality control may be displayed each time the daily QC is performed.

The graph defined by the plurality of axes is preferable since the result of one daily QC can be displayed on one screen by collectively displaying the plurality of axes. The time series graph is displayed together with the previous quality control result obtained at least one point in time. Therefore, daily fluctuation or day-to-day variation can be monitored. The quality control screen on which the quality control result is displayed may include a region for displaying at least the quality control result for each detection item and the evaluation criterion of each detection item.

Figure 39:
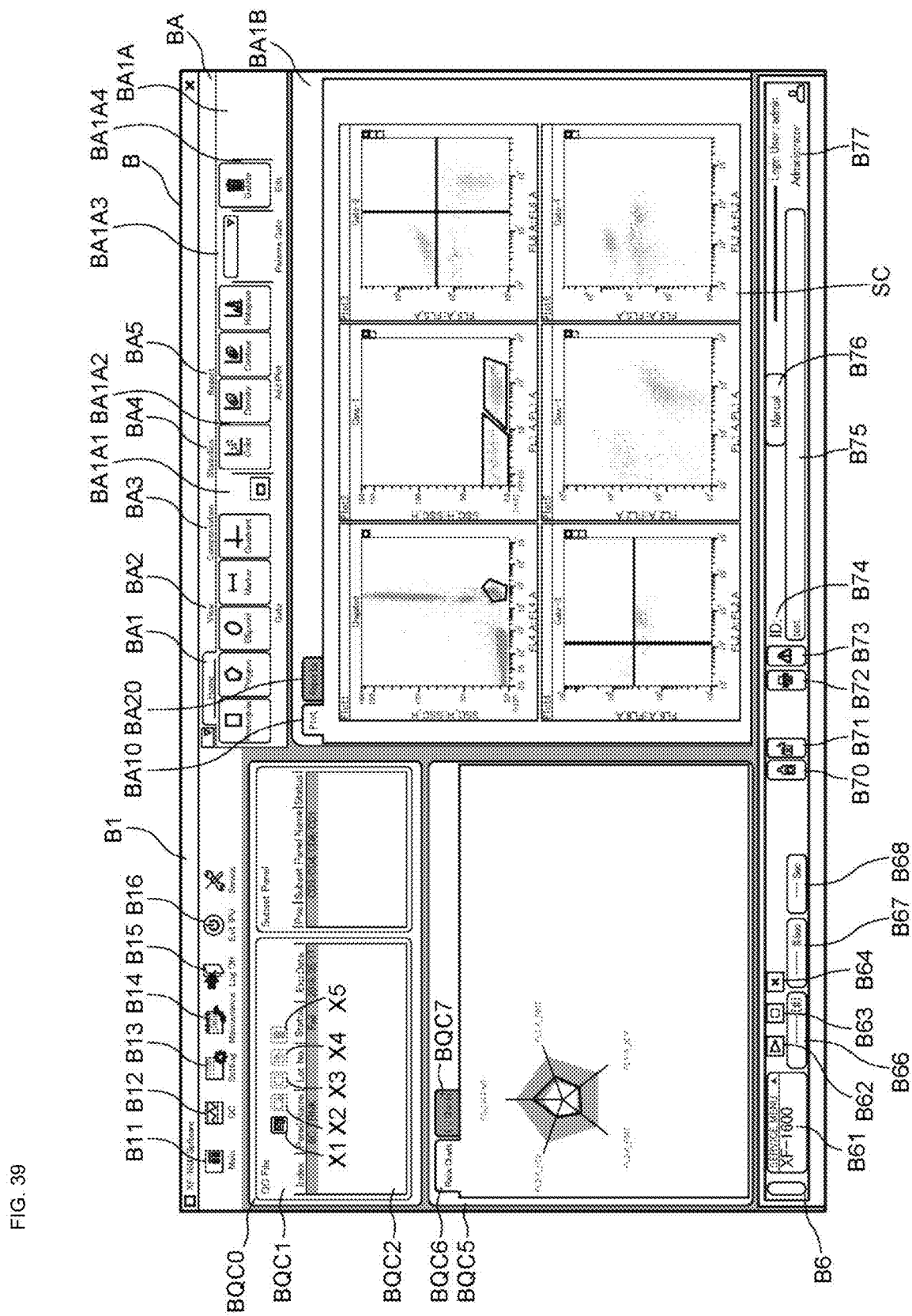
FIG. 39 shows an example of display on the quality control screen.
Figure 40:
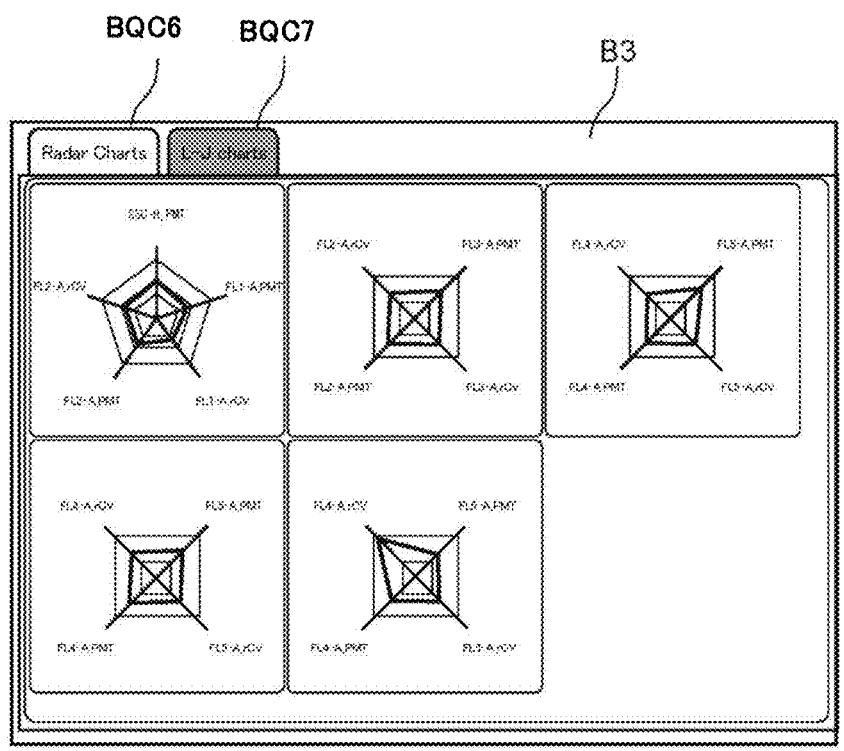
FIG. 40 shows an example of display on the quality control screen.
Figure 41:
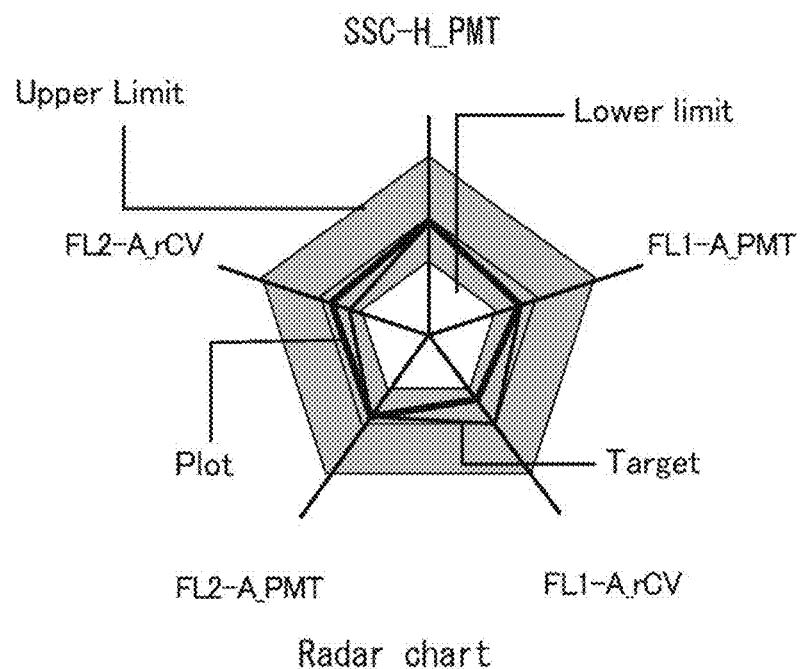
FIG. 41 shows an example of display on the quality control screen.

For example, FIG. 39 shows an example of output for each channel in the case of the output unit 17 serving as a display. On the left side in FIG. 39, an example of the radar chart tab BQC6 in the region BQC5 for indicating the measurement result of the test item control sample is shown. The measurement result of the test item control sample is indicated as the radar graph. FIG. 40 shows a radar chart in which the axis represents each channel. FIG. 41 indicates the meanings of the lines displayed in each radar. Lower Limit represents the lower limit value of the control limit. Upper Limit represents the upper limit value of the control limit. Plot represents actually measured values. Target represents target values. FL1 and FL2 each represent the channel. Each axis in the radar chart represents a target to be detected in each channel. The number of axes in the radar chart is not limited. However, the number of axes is preferably about 3 to 6 such that the displayed characters are legible. When the quality control data is thus displayed, the user can know a channel in which a problem has occurred, at a glance, in the event of a quality control failure.

Figure 42:
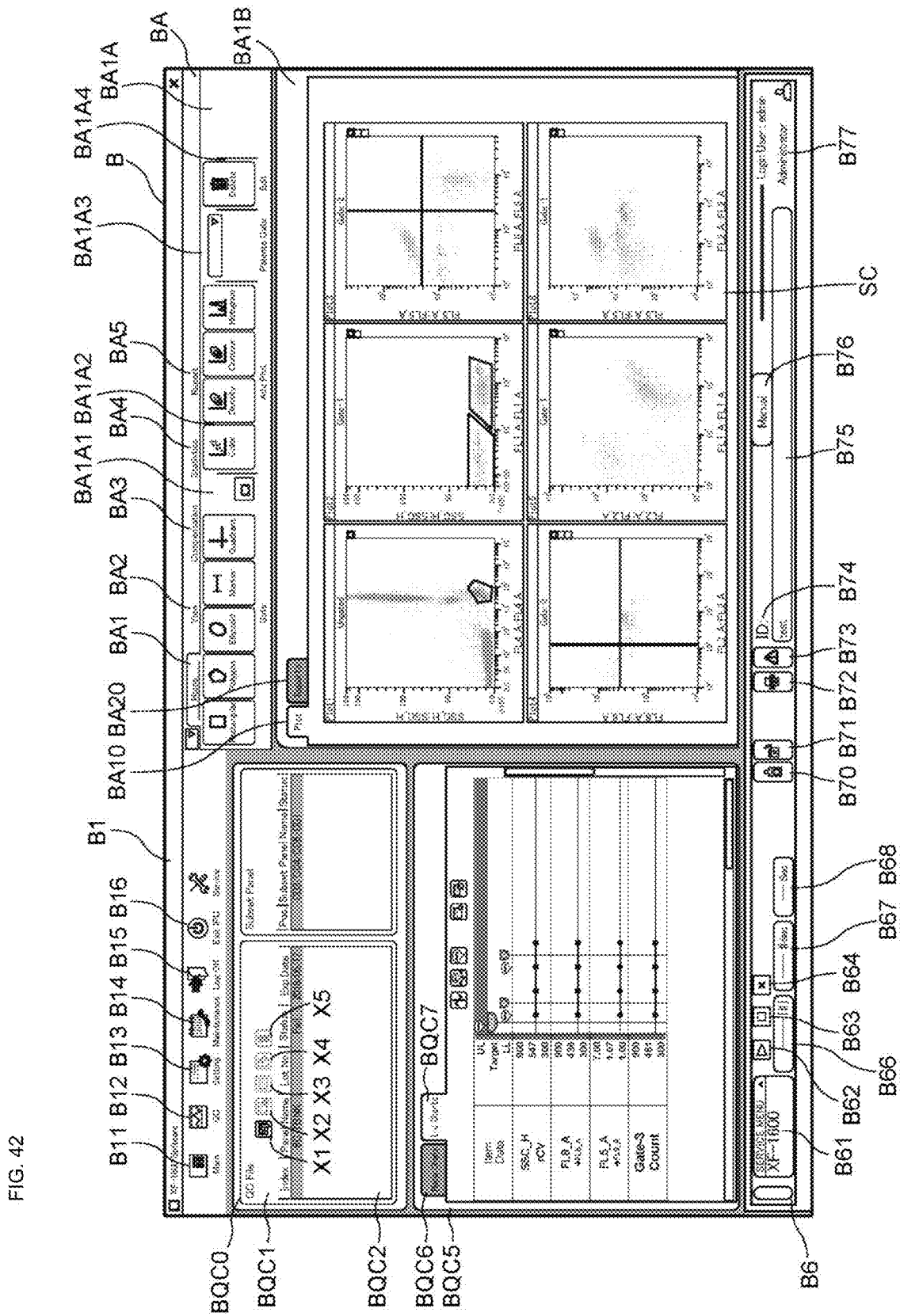
FIG. 42 shows an example of display on the quality control screen.
Figure 43:
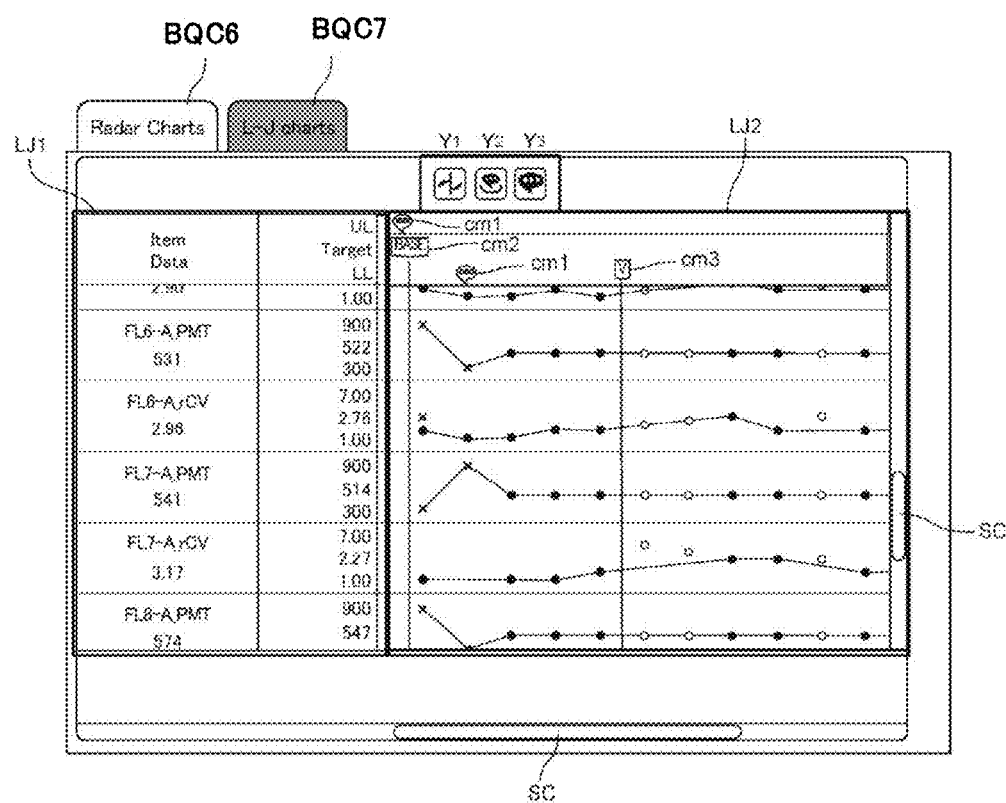
FIG. 43 shows an example of display on the quality control screen.
Figure 44:
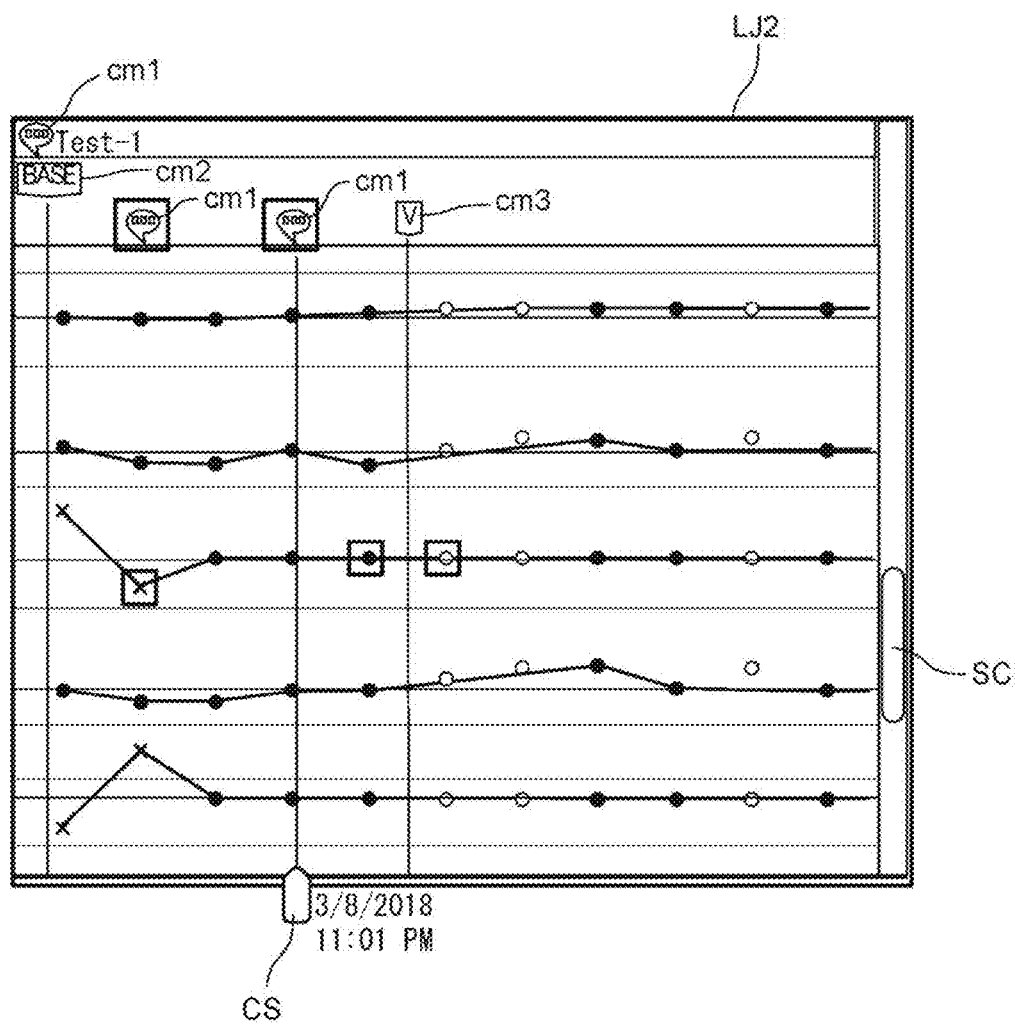
FIG. 44 shows an example of display on the quality control screen.

FIG. 42 shows an example of display of the L-J chart tab BQC7. FIG. 43 is an enlarged view of the L-J chart tab BQC7. In the L-J chart tab BQC7, measurement data of each control sample is chronologically plotted together with the control limit for each control sample, and the user is allowed to know fluctuation of the accuracy of analysis at a glance. In the L-J chart tab BQC7, an item display region LJ1 for displaying a channel target item name corresponding to each graph, and a graph display region LJ2 for displaying a quality control graph (preferably, Xbar-R control chart) are displayed. In the L-J chart tab BQC7, an icon Y1 for displaying details of each graph plot, an icon Y2 for deleting a plot from the graph, and an icon Y3 for inserting a comment, are displayed. The display in the L-J chart tab BQC7 will be described in more detail with reference to FIG. 44. Each plot corresponds to one quality control measurement. The selection can be performed by aligning the quality control cursor CS. The measurement date and time of the plot on the cursor is displayed adjacent to the cursor CS. For example, when a quality control failure has been detected, a comment icon cm1 is displayed. As the symbol in the plot, a black circle indicates that the measured value of the control sample is in a range within the control limit, and × indicates that the measured value exceeds the control limit. The outlined circle represents data that is not a target to be controlled. The cursor represented by reference numeral cm2 indicates the start time of the quality control. The cursor represented by reference numeral cm3 indicates that the lot of the reagent is changed.

In the L-J chart tab BQC7, the cursor CS is aligned with the position intended by the user, whereby the user is allowed to view the quality control data obtained on the date and time intended by the user.

The user confirms the displayed quality control result. When the quality control is favorable, the quality control is ended. The method for displaying the comment about the quality control failure or the like is not limited to the above-described method. The display method such as change of a color of a plot which is determined as indicating a quality control failure, change of the shape of the symbol of the plot, and display of an exclamation mark can be selected.

Output of Report

Figure 45:
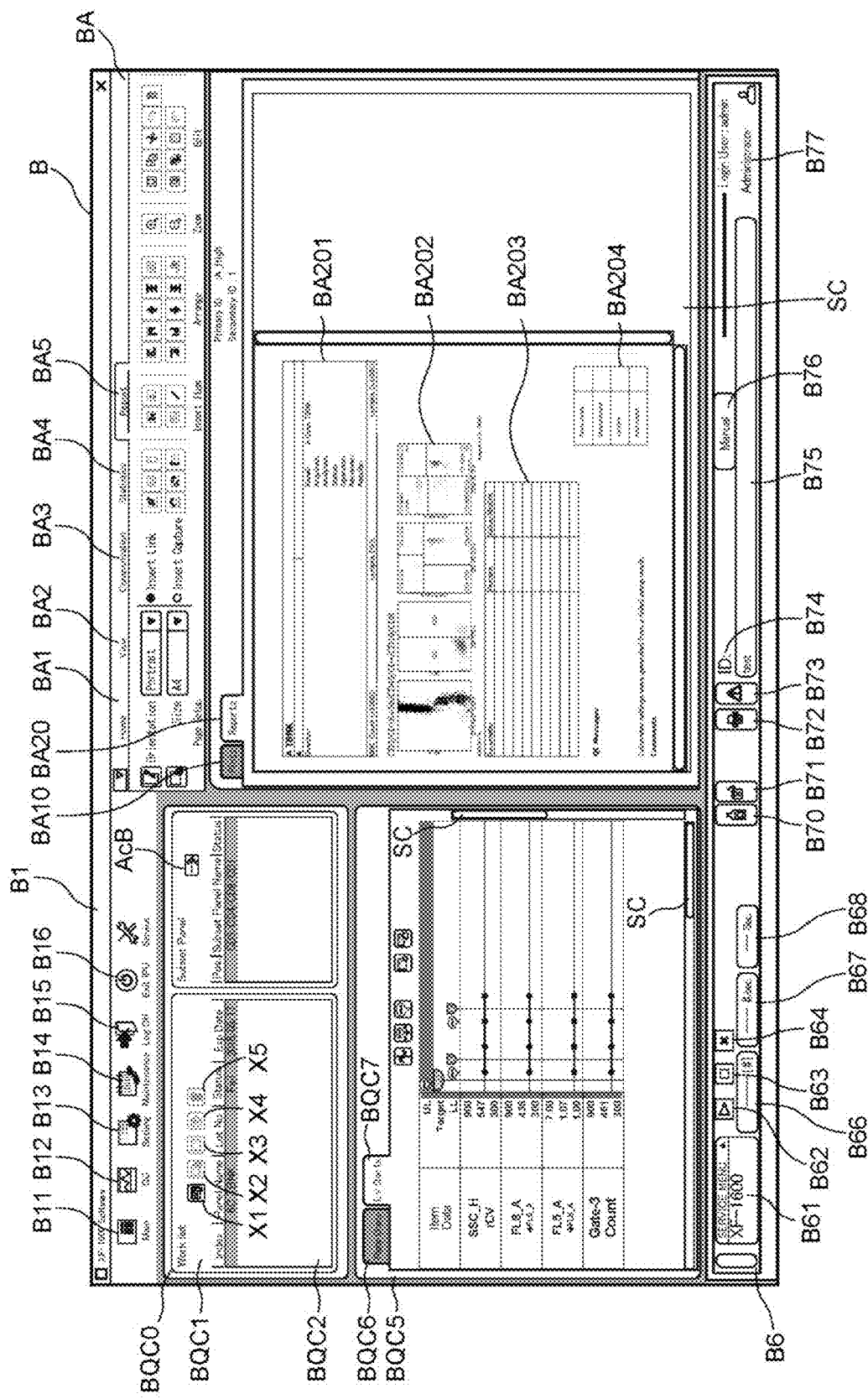
FIG. 45 shows an example of display on the quality control screen.

Next, the processing unit 10 performs a report generation process of step S8 shown in FIG. 1. As shown in FIG. 45, the processing unit 10 displays, in the QC file operation region BQC1, the QC file of "6C TBNK" for which the evaluation criterion for the quality control has been set. When the user selects the QC file in the QC file operation region BQC1, a list of the subset panels is displayed in the list BQC4. In this example, the subset panel list of "CD3/CD4/CD8/CD16+ . . . " is displayed. When the processing unit 10 receives an operation performed by the user for selecting the subset panel list and selecting the archive button AcB, the processing unit 10 displays a report in the report tab BA20. In the report tab BA20, the result that is optionally selected by the user is displayed. For example, the specimen information display region BA201, the plot display region BA202, the counting result display region BA203, the measurer signature region BA204, and the like are displayed. The processing unit 10 outputs the report to the output unit 17 when receiving selection of an export icon EX by the user.

(Measurement of Measurement Sample)

Figure 46:
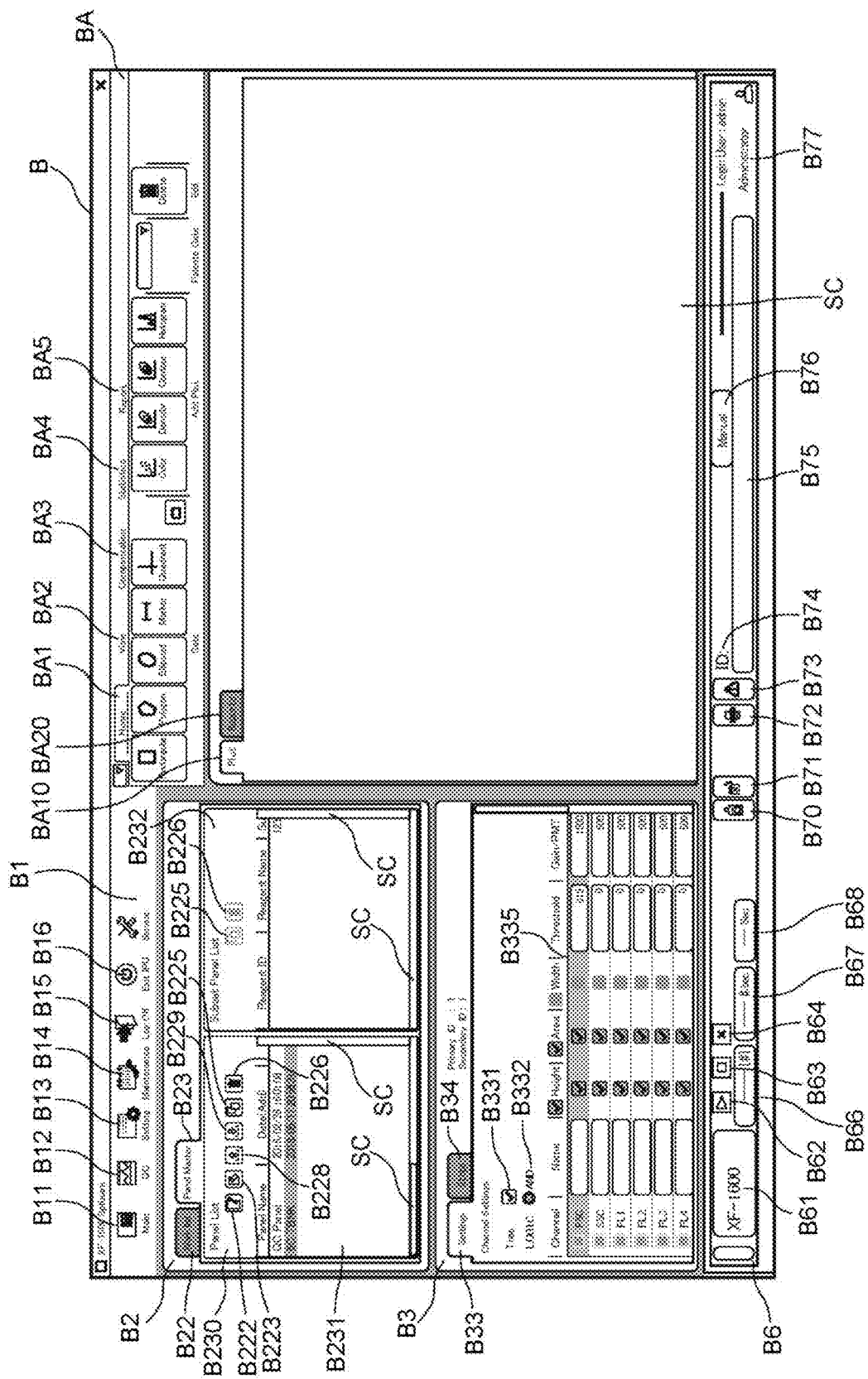
FIG. 46 shows an example of display on the quality control screen.
Figure 47:
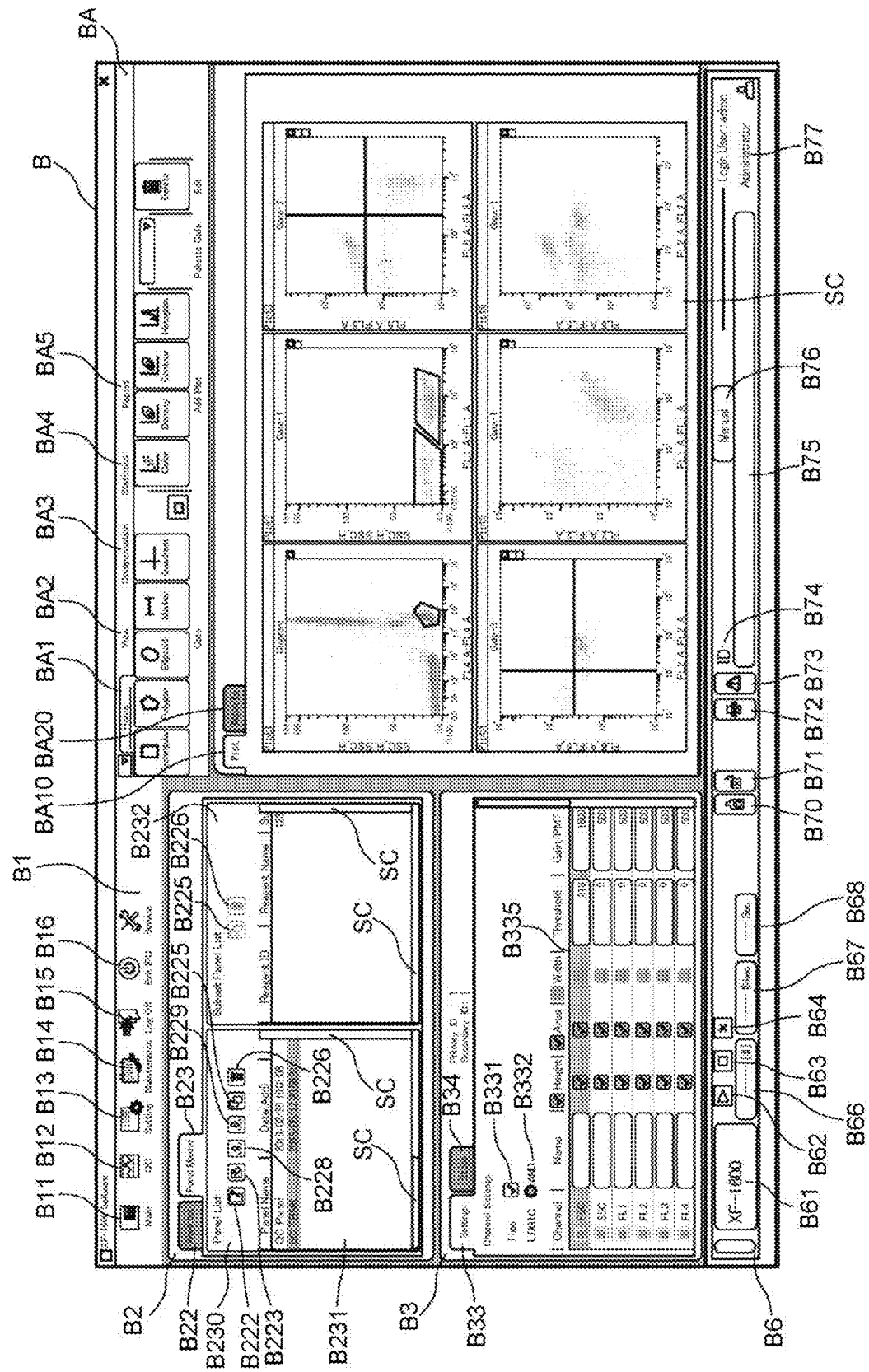
FIG. 47 shows an example of display on the quality control screen.
Figure 48:
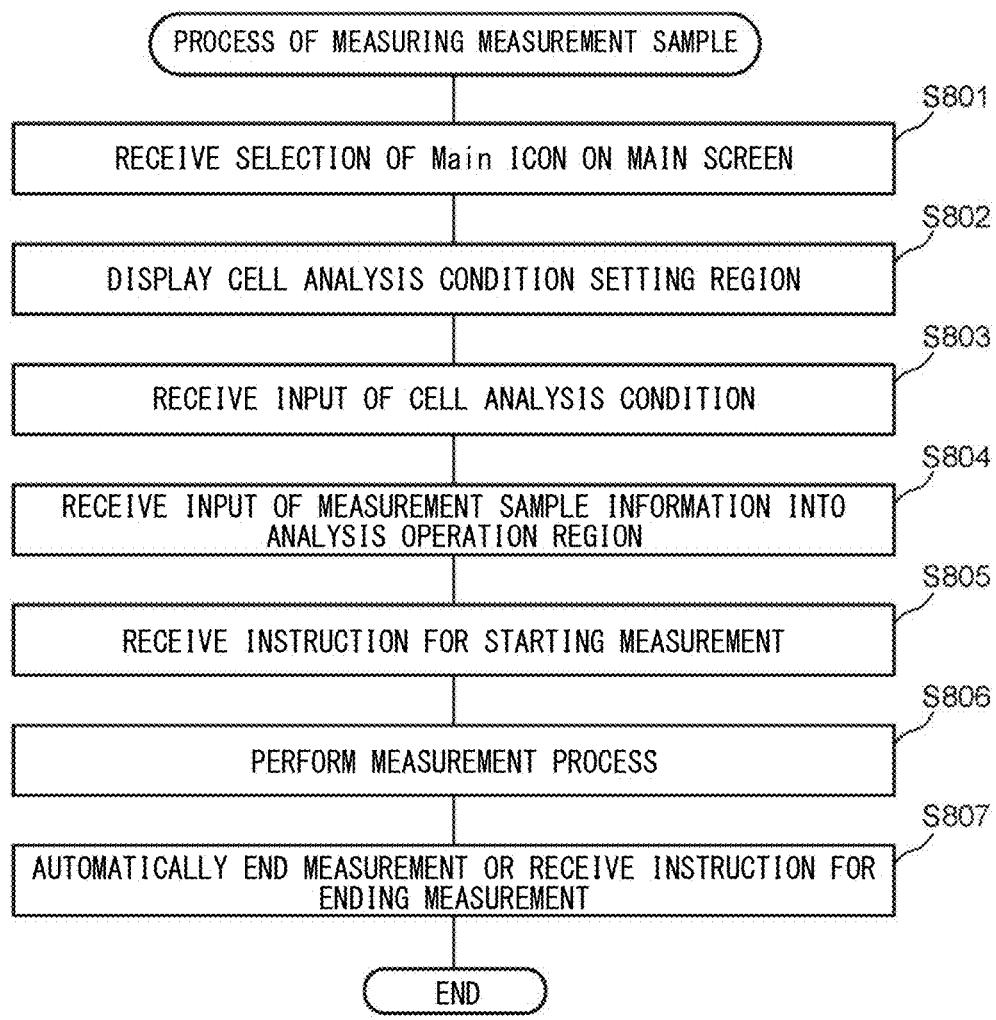
FIG. 48 shows an example of a flow chart for a measurement process.

When the daily QC has been ended and the process step of step S8 has been ended, the processing unit 10 performs the process step of step S9 shown in FIG. 1. FIG. 48 shows the specific process of step S9. In step S801, the processing unit 10 receives selection, by the user, of the Main icon B11 on the main screen B shown in FIG. 6. FIG. 46 shows the main screen B displayed by the processing unit when the Main icon B11 is selected. In the panel list, the registered panel "6C TBNK" is displayed. Subsequently, in step S802, the processing unit 10 receives selection of the panel registered by the user, and displays the particle analysis condition setting region B3 shown in FIG. 46. In step S803, the processing unit 10 receives input, by the user, of the measurement condition into the particle analysis condition setting region B3. The processing unit 10 receives input, by the user, of the information of the measurement sample into the analysis operation region B6 shown in FIG. 46. Subsequently, the user sets the measurement sample 29 in the suction unit 21, and selects the measurement start icon B62 in the analysis operation region B6 shown in FIG. 46. The processing unit 10 receives this selection, and starts the measurement process. The processing unit 10 may automatically end the measurement after a predetermined number of cells are measured, or end the measurement when the user selects the measurement stop icon B63 in the analysis operation region B6 shown in FIG. 46. After the analysis has been ended, the measurement result is displayed in the plot tab BA10 as shown in FIG. 47.

[Computer Program]

Another embodiment of the present disclosure relates to a computer program for causing the computer to execute step S301 to S331 shown in FIG. 13A to FIG. 13C and S401 to S403 shown in FIG. 23, step S501 to S513 shown in FIG. 30A and FIG. 30B, S701 to S708 shown in FIG. 34, or step S801 to S807 shown in FIG. 48. The computer program is application software of the particle analyzer 1000.

Furthermore, an embodiment of the present disclosure relates to a program product such as a storage medium having the program for assistance stored therein. That is, the computer program is stored in a storage medium such as a hard disk, a semiconductor memory device such as a flash memory, and an optical disc. The mode for storing the program in the storage medium is not limited to a specific mode when the above-presented apparatus can read the program. The storage in the storage medium is preferably performed in a non-volatile manner. The storage medium may be provided as a program product.

[Other Aspects]

In the above-described embodiment, the control sample and the measurement sample are set in the suction unit 21. However, for example, as the control sample and the measurement sample, the particles and the detection reagent may be mixed in a sample preparation device, and the prepared sample may be set together with a sample rack in the particle analyzer 1000 and measured.

In another aspect for setting of the panel and/or the daily QC, the processing unit 10 in the measurement apparatus 1000 obtains display mode information based on a control sample, and displays the quality control setting screen or the quality control screen, for the test item, corresponding to the obtained display mode information, on the display unit 16, so as to be switchable to the quality control setting screen or the quality control screen corresponding to other display mode information.

The test item control sample may include a control sample of an in vitro diagnostic reagent or a control sample prepared by using a reagent for research. The control sample of the in vitro diagnostic reagent is provided by a control sample provider or a measurement apparatus provider in many cases. In such a case, the evaluation criterion is also provided together with the in vitro diagnostic control sample. Therefore, the evaluation criterion for the quality control using the control sample of the in vitro diagnostic reagent is, for example, preinstalled in the auxiliary storage unit 13 or can be obtained by the processing unit 10 via the communication unit 151 over the network 99. Meanwhile, for the control sample prepared by using a reagent for research, the evaluation criterion is not provided, unlike the control sample of the in vitro diagnostic reagent. Accordingly, the user needs to set the evaluation criterion. Therefore, a mode for displaying the quality control setting screen or the quality control screen is different between the panel setting and/or the daily QC using the control sample of the in vitro diagnostic reagent, and the panel setting and/or the daily QC using the control sample prepared by using a reagent for research, in some cases. The processing unit 10 obtains information based on the control sample. The information based on the control sample may include information (reagent name, reagent identification number, and the like) for identifying a reagent, a lot number, an expiration date, display mode information, and the like. The display mode information may include information indicating whether the control sample is a control sample of the in vitro diagnostic reagent or a control sample prepared by using a reagent for research. The display of the quality control setting screen or the quality control screen can be switched by obtaining the display mode information. The display mode information may be obtained by the processing unit 10 as information inputted from the input unit 16 by a user. Furthermore, the display mode information may be provided as a barcode on an exterior portion or a container for the detection reagent, and a reading unit connected to the control unit 100 may read the barcode, and the processing unit 10 may obtain the information. Moreover, the processing unit 10 may obtain the display mode information which is preinstalled in the auxiliary storage unit 13, or may obtain the display mode information via the communication unit 151 over the network 99.

What is claimed is:

1. A measurement apparatus comprising:
a measurement unit configured to measure a test item control sample prepared to perform test item quality control for a test item;
an input unit configured to receive an input entered by a user;
a display unit configured to display a quality control setting screen for guiding the user to prepare to perform internal quality control; and
a processing unit configured to perform test item quality control for a new test item, wherein the test item quality control is performed to instruct the processing unit to:
operate the display unit to display the quality control setting screen;
receive, on the quality control setting screen through the input unit, an input of a panel identifying the new test item, wherein the new test item is a request to detect a particle;
receive, on the quality control setting screen through the input unit, at least one set of quality control evaluation criteria for evaluating a quality control measurement obtained for the new test item;
operate the measurement unit on the test item control sample and obtain the quality control measurement for the new test item from the measurement unit, wherein the test item control sample is prepared to include a target molecule measured to detect the particle, and the quality control measurement provides a measurement of the target molecule; and
display the quality control measurement on the display unit in comparison with the at least one set of quality control evaluation criteria to maintain accuracy of sample measurements obtained for a particular test item.

2. The measurement apparatus of claim 1, wherein the measurement unit is configured to perform a sample measurement under a respective plurality of test items, and the processing unit is configured to receive at least one set of quality control evaluation criteria for each of the test items.

3. The measurement apparatus of claim 1, further comprising a storage unit configured to store the at least one of quality control evaluation criteria, wherein the processing unit is configured to read out the at least one set of quality control evaluation criteria from the storage unit to evaluate the quality control measurement obtained for the new test item.

4. The measurement apparatus of claim 1, wherein the measurement unit comprises at least one light receiving element configured to receive light scattered from a sample, and the at least one set of quality control evaluation criteria is used to evaluate an intensity of the scattered light received by the at least one light receiving element.

5. The measurement apparatus of claim 1, wherein the measurement unit comprises:
 at least two light receiving elements configured to receive lights scattered from particles contained in a sample,
 the processing unit is configured to operate the display unit to display, on the quality control setting screen, a particle distribution chart defined by intensities of the scattered lights received by the at least two light receiving elements, and
 the processing unit is configured to receive at least two sets of the quality control evaluation criteria to display the particle distribution chart on the quality control setting screen.

6. The measurement apparatus of claim 5, wherein the particle distribution chart is displayed with a predetermined gate defined by the at least two sets of quality control evaluation criteria.

7. The measurement apparatus of claim 6, wherein the at least one set of quality control evaluation criteria is set based on a particle distribution information relating to cells found within the gate.

8. The measurement apparatus of claim 7, wherein the particle distribution information comprises at least one of: a number of cells found in the gate; a median of intensities of the light scattered from the cells found in the gate; a mean value of the intensities of the light scattered from the cells found in the gate; and a standard deviation of the intensities of the light scattered from the cells found in the gate.

9. The measurement apparatus of claim 1, wherein the at least one set of quality control evaluation criteria includes an upper limit value and a lower limit value applied to the quality control measurement obtained for the new test item.

10. The measurement apparatus of claim 1, wherein the quality control setting screen is designed to show at least one of:
 an input region for receiving an input of at least one character through the input unit;
 icons to be selected through the input unit;
 a pull-down list from which a selection is made through the input unit;
 a histogram or a dot plot; and
 a character string corresponding to each light receiving element in the measurement unit.

11. The measurement apparatus of claim 1, wherein the measurement unit comprises a flow cytometer having light receiving elements configured to detect at least one of fluorescence light or scattered light.

12. The measurement apparatus of claim 11, wherein the processing unit is configured to receive at least one condition set to correct gains of the light receiving elements.

13. The measurement apparatus of claim 1, wherein the test item control sample comprises an in vitro diagnostic reagent or a reagent for research.

14. The measurement apparatus of claim 13, wherein the processing unit is configured to operate the display unit to display the test item quality control setting screen for guiding the user to set the at least one set of quality control evaluation criteria for the internal quality control, when the test item control sample comprises the reagent for research; and
 when the test item control sample comprises the in vitro diagnostic sample, the processing unit is configured to operate the display unit to display the quality control screen that shows at least one set of quality control evaluation criteria provided by a provider of the in vitro diagnostic sample is set.

* * * * *